United States Patent
Nomura et al.

(10) Patent No.: US 8,081,863 B2
(45) Date of Patent: Dec. 20, 2011

(54) CONTENT PLAYBACK APPARATUS

(75) Inventors: Kazuhiro Nomura, Osaka (JP); Yuko Tsusaka, Osaka (JP); Kentaro Tanikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1552 days.

(21) Appl. No.: 10/585,481

(22) PCT Filed: Jan. 26, 2005

(86) PCT No.: PCT/JP2005/000994

§ 371 (c)(1),
(2), (4) Date: Jul. 10, 2006

(87) PCT Pub. No.: WO2005/074275

PCT Pub. Date: Aug. 11, 2005

(65) Prior Publication Data

US 2009/0148133 A1 Jun. 11, 2009

(30) Foreign Application Priority Data

Jan. 30, 2004 (JP) .................................. 2004-023795
Jun. 17, 2004 (JP) .................................. 2004-180249

(51) Int. Cl.
*H04N 9/80* (2006.01)
(52) U.S. Cl. ........................................ 386/241; 386/242
(58) Field of Classification Search .................. None
See application file for complete search history.

(56) References Cited

U.S. PATENT DOCUMENTS

| | | | | | |
|---|---|---|---|---|---|
| 5,818,439 A | * | 10/1998 | Nagasaka et al. | ............... | 725/87 |
| 5,974,218 A | * | 10/1999 | Nagasaka et al. | ............. | 386/200 |
| 5,995,095 A | * | 11/1999 | Ratakonda | ..................... | 715/255 |
| 6,771,268 B1 | * | 8/2004 | Crinon | ......................... | 345/475 |
| 7,035,435 B2 | * | 4/2006 | Li et al. | ......................... | 382/107 |
| 7,082,255 B1 | * | 7/2006 | Jun | ............................... | 386/291 |
| 7,433,577 B2 | * | 10/2008 | Miyasato et al. | ............. | 386/248 |
| 7,599,554 B2 | * | 10/2009 | Agnihotri et al. | ............. | 382/173 |
| 7,826,709 B2 | * | 11/2010 | Moriya et al. | ................ | 715/202 |
| 7,971,217 B2 | * | 6/2011 | Masumitsu et al. | ............ | 725/46 |
| 2002/0051081 A1 | | 5/2002 | Hori et al. | | |
| 2003/0055634 A1 | | 3/2003 | Hidaka et al. | | |

FOREIGN PATENT DOCUMENTS

| | | |
|---|---|---|
| JP | 2001-119649 | 4/2001 |
| JP | 2002-125199 | 4/2002 |
| JP | 2002-281449 | 9/2002 |
| JP | 2003-259311 | 9/2003 |

\* cited by examiner

*Primary Examiner* — William C Vaughn, Jr.
*Assistant Examiner* — Gelek W Topgyal
(74) *Attorney, Agent, or Firm* — Wenderoth, Lind & Ponack, L.L.P.

(57) ABSTRACT

A content playback apparatus obtains and plays a content section from content according to an obtaining method that varies.

The content playback apparatus which obtains the content section from content and plays the obtained content section includes a reference generation unit that generates a judgment reference that varies dynamically over a playback time axis of the content, and a content section obtaining unit that obtains the content section by comparing the content with the judgment reference. With this structure, the content playback apparatus is able to obtain a content section according to a method that varies.

23 Claims, 40 Drawing Sheets

FIG.3

DIALOG SEGMENT LIST 31

| | START POINT | END POINT | SOUND INTENSITY AT START POINT | SOUND INTENSITY AT END POINT |
|---|---|---|---|---|
| DIALOG SEGMENT 1 | $t_1$ | $t_2$ | $x_{11}$ | $x_{21}$ |
| 2 | $t_3$ | $t_4$ | $x_{12}$ | $x_{22}$ |
| 3 | $t_5$ | $t_6$ | $x_{13}$ | $x_{23}$ |
| 4 | $t_7$ | $t_8$ | $x_{14}$ | $x_{24}$ |
| 5 | $t_9$ | $t_{10}$ | $x_{15}$ | $x_{25}$ |
| 6 | $t_{11}$ | $t_{12}$ | $x_{16}$ | $x_{26}$ |
| 7 | $t_{13}$ | $t_{14}$ | $x_{17}$ | $x_{27}$ |

FIG.5

PLAYBACK SEGMENTS FOR SEARCH PLAYBACK
/ 41

| PLAYBACK SEGMENTS | $t_1 \sim t_2$、 $t_3 \sim t_4$、 $t_7 \sim t_8$ |
|---|---|

PLAYBACK SEGMENTS FOR OVERVIEW PLAYBACK
/ 42

| PLAYBACK SEGMENTS | $t_7 \sim t_8$、 $t_9 \sim t_{10}$、 $t_{13} \sim t_{14}$ |
|---|---|

FIG.6

```
                    PRESET RECORDING

RECORDING START   ☐ M ☐ D ☐ HR ☐ MIN
RECORDING END     ☐ M ☐ D ☐ HR ☐ MIN
  CHANNEL ☐ ch    RECORDING MODE ☐
CREATE DIGEST VIDEO  ☑    SEARCH ☑
                          OVERVIEW ☐
```

PROGRAM NAVI — 61

| CH | START | PROGRAM TITLE | | |
|---|---|---|---|---|
| 2 | 21:00 | DOCUMENTARY | THUMBNAIL | SEARCH |
| 4 | 10:00 | WIDE SHOW | | |
| 6 | 13:30 | TALK SHOW | THUMBNAIL | OVERVIEW |
| 8 | 17:00 | NEWS | | |
| 10 | 19:00 | VARIETY | THUMBNAIL | SEARCH | OVERVIEW |

FIG.9
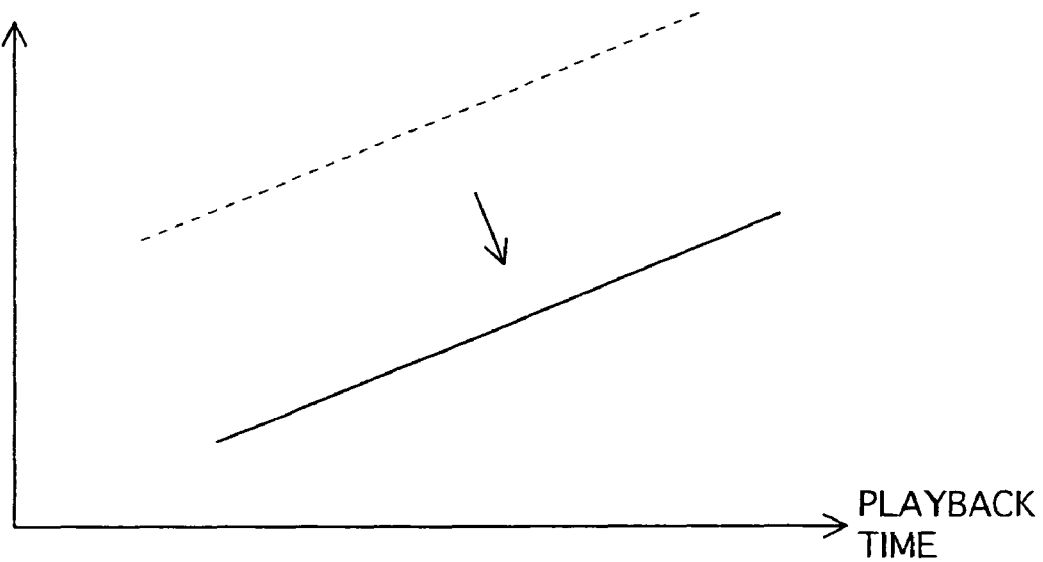
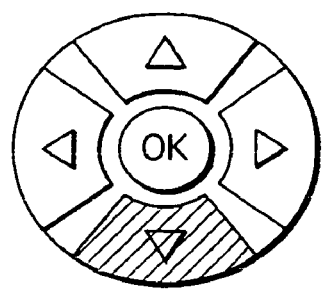

FIG.10
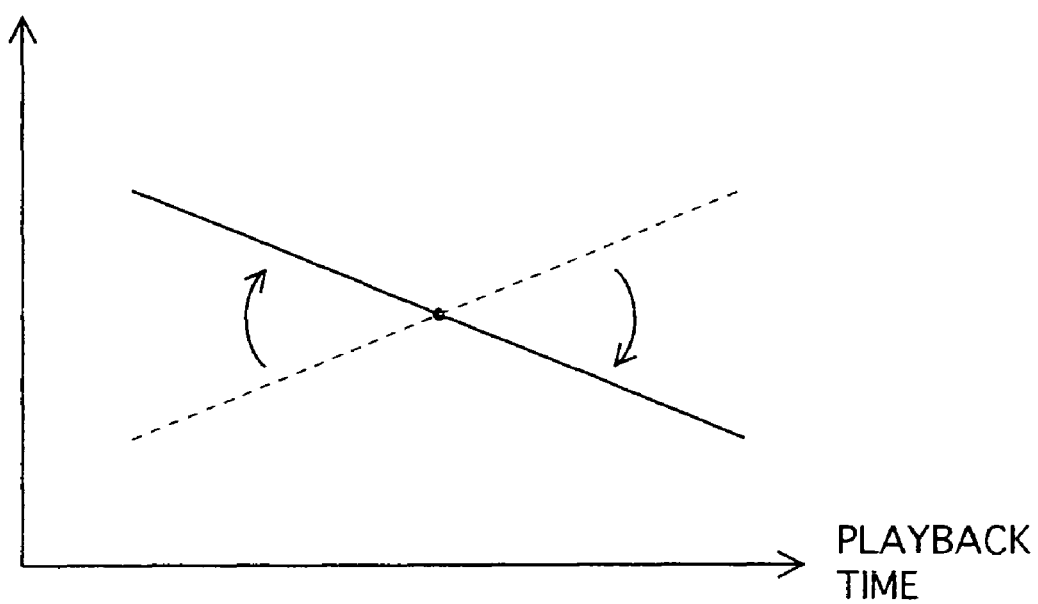
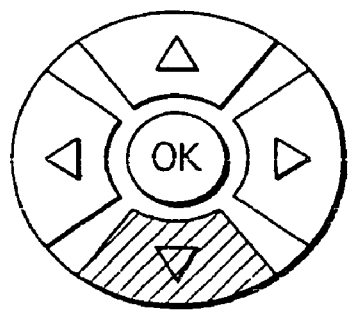

FIG.15

PROGRAM MANAGEMENT TABLE ~T100

| PROGRAM ID | PROGRAM NAME | RECORDING DATE-TIME | BROADCAST STATION NO. | RECORDING TIME (MIN) |
|---|---|---|---|---|
| P1 | DRAMA ABC | 2004/9/27 21:00 | 8 | 60 |
| P2 | DRAMA ABC | 2004/10/4 21:00 | 8 | 60 |
| P3 | DRAMA ABC | 2004/10/11 21:00 | 8 | 60 |
| P4 | SPORT PROGRAM | 2004/10/16 19:00 | 2 | 120 |
| P5 | DRAMA ABC | 2004/10/18 21:00 | 8 | 60 |
| P6 | DRAMA ABC | 2004/10/25 21:00 | 8 | 60 |
| P7 | MOVIE PROGRAM | 2004/10/29 21:00 | 10 | 120 |
| ... | ... | ... | ... | ... |

FIG.16

HISTORY MANAGEMENT TABLE — T110

| USER IDENTIFIER | 1 |
|---|---|
| HISTORY INFORMATION | P1 |
| | P2 |
| | P3 |
| | P4 |
| | P5 |
| | P6 |
| | ... |

HISTORY MANAGEMENT TABLE — T111

| USER IDENTIFIER | 2 |
|---|---|
| HISTORY INFORMATION | P1 |
| | P2 |
| | P4 |
| | P5 |
| | P6 |
| | P7 |
| | ... |

HISTORY MANAGEMENT TABLE — T112

| USER IDENTIFIER | 3 |
|---|---|
| HISTORY INFORMATION | P1 |
| | P2 |
| | P3 |
| | P5 |
| | P6 |
| | P7 |
| | ... |

HISTORY MANAGEMENT TABLE — T113

| USER IDENTIFIER | 4 |
|---|---|
| HISTORY INFORMATION | P1 |
| | P2 |
| | P3 |
| | P4 |
| | P5 |
| | P6 |
| | P7 |
| | ... |

FIG.17

DIALOG SEGMENT TABLE     T121

| PROGRAM ID | P1 | | | |
|---|---|---|---|---|
| | START POINT | END POINT | SOUND INTENSITY AT START POINT | SOUND INTENSITY AT END POINT |
| DIALOG SEGMENT11 | t11 | t12 | x11 | x12 |
| DIALOG SEGMENT12 | t13 | t14 | x13 | x14 |
| DIALOG SEGMENT13 | t15 | t16 | x15 | x16 |
| DIALOG SEGMENT14 | t17 | t18 | x17 | x18 |

DIALOG SEGMENT TABLE     T122

| PROGRAM ID | P2 | | | |
|---|---|---|---|---|
| | START POINT | END POINT | SOUND INTENSITY AT START POINT | SOUND INTENSITY AT END POINT |
| DIALOG SEGMENT21 | t21 | t22 | x21 | x22 |
| DIALOG SEGMENT22 | t23 | t24 | x23 | x24 |
| DIALOG SEGMENT23 | t25 | t26 | x25 | x26 |
| DIALOG SEGMENT24 | t27 | t28 | x27 | x28 |

DIALOG SEGMENT TABLE     T123

| PROGRAM ID | P3 | | | |
|---|---|---|---|---|
| | START POINT | END POINT | SOUND INTENSITY AT START POINT | SOUND INTENSITY AT END POINT |
| DIALOG SEGMENT31 | t31 | t32 | x31 | x32 |
| DIALOG SEGMENT32 | t33 | t34 | x33 | x34 |
| DIALOG SEGMENT33 | t35 | t36 | x35 | x36 |
| DIALOG SEGMENT34 | t37 | t38 | x37 | x38 |

FIG.18

DIALOG SEGMENT TABLE   T124

| PROGRAM ID | P5 | | | |
|---|---|---|---|---|
| | START POINT | END POINT | SOUND INTENSITY AT START POINT | SOUND INTENSITY AT END POINT |
| DIALOG SEGMENT41 | t41 | t42 | x41 | x42 |
| DIALOG SEGMENT42 | t43 | t44 | x43 | x44 |
| DIALOG SEGMENT43 | t45 | t46 | x45 | x46 |
| DIALOG SEGMENT44 | t47 | t48 | x47 | x48 |

DIALOG SEGMENT TABLE   T125

| PROGRAM ID | P6 | | | |
|---|---|---|---|---|
| | START POINT | END POINT | SOUND INTENSITY AT START POINT | SOUND INTENSITY AT END POINT |
| DIALOG SEGMENT51 | t51 | t52 | x51 | x52 |
| DIALOG SEGMENT52 | t53 | t54 | x53 | x54 |
| DIALOG SEGMENT53 | t55 | t56 | x55 | x56 |
| DIALOG SEGMENT54 | t57 | t58 | x57 | x58 |

FIG.19

WORKING TABLE ⟵ T130

| PROGRAM ID | PROGRAM NAME | RECORDING DATE-TIME | BROADCAST STATION NO. | RECORDING TIME (MIN) |
|---|---|---|---|---|
| P1 | DRAMA ABC | 2004/9/27 21:00 | 8 | 60 |
| P2 | DRAMA ABC | 2004/10/4 21:00 | 8 | 60 |
| P3 | DRAMA ABC | 2004/10/11 21:00 | 8 | 60 |
| P5 | DRAMA ABC | 2004/10/18 21:00 | 8 | 60 |
| P6 | DRAMA ABC | 2004/10/25 21:00 | 8 | 60 |

WORKING DIALOG SEGMENT LIST — T135

| | START POINT | END POINT | SOUND INTENSITY AT START POINT | SOUND INTENSITY AT END POINT |
|---|---|---|---|---|
| DIALOG SEGMENT11 | t11 | t12 | x11 | x12 |
| DIALOG SEGMENT12 | t13 | t14 | x13 | x14 |
| DIALOG SEGMENT13 | t15 | t16 | x15 | x16 |
| DIALOG SEGMENT14 | t17 | t18 | x17 | x18 |
| DIALOG SEGMENT21 | t21+60 | t22+60 | x21 | x22 |
| DIALOG SEGMENT22 | t23+60 | t24+60 | x23 | x24 |
| DIALOG SEGMENT23 | t25+60 | t26+60 | x25 | x26 |
| DIALOG SEGMENT24 | t27+60 | t28+60 | x27 | x28 |
| DIALOG SEGMENT31 | t31+120 | t32+120 | x31×1.5 | x32×1.5 |
| DIALOG SEGMENT32 | t33+120 | t34+120 | x33×1.5 | x34×1.5 |
| DIALOG SEGMENT33 | t35+120 | t36+120 | x35×1.5 | x36×1.5 |
| DIALOG SEGMENT34 | t37+120 | t38+120 | x37×1.5 | x38×1.5 |
| DIALOG SEGMENT41 | t41+180 | t42+180 | x41 | x42 |
| DIALOG SEGMENT42 | t43+180 | t44+180 | x43 | x44 |
| DIALOG SEGMENT43 | t45+180 | t46+180 | x45 | x46 |
| DIALOG SEGMENT44 | t47+180 | t48+180 | x47 | x48 |
| DIALOG SEGMENT51 | t51+240 | t52+240 | x51 | x52 |
| DIALOG SEGMENT52 | t53+240 | t54+240 | x53 | x54 |
| DIALOG SEGMENT53 | t55+240 | t56+240 | x55 | x56 |
| DIALOG SEGMENT54 | t57+240 | t58+240 | x57 | x58 |

FIG.26

RECORDED PROGRAM INFORMATION TABLE T1000

| PROGRAM ID | PROGRAM NAME | GENRE ID | RECORDING DATE-TIME | BROADCAST STATION NO. |
|---|---|---|---|---|
| 1 | DRAMA PROGRAM 1 | 003(DRAMA) | 2003/10/10 21:00 | 10 |
| 2 | CARTOON PROGRAM 1 | 004(CARTOON) | 2003/10/15 21:00 | 10 |
| 3 | DRAMA PROGRAM 2 | 003(DRAMA) | 2003/10/22 19:00 | 8 |
| 4 | MOVIE PROGRAM 1 | 002(MOVIE) | 2003/10/23 21:00 | 6 |
| 5 | MOVIE PROGRAM 2 | 002(MOVIE) | 2003/10/30 21:00 | 6 |
| 6 | NEWS PROGRAM 1 | 001(NEWS) | 2003/11/1 21:01 | 4 |
| ... | ... | ... | ... | ... |

PLAYBACK RULE
DETERMINATION TABLE

| GENRE ID | RULE ID |
|---|---|
| 001 | 001 |
| 002 | 004 |
| 003 | 003 |
| 004 | 002 |
| ⋮ | ⋮ |

FIG.28

PLAYBACK RULE INFORMATION TABLE T1020

| RULE ID | INFORMATION TYPE | PLAYBACK ORDER | PLAYBACK TIME |
|---|---|---|---|
| 001 | USER PROFILE INFORMATION 1 | ORDER OF IMPORTANCE | 00:10:00 |
| 002 | USER PROFILE INFORMATION 1 | CHRONOLOGICAL ORDER | 00:10:00 |
| 003 | VIEWERSHIP INFORMATION 1 | CHRONOLOGICAL ORDER | 00:10:00 |
| 128 | SUBTITLE APPEARANCE INFORMATION 2 | CHRONOLOGICAL ORDER | 00:50:00 |
| 325 | USER PROFILE INFORMATION 5 | ORDER OF IMPORTANCE | 00:10:00 |
| ... | ... | ... | ... |

USER PROFILE INFORMATION 1

| SEGMENT ID | OFFSET TIME | PLAYBACK TIME | IMPORTANCE VALUE |
|---|---|---|---|
| 1 | 00:00:00 | 00:03:00 | 30 |
| 2 | 00:10:00 | 00:01:00 | 25 |
| 3 | 00:20:00 | 00:05:00 | 45 |
| 4 | 00:30:00 | 00:03:00 | 5 |
| ⋮ | ⋮ | ⋮ | ⋮ |

T1031

USER PROFILE INFORMATION 5

| SEGMENT ID | OFFSET TIME | PLAYBACK TIME | IMPORTANCE VALUE |
|---|---|---|---|
| 1 | 00:00:00 | 00:01:00 | 2 |
| 2 | 00:10:00 | 00:04:00 | 38 |
| 3 | 00:20:00 | 00:05:00 | 40 |
| 4 | 00:30:00 | 00:02:00 | 10 |
| ⋮ | ⋮ | ⋮ | ⋮ |

T1032

VIEWERSHIP INFORMATION 1

| SEGMENT ID | OFFSET TIME | PLAYBACK TIME | IMPORTANCE VALUE |
|---|---|---|---|
| 1 | 00:00:00 | 00:02:00 | 15 |
| 2 | 00:10:00 | 00:05:00 | 40 |
| 3 | 00:20:00 | 00:03:00 | 25 |
| 4 | 00:30:00 | 00:03:00 | 30 |
| ⋮ | ⋮ | ⋮ | ⋮ |

T1033

SUBTITLE APPEARANCE INFORMATION 2

| SEGMENT ID | OFFSET TIME | PLAYBACK TIME | IMPORTANCE VALUE |
|---|---|---|---|
| 1 | 00:00:00 | 00:01:00 | 10 |
| 2 | 00:10:00 | 00:03:00 | 25 |
| 3 | 00:20:00 | 00:03:00 | 30 |
| 4 | 00:30:00 | 00:05:00 | 45 |
| ⋮ | ⋮ | ⋮ | ⋮ |

FIG.31

PLAYBACK SEQUENCE LIST T1040

| SEGMENT ID | OFFSET TIME | PLAYBACK TIME |
|---|---|---|
| 3 | 00:20:00 | 00:05:00 |
| 1 | 00:01:00 | 00:02:00 — T1041 |
| 2 | 00:10:00 | 00:01:00 |
| 4 | 00:30:00 | 00:02:00 — T1042 |

FIG.36

PLAYBACK RULE INFORMATION TABLE ~ T2020

| RULE ID | INFORMATION TYPE | PLAYBACK ORDER | PLAYBACK TIME |
|---------|------------------|----------------|---------------|
| 001 | USER PROFILE | ORDER OF IMPORTANCE | 00:10:00 |
| 002 | USER PROFILE | CHRONOLOGICAL ORDER | 00:10:00 |
| 003 | VIEWERSHIP INFORMATION 1 | CHRONOLOGICAL ORDER | 00:10:00 |
| 128 | SUBTITLE APPEARANCE INFORMATION 2 | CHRONOLOGICAL ORDER | 00:50:00 |
| 325 | USER PROFILE | ORDER OF IMPORTANCE | 00:10:00 |
| ... | ... | ... | ... |

FIG.37

| USER PROFILE INFORMATION 1 | | | | T2030 |
|---|---|---|---|---|
| USER ID | 1 | | | |
| SEGMENT ID | OFFSET TIME | PLAYBACK TIME | IMPORTANCE VALUE | |
| 1 | 00:00:00 | 00:03:00 | 30 | |
| 2 | 00:10:00 | 00:01:00 | 25 | |
| 3 | 00:20:00 | 00:05:00 | 45 | |
| 4 | 00:30:00 | 00:03:00 | 5 | |
| ⋮ | ⋮ | ⋮ | ⋮ | |

| USER PROFILE INFORMATION 2 | | | | T2031 |
|---|---|---|---|---|
| USER ID | 2 | | | |
| SEGMENT ID | OFFSET TIME | PLAYBACK TIME | IMPORTANCE VALUE | |
| 1 | 00:00:00 | 00:03:00 | 15 | |
| 2 | 00:10:00 | 00:01:00 | 55 | |
| 3 | 00:20:00 | 00:05:00 | 15 | |
| 4 | 00:30:00 | 00:03:00 | 25 | |
| ⋮ | ⋮ | ⋮ | ⋮ | |

| USER PROFILE INFORMATION 3 | | | | T2032 |
|---|---|---|---|---|
| USER ID | 3 | | | |
| SEGMENT ID | OFFSET TIME | PLAYBACK TIME | IMPORTANCE VALUE | |
| 1 | 00:00:00 | 00:03:00 | 10 | |
| 2 | 00:10:00 | 00:01:00 | 20 | |
| 3 | 00:20:00 | 00:05:00 | 25 | |
| 4 | 00:30:00 | 00:03:00 | 50 | |
| ⋮ | ⋮ | ⋮ | ⋮ | |

| USER PROFILE INFORMATION | | | |
| --- | --- | --- | --- |
| SEGMENT ID | OFFSET TIME | PLAYBACK TIME | IMPORTANCE VALUE |
| 1 | 00:00:00 | 00:03:00 | 45 |
| 2 | 00:10:00 | 00:01:00 | 80 |
| 3 | 00:20:00 | 00:05:00 | 60 |
| 4 | 00:30:00 | 00:03:00 | 30 |
| ⋮ | ⋮ | ⋮ | ⋮ |

CONTENT PLAYBACK APPARATUS

TECHNICAL FIELD

The present invention relates to a content playback apparatus that plays content, and in particular to a technique for efficiently grasping what the content is about.

BACKGROUND ART

A trend in recording and playback devices in recent years is the enhancement of various functions for assisting viewing by users. One such function is the creation and playback of digest video of moving picture content. Digest means a reduction of the original playback time of the moving picture content to a relatively short time, and digest video means video reduced to a relatively short amount of time. Using this function enables a two hour-long movie to be viewed in five or ten minutes, for instance.

One example of a method for creating digest video is the following. In a two-dimensional graph, the vertical axis represents the characteristic amount of sound intensity or viewership, and the horizontal axis represents a playback time axis. Threshold values are taken horizontally along the playback axis. Segments where the characteristic amount exceeds the threshold value are judged to be segments for use in the overview video, and the threshold values are modified so that the total time of the segments when concatenated is below a predetermined reference time. The approach taken toward feedback control for modifying the threshold values according to the total time is the crux of conventional digest video creation techniques.

DISCLOSURE OF THE INVENTION

Problem to be Solved by the Invention

However, although it is common to think of all digest video as being the same, different users have different preferences for digest video. A particular user may prefer to know the climax points of moving picture content in a short time, while another user may prefer to have an overview of the moving picture content while concealing the climax points. The only consideration in conventional digest video creation techniques, however, is fitting the digest into a predetermined reference time, and therefore user preferences are not reflected when creating moving picture content digest video. This is because the threshold values horizontal on the playback time axis can be said to have equal weighting is across the whole of the target. Data is obtained evenly from all targets of the moving picture content, and the digest video is created from this obtained data. For this reason, a user who is looking forward to the climax point of a serial drama may have their pleasure spoiled by being shown the climax point. On the other hand, a user who already has considerable background knowledge about the drama series may be forced to watch the drama series in duplicate by way of playback of the digest.

Hence, if the user is forced to view digest video that is contrary to his or her wishes, the user it likely to avoid use of the digest video playback function. This defeats the purpose of the existence of the digest video playback function.

The present invention was conceived in view of the stated problems, and has an object of providing a content playback apparatus, a content section obtaining method, and a content section obtaining-use computer program that obtain and play content sections from content according to an obtaining method that varies.

Means to Solve the Problem

In order to achieve the stated object, the present invention is a content playback apparatus that obtains a content section from content, and plays the obtained content section, the content playback apparatus including: a reference generation unit operable to generate a judgment reference that varies dynamically over a playback time axis of the content; and a content section obtaining unit operable to obtain the content section by comparing the content with the judgment reference.

Effects of the Invention

According to the stated structure, in the content playback apparatus, the judgment reference generated by the reference generating unit changes dynamically, and therefore a content section can be obtained according the an obtaining method that varies.

Here, the content may have a characteristic value that changes dynamically over the playback time axis, the judgment reference may be a threshold value group, and the content section obtaining unit may obtain a different piece of characteristic content from the content each time the characteristic value exceeds a threshold value in the threshold value group, and generate the content section from the at least one obtained piece of characteristic content.

According to the stated structure, the content playback apparatus is able to obtain the at least one characteristic content with use of the threshold value group. This enables the user to view a content section generated from characteristic contents having characteristic values that exceed the dynamically changing threshold values. Therefore, the content can be viewed efficiently.

Here, the content may be divided into a plurality of segments, each segment may be in correspondence with a different one of the threshold values in the threshold value group, and the content section obtaining unit may compare the characteristic value with the threshold value corresponding to the segment having the characteristic value, and when the characteristic value exceeds the compared threshold value, obtain, as a piece of characteristic content, a piece of content that composes the segment corresponding to the compared threshold value, and after performing the comparison and obtaining operations with respect to each of the segments, generate the content section from the at least one obtained piece of content.

According to the stated structure, the content playback apparatus is able obtain at least one piece of content existing in at least one segment that exceeds the threshold value, and generate the content section from the obtained at least one piece of content. By setting the threshold values to be lower than the characteristic value in the segments that the user wishes to view, the content playback apparatus is able to obtain pieces of content existing in the segments desired by the user, and includes the obtained pieces of content in the content section.

Here, the reference generation unit may generate the threshold value group using a threshold value generation function for determining the threshold value with respect to each segment, and the content section obtaining unit, with respect to each segment, may compare the characteristic value with the threshold value determined with respect to the segment using the threshold value generation function.

According to the stated structure, the content playback apparatus is able to generate the threshold value group composed of the threshold values determined by the threshold value generation function.

Here, the threshold value generation function may have a property of monotonic increase and/or monotonic decrease on part of a domain with respect to the playback time axis, the reference generation unit may calculate the threshold values in the threshold value group by, with respect to each segment, substituting, as an input value, a playback time of the segment on the playback time axis into the threshold value generation function, and, after performing the calculation operation with respect to each segment, generate the threshold value group from the calculated threshold values, and the content section obtaining unit may compare, with respect to each segment, the characteristic value with the threshold value calculated with respect to the segment using the threshold value generation function.

According to the stated structure, the content playback apparatus is able to calculate the threshold values using the threshold value generation function. For example, in the case of the threshold generation function has only a property of monotonic increase, on the playback time axis of the target content, the threshold value is a low value directly after the commencement of playback, and increases as the playback time progresses. As a result, the content section generated by the content playback apparatus is composed principally of pieces of content that exist in at least one segment in the former half of the content. This is advantageous for a user who wishes to view the former half principally. Furthermore, for example, in a case in which the threshold generation function has only a property of monotonic decrease, the content section generated by the content playback apparatus is composed principally of pieces of content that exist in at least one segment in the latter half of the content. This is advantageous for a user who wishes to view the latter half principally.

Here, the content section obtaining unit may store a predetermined reference time as a playback time of the content section, judge whether or not a total playback time of the at least one obtained piece of characteristic content is below the reference time, and when the total playback time is judged to be below the reference time, arrange the at least one obtained piece of characteristic content in an order in which the at least one obtained piece of characteristic content was obtained, thereby generating the content section.

According to the stated structure, the content playback apparatus is able to generate a content section whose playback time is below the reference time.

Here, the reference generation unit may hold the threshold value generation function expressed as a polynomial function of degree 1, and the content playback apparatus may further include: a control unit operable to, when the total playback time is judged by the content section obtaining unit to exceed the reference time, control so as to cause the reference generation unit to increase a value of a constant of proportion and/or intercept in the polynomial function of degree 1, thereby modifying the threshold value generation function, cause the content section obtaining unit to perform an operation for obtaining at least one piece of content using the modified threshold generation function, and cause the reference generation unit to perform an operation for increasing the constant and the content section obtaining unit to perform an operation for obtaining at least one piece of content, until the total playback time of the obtained at least one piece of content is below the reference time.

According to the stated structure, the content playback apparatus is able to generate a content section whose playback time is below the reference time by modifying the threshold value function.

Here, the characteristic value may be an: importance value that shows viewing worth of the corresponding segment, each threshold value may show a lower limit for allowing viewing of the corresponding segment, and the content segment obtaining unit may compare, for each segment, the importance value corresponding to the segment with the threshold value.

According to the stated structure, the content playback apparatus is able to generate a content section by comparing the importance value and threshold value in each segment. Accordingly, the content playback apparatus is able to generate a content section from at least one piece of content that exists in a segment that has an importance value that exceeds the threshold value.

Here, viewership may have been measured for each segment in the content, and each importance value may be set in advance based on results of measured viewership for the corresponding segment, such that the higher the viewership is, the higher the importance value is, and the content section obtaining unit may compare, for each segment, the importance value that is based on the viewership with the threshold value.

According to the stated structure, the content playback apparatus is able to generate a content section from at least one piece of content that exists in a segment that has an importance value that, based on viewership, exceeds the threshold value.

Here, the content may include at least moving images, each importance value may be set in advance based on duration of appearance of subtitles in the corresponding segment, such that the longer a time for which subtitles appear, the higher the importance value is, and the content section obtaining unit may compare the importance value that is based on the subtitle appearance time with the corresponding threshold value.

According to the stated structure, the content playback apparatus is able to generate a content section from at least one piece of content that exists in a segment that has an importance value that, based on duration of appearance of subtitles, exceeds the threshold value.

Here, each importance value may be set in advance in accordance with a preference of a user who is to view the content, such that the higher the preference of the user, the higher the importance value is, and the content section obtaining unit may compare the importance value that is based on the preference of the user with the corresponding threshold value.

According to the stated structure, the content playback apparatus is able to generate a content section from at least one piece of content that exists in a segment that has an importance value that, based on a user preference, exceeds the threshold value.

Here, the content may include least moving images, each importance value may be set in advance based on a length of time of appearance of a predetermined performer in the corresponding segment, such that the longer the time for which the performer appears, the higher the importance value is, and the content section obtaining unit may compare the importance value that is based on the length of time for which the performer appears with the corresponding threshold value.

According to the stated structure, the content playback apparatus is able to generate a content section from at least one piece of content that exists in a segment that has an importance value that, based on a length of time of appearance of a predetermined performer, exceeds the threshold value.

Here, the content may include at least audio, the characteristic value may be an audio level of the corresponding segment, the segment may be a dialog segment that has an audio level of at least a prescribed value, and is of a predetermined length of time, and the content section obtaining unit may compare the audio level of the dialog segment with the threshold value.

According to the stated structure, the content playback apparatus is able to generate a content section from at least one piece of content that exists in a segment having an audio level that exceeds the threshold value.

Here, the content may be composed of content of a plurality of television programs that are related to each other as components of one series, and that have been broadcast up to a present time, each television program content may be divided into a plurality of segments, the threshold generation function may have a property of monotonic decrease that changes such that the threshold values decrease in accordance with an order in which the plurality of television programs were broadcast, and the content section obtaining unit may compare, with respect to each segment, the characteristic value in the segment included in the program content with the threshold value calculated using the threshold value generation function.

According to the stated structure, with respect to the plurality of broadcast television programs, the threshold value is lower, the more recently the television program was broadcast, and therefore the content playback apparatus is able to generate a content section that principally includes at least one piece of content that exists in a segment of a recently broadcast television program. Accordingly, the user is able to check an outline of the plurality of television programs broadcast so far.

Here, the content section obtaining unit may (a) store, in advance, a viewing history that shows which of the plurality of television program contents the user has viewed, (b) judge, based on the viewing history, whether an unviewed television program content that the user has not yet viewed exists among the plurality of television program contents, and (c) when an unviewed television program content is judged to exist, increase the characteristic values corresponding to the plurality of segments in the unviewed television program content, and compare the increased characteristic values with the corresponding threshold values.

According to the stated structure, using the viewing history, in a case in which unviewed television program content exists, the content playback apparatus is able to modify the characteristic value in each of the segments of that television program content to be greater. Accordingly, the content playback apparatus as able to generate a content section principally from at least one piece of content that exists in a segment in the unviewed television program content.

Here, the content section may be obtainable by any of a plurality of types of methods, the content playback apparatus may further include: a receiving unit operable to receive, from a user, a designation of one of the types of methods; a function storage unit operable to pre-store a plurality of threshold value functions that correspond respectively to the plurality of types of methods; and a function selection unit operable to select, based on the received type of method, a threshold generation function for generating the threshold values, and the reference generation unit may generate the threshold value group with use of the threshold value generation function selected by the function selection unit.

According to the stated structure, the content playback apparatus is able to select, from among a plurality of types, one type of threshold generation function received from the user. Accordingly, the content playback apparatus is able to generate a content section according to the obtaining method desired by the user, with use of the selected threshold value function. In other words, the user is able to view a content section according to his/her viewing purpose.

Here, each segment may have a plurality of characteristic values that each reflect a different one of preferences, each preference being of a different one of a plurality of users, the receiving unit may further receive at least some user IDs from among a plurality of user IDs that have been assigned respectively to the plurality of users, the received user IDs being those assigned to users who, among the plurality of users, wish to view the content section, and the content section obtaining unit may (a) pre-store a plurality of user profiles in correspondence with the content, each user profile corresponding to a different one of the plurality of users and including, for each segment, a characteristic value that corresponds to the user, (b) obtain, for each received user ID, the corresponding user profile, (c) generate, based on the obtained user profiles, a common profile that includes a common characteristic value for each segment, each common characteristic value corresponding to a common preference of the users, and (d) using the common characteristic values in the generated common profile as the respective characteristic values for the segments, compare, with respect to each segment, the characteristic value in the segment with the threshold value corresponding to the characteristic value.

According to the stated structure, using a plurality of common characteristic values corresponding to common preference of a plurality of users and the threshold value corresponding to each common characteristic value, the content playback apparatus is able to generate a content section principally from at least one piece of content that exists in a segment correspond to the common preference of the plurality of users.

Here, the characteristic value may be an importance value that shows a viewing worth of the corresponding segment, each common characteristic value may be a common importance value that shows a viewing worth of the corresponding segment and that reflects the common preference of the users, and the content section obtaining unit may calculate each common characteristic value with use of an importance value calculation function, the importance value calculation function using the importance values that correspond to the segments respectively as input values.

According to the stated structure, the content playback apparatus calculates a common importance value with respect to the common preference of a the plurality of users, using the importance value calculation function. Therefore, the content playback apparatus is able to generate a content section from at least one piece of content that exists in a segment that corresponds to the common preference of the plurality of users.

Here, the importance value calculation function may calculate a total of input importance values.

According to the stated structure, the content playback apparatus is able to use the calculated common importance value as a total of the importance values corresponding to each segment.

Here, the content section obtaining unit may generate the content section by connecting pieces of content in descending order of common importance values corresponding to the segments in which the pieces of content exist.

According to the stated structure, the content playback apparatus generates the content section by connecting segments in descending order of their respective common importance values. Therefore, the content playback apparatus is able to play the pieces of content in descending order of the common importance values of the segments in which they exist.

Here, the content playback apparatus may be connected to another content playback apparatus over a network, and further include: a transmission unit operable to transmit the content section to the other content playback apparatus over the network.

According to the stated structure, the content playback apparatus is able to transmit the content section to another content playback apparatus that is connected to a network. Accordingly, the other content playback apparatus is able to play the received content section.

Here, the network may be a home network.

According to the stated structure, the content playback apparatus is able to transmit the content section to another content playback apparatus via a home network.

Here, the content playback apparatus may further include: a contents storage unit operable to store, in advance, one or more recorded contents that are candidates for being the content; and a content selection unit operable to select one recorded content from among the one or more candidate recorded contents, and set the selected recorded content as the content.

According to the stated structure, the content playback apparatus is able to generate the content section from one recorded content among a plurality of recorded contents.

Here, the content storage unit may store a plurality of recorded content, the content playback apparatus may further include: a viewer history storage unit operable to store in advance, respectively for each user, a viewing history showing at least one viewed television program content, and the content selection unit may select, in accordance with the viewing histories, one recorded content that at least one user has not viewed, from among the plurality of recorded contents stored in the content storage unit.

According to the stated structure, the content playback apparatus is able to generate the content section from recorded content that is unviewed.

Here, each user profile further may include an age of the corresponding user, the content storage unit may store a plurality of recorded content, at least one of the plurality of recorded contents may have been assigned a parental lock for prohibiting viewing by a user who is below predetermined age, the content playback apparatus may further include: a judgment unit operable to judge, based on the ages of the users in the user profiles, whether or not the at least one recorded content to which the parental lock is assigned is permitted to be viewed, and the content selection unit, when the at least one recorded content to which the parental lock is assigned is judged to not be permitted to be viewed, may remove the at least one recorded content to which the parental lock is assigned from being a candidate for the content and selects one recorded content from remaining recorded contents, and when the at least one recorded content to which the parental lock is assigned is judged to be permitted to be viewed, select the one recorded content from among a plurality of recorded contents that includes the at least one recorded content to which the parental lock is assigned.

According to the stated structure, the content playback apparatus is able to exclude recorded content that, according to a parental lock, has been set as being prohibited from being viewed, from being a target of content section generation.

Accordingly, the content playback apparatus is able to prevent a content section of recorded content that should not be viewed by a user under a predetermined age from being viewed by that user.

BRIEF DESCRIPTION OF THE DRAWINGS

FIG. 3 shows an example of dialog segment list 31;

FIG. 5 shows a playback segment 41 in a case of search playback and a playback segment 42 in a case of overview playback;

FIG. 6 shows an example of a preset recording screen 51;

FIG. 7 shows an example of a program navigation screen 61;

FIG. 9 is an operational diagram of when the search evaluation function is moved downward;

FIG. 10 is an operational diagram of when the search evaluation function is rotated in a clockwise direction;

FIG. 15 shows an example of the data structure of a television program management table T100;

FIG. 16 shows an example of the data structure of history management tables T110, T111, T112, and T113;

FIG. 17 shows an example of the data structure of dialog segment tables T121, T122, and T123;

FIG. 18 shows an example of the data structure of dialog segment tables T124 and T125;

FIG. 19 shows an example of the data structure of a working table T130;

FIG. 20 shows an example of the data structure of a working dialog segment list T135;

FIG. 26 shows an example of the data structure of a recorded program information table T1000;

FIG. 27 shows an example of the data structure of a playback rule determination table T1010;

FIG. 28 shows an example of the data structure of a playback rule information table T1020;

FIG. 29 shows an example of the data structure of playback segment management information tables T1030, T1031, T1032 and T1033;

FIG. 31 shows an example of the data structure of a playback sequence list T1040;

FIG. 36 shows an example of the data structure of playback rule information table T2020;

FIG. 37 shows an example of the data structure of pieces of playback segment management information T2030, T2031, and T1032;

FIG. 38 shows an example of the data structure of a piece of playback segment management information T2033 created from pieces of playback segment management information T2030 and T2031;

DESCRIPTION OF NUMERIC REFERENCES

Figure 1:
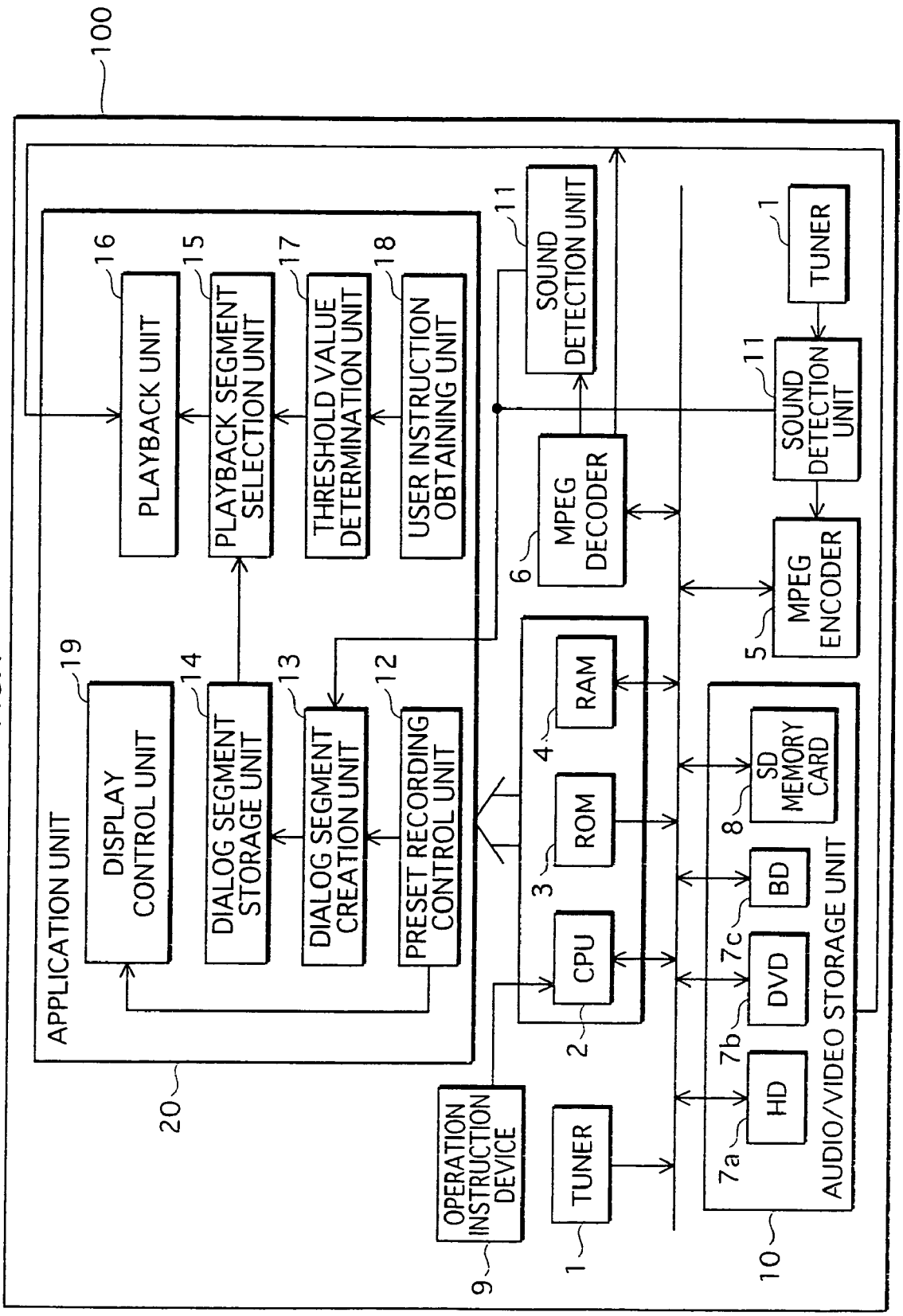
FIG. 1 is a block diagram showing the structure of a recording/playback apparatus 100.

1 Tuner
2 CPU
3 ROM
4 RAM
5 MPEG encoder
6 MPEG decoder
7a HD
7b DVD
7c BD
8 SD memory card
9 Operation instruction device
10 Audio/video storage unit
11 Sound detection unit
12 Recording preset control unit
13 Segment creation unit
14 Segment storage unit
15 Playback segment selection unit
16 Playback unit
17 Threshold value determination unit
18 User instruction obtaining unit
19 Display control unit
20 Application unit
100 Recording/playback apparatus
1000 Video recording/playback system
1010 Broadcast station
1020 Video playback apparatus
1030 Display apparatus
1040 Server apparatus
1201 Broadcast reception unit
1202 Video content storage unit
1203 Program information table generation unit
1204 Playback information reception unit
1205 Playback rule storage unit
1206 Playback segment management information storage unit
1207 Determination unit
1208 User instruction obtaining unit
1209 Playback unit
1210 Clock unit

BEST MODE FOR CARRYING OUT THE INVENTION

1. First Embodiment

The following describes a first embodiment of a recording/playback apparatus 100 of the present invention with reference to the drawings. FIG. 1 shows the internal structure of the recording playback apparatus 100 of the present invention.

As shown in FIG. 1, the recording/playback apparatus 100 is composed of a tuner 1, a CPU 2, a ROM 3, a RAM 4, an MPEG encoder 5, an MPEG decoder 6, an operation instruction device 9, an audio/video storage unit 10, and a sound detection unit 11.

<Tuner 1>

The tuner 1 performs reception processing of television programs. In the case of an analog broadcast, on receiving the television program, the tuner 1 outputs an audio signal to the sound detection unit 11. In the case of a digital broadcast, the tuner 1 reads television program data from the audio/video storage unit 10, and after the MPEG decoder 6 converts the television program data to an analog format, outputs an audio signal to the sound detection unit 11. A video signal is superimposed with a navigation screen, an information screen or the like by the display control unit 19. This enables the television program video output by the tuner 1 or the MPEG decoder 6 to be displayed with an operation screen, such as a recording preset or program navigation screen, superimposed thereon.

<CPU 2, ROM 3 and RAM 4>

The CPU 2, the ROM 3 and the RAM 4 compose a computer system which achieves its functions by programs stored in the ROM 3 being read by the CPU 2, and cooperation between the programs and hardware resources.

<MPEG Encoder 5>

The MPEG encoder 5 performs A/D conversion of a received television program, and compression encodes the converted television program in compliance with the MPEG 2 format, to further convert the television program to MPEG 2 format.

<MPEG Decoder 6>

The MPEG decoder 6 decodes compression encoded television program data, and performs D/A conversion of the decoded television program data, to further convert the television program data into an analog television program.

<Operation Instruction Device 9>

The operation instruction device 9 receives instructions relating to special playback and the like from the user. Here, special playback denotes playing audio and video that is a part of a recorded television program in a shorter time that the recording time of the television program. Note that audio and video played in special playback is content made up of audio and moving images.

Figure 2:
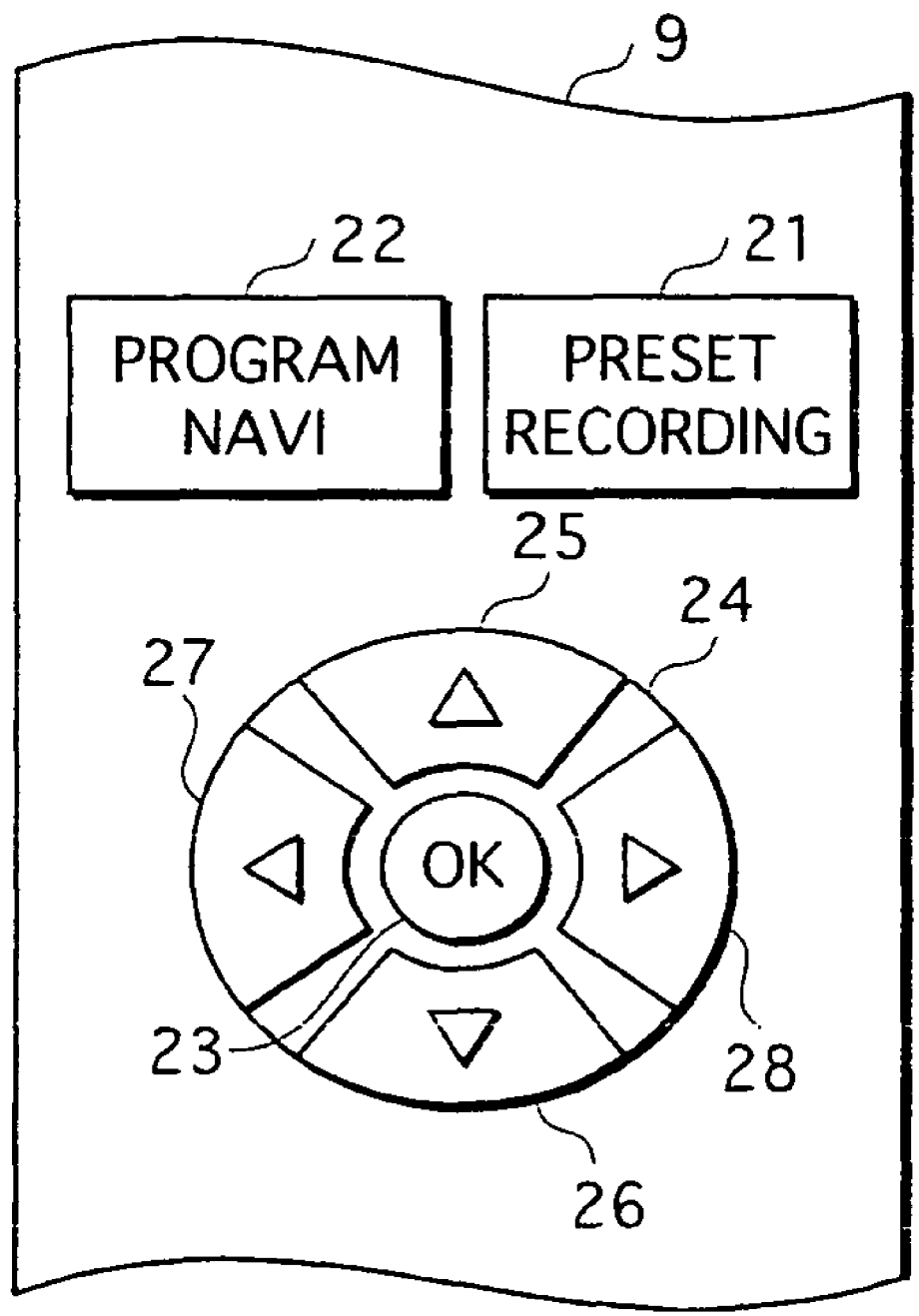
FIG. 2 is a schematic drawing of a remote control.

FIG. 2 shows an example of a button arrangement of a remote control that is one example of the operation instruction device 9. Here, an outline of operations by the recording/playback device 9 with respect to button operations is given. Note that FIG. 2 shows only the part of the button arrangement necessary for operating the recording/playback device 100. The remote control includes a recording preset key 21, a program navigation key 22, an OK key 23, and directional keys 24. The recording/playback apparatus 100 has operation modes including "recording preset mode" and "program navigation mode". Recording preset mode is for inputting the broadcast channel, start time and end time of a television program to be recorded, as well as whether or not to create video for use in special playback, the type of special playback, an so on. The recording/playback apparatus 100 moves into this mode by the recording preset button being pressed. The program navigation mode is for displaying a program navigation list. The recording/playback apparatus 100 moves into this mode by the program navigation button being pressed. An up button 25, a down button 26, a left button 27, a right button 28, and the OK key 23 are used in recording preset mode and program navigation mode for operations such as input of preset information and selection of television programs to be viewed.

<Audio/Video Storage Unit 10>

The audio/video storage unit 10 includes an HD 7a, a DVD 7b, a BD 7c, and an SD memory card 8. The HD 7a, the DVD 7b, the BD 7c, and the SD memory card 8 perform reading and writing of television programs. Reading and writing includes processing for writing a television program that is sent from the MPEG encoder 5 via a bus to any of the HD 7a, the DVD 7b, the BD 7c and the SD memory card 8, and processing for reading a television program that is recorded on any of the HD 7a, the DVD 7b, the BD 7c and the SD memory card 8 and sending the read television program to the bus. The DVD 7b, which is a removable recording medium, is a rewritable DVD such as a DVD-RAM, a DVD-RW, or a DVD+RW, or a writable DVD such as a DVD-R or a DVD+R.

<Sound Detection Unit 11>

The sound detection unit 11 detects sound segments and silent segments, an outputs the detected segments to the dialog segment creation unit 13.

This completes the hardware construction of the recording/playback device 100. The following describes the application unit 20.

<Application Unit 20>

The application unit 20 is a concrete means achieved by cooperation between an application program and the hardware, and, as shown in FIG. 1, includes a recording preset control unit 12, the dialog segment creation unit 13, a dialog segment storage unit 14, a playback segment selection unit 15, a playback unit 16, a threshold value determination unit 17, a user instruction obtaining unit 18, and a display control unit 19.

<Recording Preset Control Unit 12>

The recording preset control unit 12 performs control relating to a series of processes for recording presetting.

<Dialog Segment Creation Unit 13>

The dialog segment creation unit 13 obtains dialog segments from an audio signal that has been divided into sound segments and silent segments. Dialog segments do not include segments in which there is BGM (background music), but include segments that have only dialog. Before obtaining dialog segments, the dialog segment creation unit 13 first removes CM (commercial message) segments. There is a tendency for silent segments to occur in regular intervals, such as intervals of 15 seconds, 30 seconds or 45 seconds between CM segments, and therefore, when silent segments occur in regular segments, the dialog segment creation unit 13 judges those segments to be CM segments, and excludes them. In segments where BGM and dialog overlap, there is a tendency for the sound to last for a relatively long time, and therefore, when a sound segment is longer than a predetermined time, the dialog segment creation unit 13 judges that the segment is one in which BGM and dialog overlap. Furthermore, when a sound segment is shorter than a set time, the dialog segment creation unit 13 judges the segment to be sound effects. In both cases, the dialog segment creation unit 13 excludes the segments. As a result, the dialog segment creation unit 13 obtains only dialog that has a regular segment. Next, the dialog segment creation unit 13 uses each of the obtained segments as candidates for playback segments for special playback, and creates a start time, an end time, and a characteristic amount of each dialog segment as a dialog segment list 31. FIG. 3 shows an example of the dialog segment list 31. Note that the procedure for obtaining dialog segments is described more specifically later.

<Dialog Segment Storage Unit 14>

The dialog segment storage unit 14 stores the created dialog segment list 31.

<Playback Segment Selection Unit 15>

Figure 4:
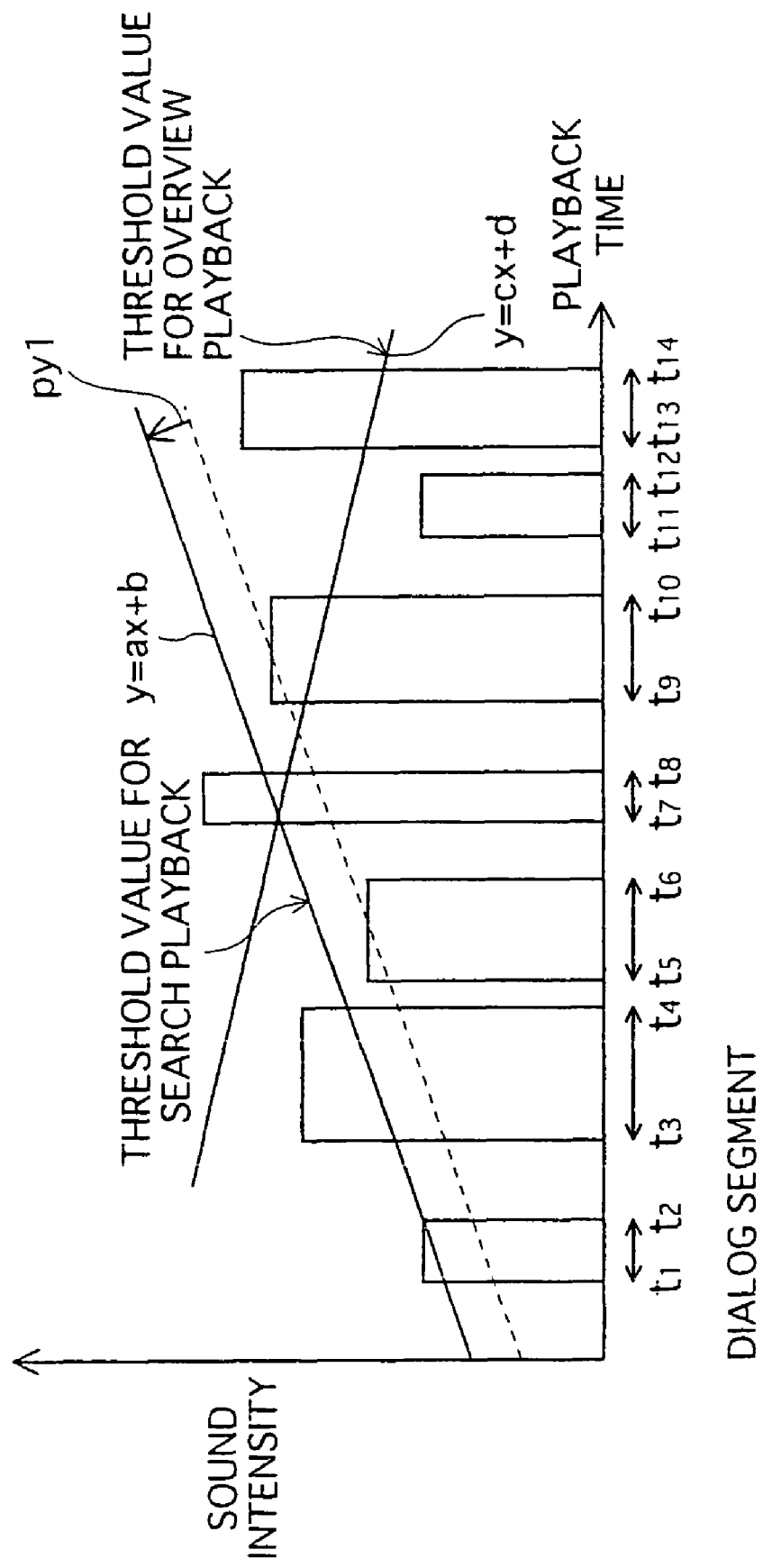
FIG. 4 shows an example of selection of playback segments.

The playback segment selection unit 15 selects dialog segments to be used in video to be played in special playback (hereinafter, this video is referred to as digest video), using the input dialog segment list 31 and a threshold value function. FIG. 4 shows an example of playback segment selection. The x axis is playback time and the y axis is sound intensity. The rectangular shapes in FIG. 4 represent data of the dialog segment list 31 in FIG. 3 displayed on the graph. Polynomial functions of degree 1 (y=ax+b, y=cx+d) in FIG. 4 are for finding the threshold values. Here, types of special playback are search playback and overview playback. Search playback is special playback for searching for a television program for viewing from among a plurality of recorded television programs. Overview playback is for viewing an overview of a recorded television program in order to grasp the contents of the television program.

By making the function slope upward in the case of search playback, the threshold values are lower in the former part than in the latter part, the former part being the range on which emphasis is placed in special playback. Conversely, by making the function slope downward in overview playback, the threshold values are lower in the latter part, the latter part being the range on which emphasis is placed in special playback. In this way, by using a polynomial function of degree 1 such as y=ax+b to weight instead of finding the threshold values horizontally along the playback time axis, a particular part can be made to be the range on which emphasis is placed in special playback. When the total time of the segments whose sound intensity exceed the threshold values exceeds a predetermined reference time, the function is moved in parallel as shown by the arrow py1 in FIG. 4, in other words the value of the constant b is increased, so as to vary the threshold values, and adjusted such that the total time falls below the predetermined reference value. Note that in the case of moving the function y=cx+d in parallel, the value of the constant d is increased. The dialog segments selected as playback segments in the case of search playback and the dialog segments selected as playback segments in the case of overview playback in FIG. 4 are as shown in FIG. 5. The at least one dialog segments selected in this way are playback segments. Hence, special playback in the embodiment is specified by the start points and end points of the dialog segments selected as playback segments, and the portions of the moving picture content that correspond to these. A specific processing procedure of the playback segment selection unit 15 is described later. Note that in the following, in order to differentiate between the threshold value function used for search playback and the threshold value function used for overview playback, the threshold value function used for search playback is also referred to as a search evaluation function, and the threshold value function used for overview playback is also referred to as an overview evaluation function.

<Playback Unit 16>

The playback unit 16 plays audio and video that correspond to the dialog segments selected by the playback segment selection unit 15 (in other words, the playback segments). The playback unit 16 plays audio and video of recorded television programs.

<Threshold Value Determination Unit 17>

The threshold value determination unit 17 determines the threshold value function according to an input type of special playback and time (the time for which special playback is to be performed), and outputs the determined threshold value function to the playback segment selection unit 15.

Furthermore, the threshold value determination unit 17 determines the function displayed by the display control unit 19 to be the threshold value function to be used in selection of playback segments, and outputs the determined threshold value function to the playback segment selection unit 15.

<User Instruction Obtaining Unit 18>

The user instruction obtaining unit 18 receives the special playback type, time, and so on, transmitted from the operation instruction device 9.

<Display Control Unit 19>

The display control unit 19 displays a recording preset screen, a program navigation screen, and the like. The following describes these screens with the inclusion of specific examples. FIG. 6 shows the screen structure in recording preset mode, and FIG. 7 shows the screen structure in program navigation mode. In the recording preset screen in FIG. 6, the user inputs the channel, recording mode, the start time, the end time, and the like, of the television program to be recorded. In addition, if the user wishes to have digest video created of the television program for which the recording presetting is being made, the user enters a check in a digest video creation check box. Next, the user selects the desired type of special playback. Both types of special playback may be selected. Special playback is created during recording of the television program if a check has been entered therefore. When a program navigation list is displayed as shown in FIG. 7, a search button and/or an overview button are displayed for programs for which a check has been entered for digest video creation at the time of presetting recording. If the OK key is pressed when one of the buttons is in a focused state, the special playback corresponding to the button is performed. Here, being in a focused state refers to a state in which the button has been designated as a target of operation according to the direction keys 24 of the remote control. In addition, during special playback, the display control unit 19 displays which type of digest video is currently being played. The type of special playback may be switched during special playback.

Figure 8:
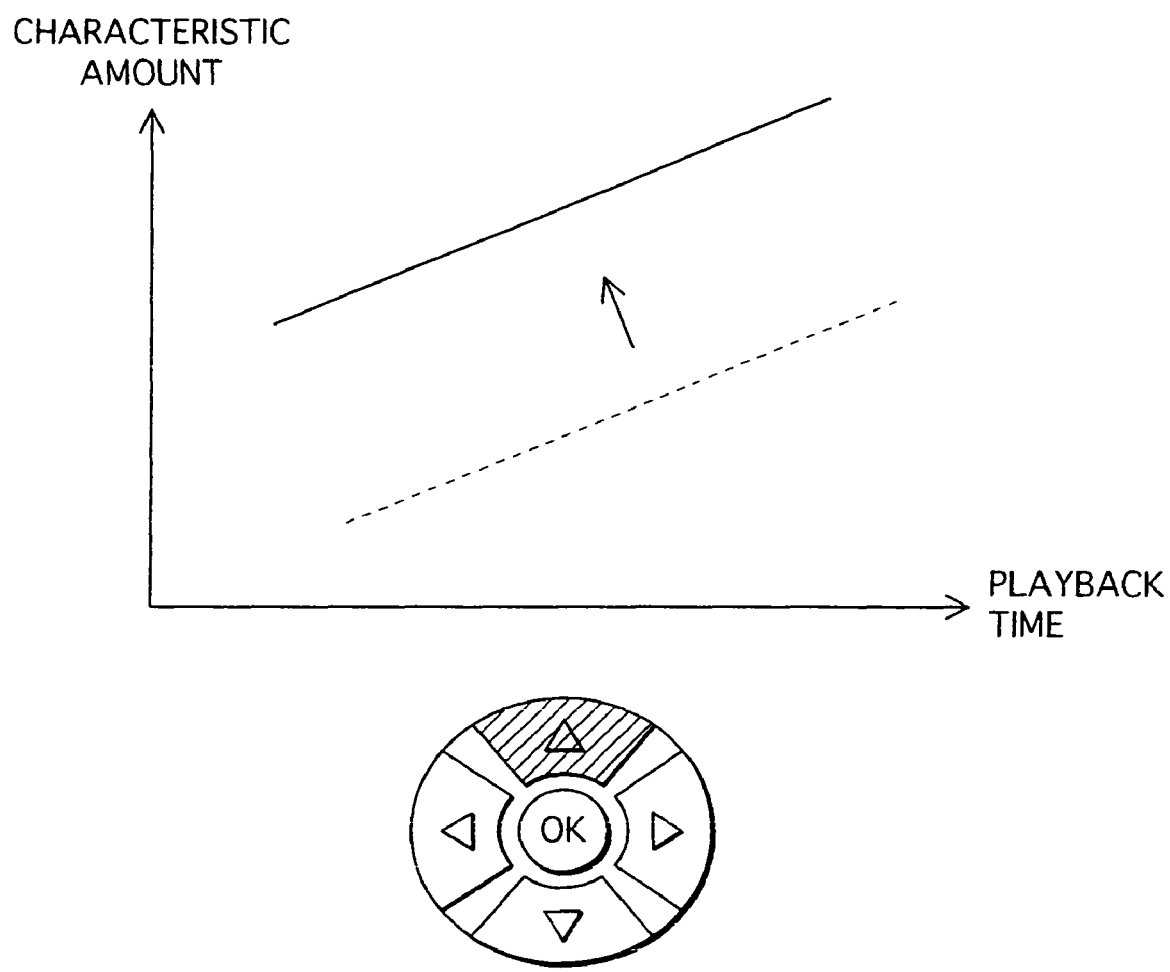
FIG. 8 is an operational diagram of when a search evaluation function is moved upward.

The playback control unit 19 further displays the threshold value function graph, and is able to modify the graph in coordination with a modification operation from the user. Here, there are two types of graph modification operations, one being an operation to move the function up and/or down while maintaining the slope of the function, and the other being for rotating the function with the central coordinates as a pivot point, to modify the slope of the function. To perform the former operation, first, the OK key 23 is pressed over the threshold value function, and then, as shown in FIG. 8, when the up button 25 is pressed, the function moves upward while the slope is maintained. Furthermore, as shown in FIG. 9, when the down button 26 is pressed, the function moves downward. To perform the latter operation, first, the OK key 23 is pressed twice over the threshold value function, and then the slope is modified by pressing the up button 25 or the down button 26. If the up button 25 is pressed, the function rotates is an anti-clockwise direction on the pivot point. If the down button 26 is pressed, the function moves in a clockwise direction. FIG. 10 shows how the function changes when rotated in the clockwise direction.

At this time, the display control unit 19 calculates the slope "a" and the intercept "b" of the threshold value function (for example, "y=ax+b") based on the modification operation, and displays the threshold value function based on the result of the calculation.

When the OK key 23 is pressed by the user after the threshold value function has been modified, the display control unit 19 outputs the threshold value function that has been modified based on the modification operation to the threshold value determination unit 17. Hence, the threshold value determination unit 17 is able to determine the threshold value function, which has been modified by the user, to be the function to be used in selection of playback segments.

Furthermore, the display control unit 19 displays a thumbnail button which is for displaying a list of thumbnails of each dialog segment of a television program for which digest video has been created. If the OK button is pressed when the thumbnail button is in the focused state, the thumbnail list is displayed, and the selected arbitrary thumbnail is played.

<Processing by the Dialog Segment Creation Unit 13>

Figure 11:
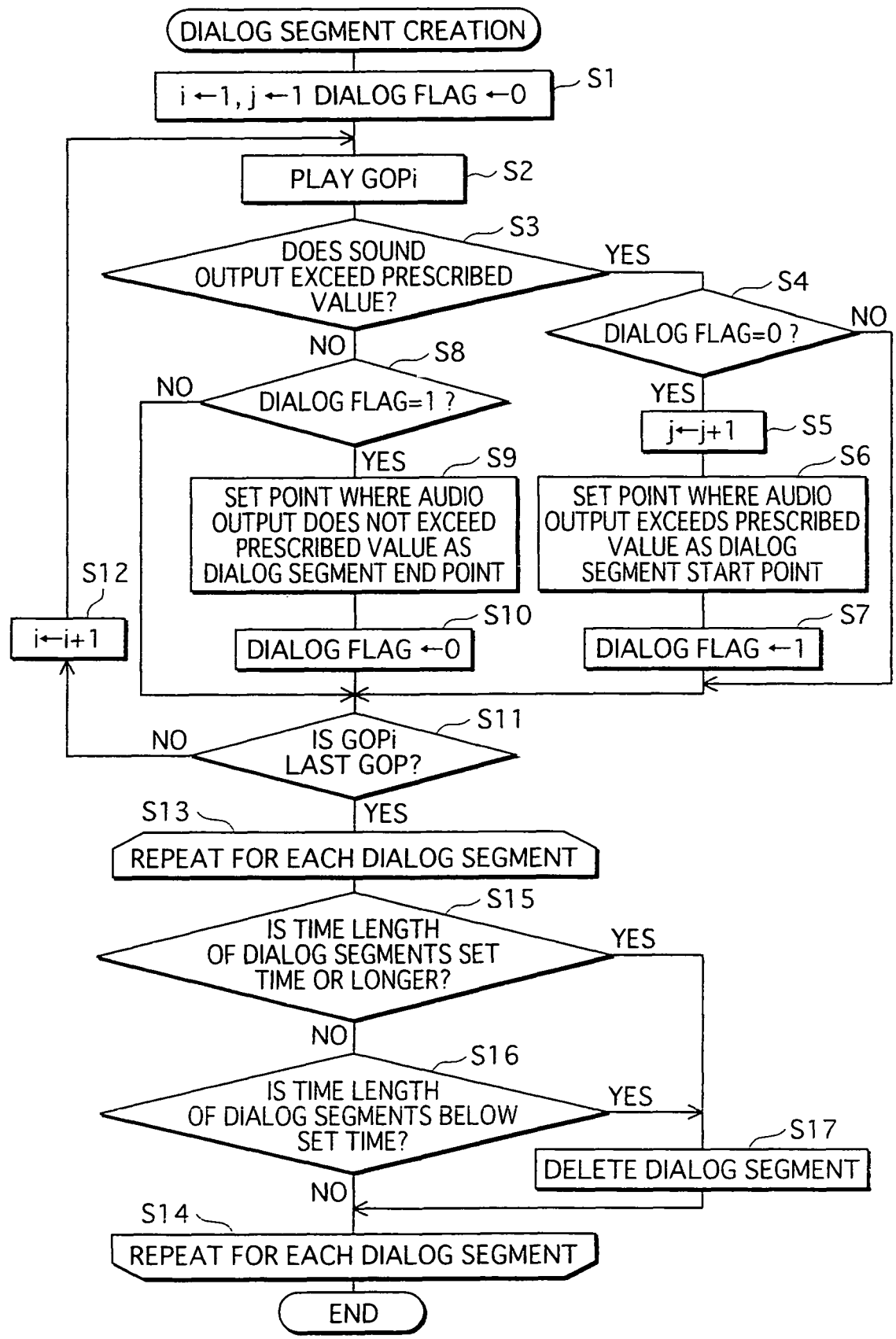
FIG. 11 is a flowchart showing operations of processing by a dialog segment creation unit 13.

The following describes processing by the dialog segment creation unit 13, with use of the flowchart in FIG. 11. In the present flowchart, i is a variable for designating a GOP (Group of Pictures) that is a target of playback, and j is a variable for specifying one dialog segment. A dialog flag is a flag for determining whether or not to generate a dialog segment. Step S2 through to step S12 in the present flowchart compose loop processing. The control variable of this loop processing is i, and the requisite for ending this loop processing is that i indicates a last GOP. This loop processing is for playing a $GOP_i$ (step S2), judging whether or not the output audio thereof exceeds a prescribed value (step S3), and executing the processing at step S4 to step S7 or step S8 to S10 depending on the judgment.

First, the dialog segment creation unit 13 performs initialization to set the variable i and the variable j to 1, and the dialog flag to 0 (step S1).

Next, the dialog segment creation unit 13 plays a $GOP_1$ (step S2), and judges whether the output audio at that time exceeds the prescribed value (step S3). When the output audio is judged to exceed the prescribed value ("YES" at step S3), the dialog segment creation unit 13 judges whether or not the dialog flag is 0 (step S4).

When the dialog flag is judged to be 0 ("YES" at step S4), the dialog segment creation unit 13 adds one to j (step S5), sets the point at which the prescribed value was exceeded to be the dialog segment start point (step S6), and sets the dialog flag to 1 (step S7). The dialog segment creation unit 13 then judges whether or not the $GOP_i$ is the last GOP (step S11). When the dialog flag is judged to not be 0 ("NO" at step S4), the dialog segment creation unit 13 proceeds directly to step S11.

When the output audio is judged not to exceed the prescribed value ("NO" at step S3), the dialog segment creation unit 13 judges whether or not the dialog flag is 1 (step S8). When the dialog flag is judged to be 1 ("YES" at step S8), the dialog segment creation unit 13 sets a point where the prescribed value is not exceeded to be the end point of the dialog segment (step S9), and sets the dialog flag to 0 (step S10). When the dialog flag is judged to not be 1 ("NO" at step S8), the dialog segment creation unit 13 proceeds directly to step S11. The dialog segment creation unit 13 then judges whether or not the GOP$_i$ is the last GOP (step S11), and when the GOP$_i$ is judged not to be the last GOP ("NO" at step S11), the dialog segment creation unit 13 adds 1 to i (step S12), and plays the next GOP (step S2). When the GOP$_i$ is judged to be the last GOP ("YES" at step S11), the dialog segment creation unit 13 repeats the processing from step S13 to step S14. First, the dialog segment creation unit 13 judges whether the dialog segment is a set time or longer (step S15). When the dialog segment is judged to be the set time or longer ("YES" at step S15), the dialog segment creation unit 13 deletes the dialog segment (step S17). When the dialog segment is judged not to be the set time or longer ("NO" at step S15), the dialog segment creation unit 13 proceeds to step S16. Next, the dialog segment creation unit 13 judges whether or not the dialog segment is shorter than a particular set time (step S16). When the dialog segment is judged to be shorter than the particular set time ("YES" at step S16), the dialog segment creation unit 13 deletes the dialog segment (step S17). When the dialog segment is judged not to be shorter than the particular set time ("NO" at step S16), the dialog segment creation unit 13 proceeds to step S14.

<Processing by the Playback Segment Selection Unit 15>

Figure 12:
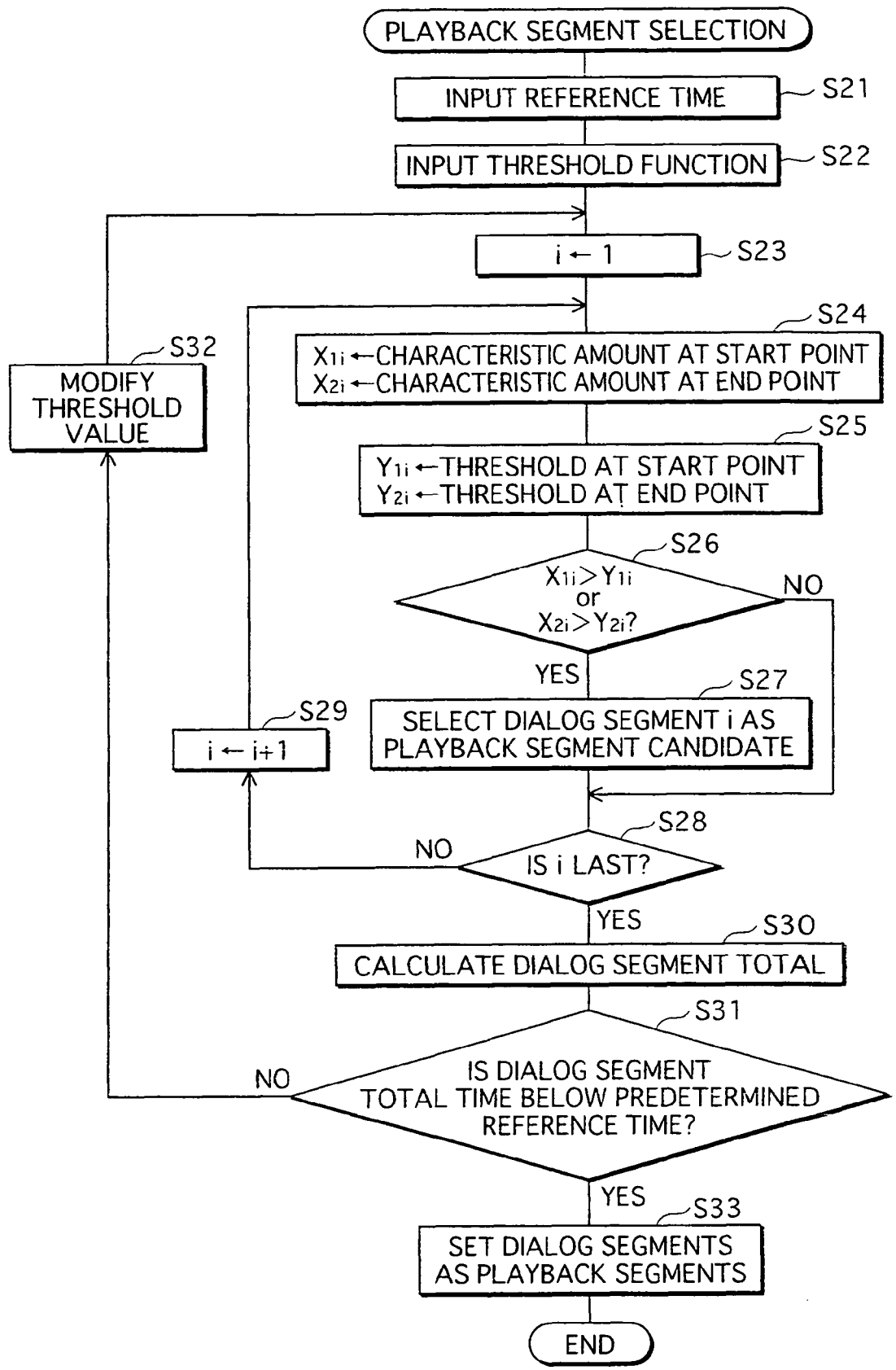
FIG. 12 is a flowchart showing operations of processing by a playback segment selection unit 15.

The following describes contents of the processing by the playback segment selection unit 15, with use of the flowchart in FIG. 12.

Note that it is assumed here that before the processing by the playback segment selection unit 15, the user instruction obtaining unit 18 receives the special playback type, time, and the like, from the operation instruction device 9, and the threshold value determination unit 17 determines the threshold value function according to the received special playback type and time.

In the present flowchart, i is a variable that specifies one dialog segment. $X_{1i}$ is a variable that shows a characteristic amount at a start point of a dialog segment, and $X_{2i}$ is a variable that shows a characteristic amount at an end point of the dialog segment. $Y_{1i}$ is a variable that shows a threshold value at a start point of a dialog segment, and $Y_{2i}$ is a variable that shows a threshold value at an end point of the dialog segment. Step S24 to step S29 in the present flowchart compose loop processing. The control variable of this loop processing is i, and the requisite for ending this loop processing is that i indicates a last dialog segment. Step S23 to step S32 in the present flowchart compose loop processing. The requisite for ending this loop processing is that the total time of the selected dialog segments is below a predetermined reference time.

First, the playback segment selection unit 15 receives the predetermined reference time (step S21), and receives a threshold value function that corresponds to the special playback type (step S22). The playback segment selection unit 15 temporarily stores the received threshold value function.

The playback segment selection unit 15 performs initialization to set the variable i to 1 (step S23).

Next, the playback segment selection unit 15 assigns the characteristic amount of the start point and the end point to $X_{1i}$ and $X_{2i}$, respectively (step S24). Next, the playback segment selection unit 15 assigns the respective coordinates of the start point and end point of the playback segment on the playback time axis to a predetermined threshold value function, as input values, and assigns the output values therefrom to $Y_{1i}$ and $Y_{2i}$, respectively (step S25).

The playback segment selection unit 15 compares the output values with the values in which the characteristics quantities have been assigned as variables, and judges whether the characteristic amount at either the start point or the end point exceeds the respective threshold value function output value (step S26). When either of the characteristic quantities exceeds the respective output value ("YES" at step S26), the playback segment selection unit 15 selects that dialog segment as a candidate playback segment for special playback (step S27). The playback segment selection unit 15 then judges whether or not the dialog segment is the last dialog segment (step S28). When the characteristic amounts are judged to be below the threshold value function output values ("NO" at step S26), the playback segment selection unit 15 proceeds to step S28. The playback segment selection unit 15 judges whether or not the dialog segment is the last (step S28). When the dialog segment is judged not to be the last ("NO" at step S28), the playback segment selection unit 15 adds 1 to i (step S29), and moves to step S24. When the dialog segment is judged to be the last ("YES" at step S28), the playback segment selection unit 15 calculates the total time of the at least one dialog segment (step S30), and judges whether or not the total time is below the predetermined reference time (step S31). When the total time of the at least one dialog segment is judged to be below the predetermined reference time ("YES" at step S31), the playback segment selection unit 15 determines the at least one dialog segment selected as playback segment candidates to be playback segments (step S33). When the total time of the at least one dialog segment is judged not to be below the predetermined reference time ("NO" at step S31), the playback segment selection unit 15 modifies the threshold value function (step S32), and moves to step S23.

According to this processing, the playback segment selection unit 15 is able to determine playback segments, and connect the playback segments in the order in which they were selected, to create one piece of content to be played in special playback. The playback unit 16 plays the created one piece of content (in other words, the determined playback segments that have been connected together) created by the playback segment selection unit 15.

<Conclusion>

According to the described embodiment, when creating digest video, the threshold values are obtained according to a function that has a property of monotonic increase and/or monotonic decrease, and therefore it is possible to modify the threshold values over time. By doing so, it is possible to select a particular range on the time axis as a range to be used with emphasis in special playback. Accordingly, viewing of special playback that is contrary to the user's wishes can be avoided, and digest video for special playback that reflects the user's wishes can be created.

With a conventional technique, digest video that includes intentional emphasis on a particular part cannot be created, but according to the recorded video apparatus of the present embodiment, digest video that intentionally includes emphasis on a particular part can be created.

Modifications

The recording/playback apparatus 100 of the present invention has been described based on, but is not limited to, the first embodiment. Cases such as the following are included in the present invention.

(1) The function used for finding the threshold values in the above embodiment is not limited to being a polynomial function of degree 1.

It is sufficient for the threshold value function to include a monotonic increase or monotonic decrease in at least part of the domain, and the threshold value function may include both properties of monotonic increase and monotonic decrease in the domain.

Furthermore, the threshold value function may be expressed by a predetermined mathematical expression. For instance, the threshold value function may be a polynomial function of degree n (n being an integer of at least 1) such as a polynomial function of degree 1 or a polynomial function of degree 2, or may be a trigonometric function, an exponential function, or the like.

Furthermore, instead of using a function that includes a monotonic increase or monotonic decrease, the threshold values may be set differently for each dialog segment. For instance, for dialog segment 1 and dialog segment 2 shown in FIG. 3, y=a1 and y=a2 may be used. Here, a1 and a2 are different values. The threshold values are set so as to be different for other dialog segments also.

(2) The segments that are obtained are not limited to being dialog segments. For instance the segments that are obtained may be segments in which music plays, segments in which a particular person appears, or segments in which captions are shown.

(3) Instead of the recording/playback apparatus 100, the above embodiment may be directed to a computer program.

(4) Instead of the recording/playback apparatus 100, the above embodiment may be directed to an integrated circuit such as a system LSI.

(5) The characteristic amount is not limited to being the sound intensity as described in the above embodiment. For instance, the characteristic amount may be viewership of the television program, color intensity, or a level of recommendation.

(6) Although the digest video is created and special playback performed with respect to a received television program in the above embodiment, as long as the television program is moving picture content, it in not limited to being a television program that has been received.

(7) The types of special playback are not limited only to search playback and overview playback described in the above embodiment. For instance, both the former half and the latter half of a television program may be included as the digest video for special playback.

(8) Although the up and down keys are used to rotate the function in the above embodiment, the left and right keys may be used to rotate the function.

(9) The recording media are not limited to being the HD, DVD, BD, and SD memory card used in the above embodiment. Examples of recording media that may be used are CD-R, and CD-RW; semiconductor memory cards such as compact flash (TM), smart media, memory stick, multimedia card, PCM-CIA card; magnetic recording disks such as SuperDisk, Zip, Clik!; and removable hard disk drives such as ORB, Jaz, SparQ, SyJet, EZFley, and microdrive.

(10) While special playback is performed in the recording/playback apparatus 100 in the above embodiment, the following is an alternative structure. The recording/playback apparatus 100 may be connected to a mobile terminal via a USB or the like, and the part of the moving picture content which is the digest video may be transferred to the mobile terminal, and used after being stored in the memory of the mobile terminal. Furthermore, the part of the moving picture content which is the digest video may be recorded on an SD memory card or the like, and viewed in a mobile terminal. This enables special playback in mobile terminals.

(11) The following describes one specific example of operations by the above threshold value determination unit 17.

The threshold value determination unit 17 stores in advance a search evaluation function "y=ax+b" and an overview evaluation function "y=cx+d". Here, a, b, c, and d are predetermined numbers.

The threshold value determination unit 17 receives the special playback type and time (the time for which the special playback is to be performed) from the user instruction obtaining unit 18, and judges whether or not the received special playback type is search playback.

When the special playback type is judged to be search playback, the threshold value determination unit 17 determines the pre-stored search evaluation function to be the threshold value function to be used in selecting playback segments.

When the special playback type is not search playback, in other words, is overview playback, the threshold value determination unit 17 determines the pre-stored overview evaluation function to be the threshold value function to be used in selecting playback segments.

Note that although in the above the search evaluation function is described as being singular, a plurality of search evaluation functions may be set depending on the time for which special playback is to be performed. Similarly, a plurality of overview evaluation functions may be set depending on the time for which special playback is to be performed.

(12) Although the intercept of the threshold value function is modified to move the threshold value function in parallel when the total time of the at least one segment selected as playback segment candidates exceeds the predetermined reference time, it is possible to instead modify the slope of the threshold value function, or modify the slope and intercept of the threshold value function.

2. First Embodiment Modification Example

The following describes a modification example of the first embodiment that is directed to a case in which special playback is performed with respect to a television program that is broadcast at the same time every week (hereinafter referred to as a serial program). Here, the special playback is for checking the contents of the serial program that have been broadcast up until the present, and is referred to as confirmation playback. The following description focuses on aspects that differ to the first embodiment.

Take, for instance, a casein which five episodes of a ten-episode serial program (such as a drama program) have been broadcast. Before the sixth episode is broadcast, confirmation playback can be used to condense and play the contents of the first to fifth episodes to within a predetermined time (20 minutes, for example).

Figure 13:
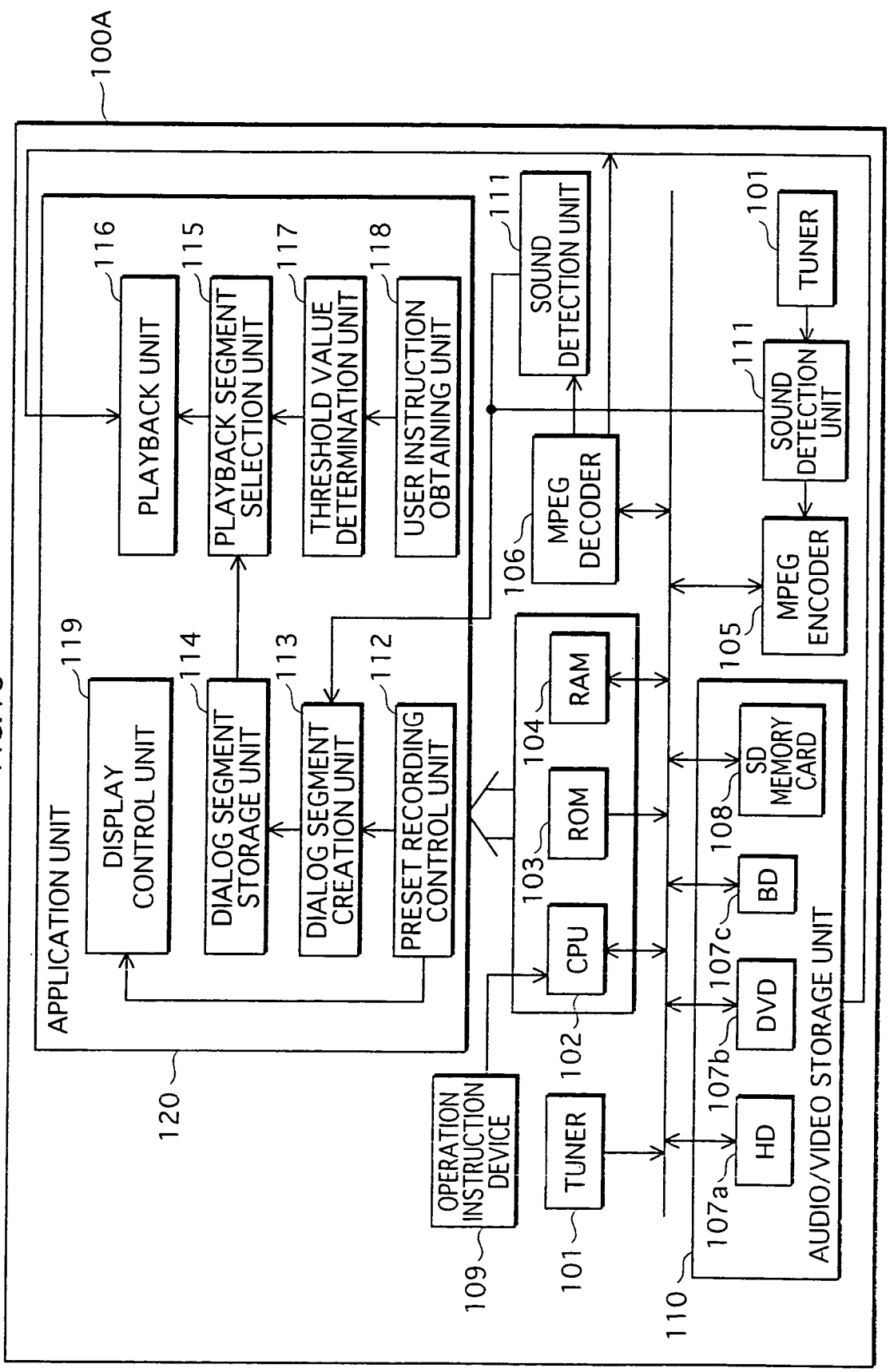
FIG. 13 is a block diagram showing the structure of a recording/playback apparatus 100A.

As shown in FIG. 13, a recording/playback apparatus 100A is composed of a tuner 101, a CPU 102, a ROM 103, a RAM 104, an MPEG encoder 105, an MPEG decoder 106, an operation instruction device 109, an audio/video storage unit 110, and a sound detection unit 111.

The CPU 102, the ROM 103, the RAM 104, the MPEG encoder 105, the MPEG decoder 106, and the sound detection unit 111 are the same as the CPU 2, the ROM 3, the RAM 4, the MPEG encoder 5, the MPEG decoder 6, and the sound detection unit 11, respectively, of the first embodiment, and therefore a description thereof is omitted here.

<Tuner 101>

The tuner 101 performs reception processing of television programs. In the case of an analog broadcast, on receiving the program, the tuner 101 outputs an audio signal to the sound detection unit 111. In the case of a digital broadcast, the tuner 101 reads television program data from the audio/video storage unit 110, and after the MPEG decoder 106 converts the television program data to an analog format, outputs an audio signal to the sound detection unit 111. A video signal is super imposed with a navigation screen, an information screen or the like by the display control unit 119. This enables television program video output by the tuner 101 or the MPEG decoder 106 to be displayed with an operation screen, such as a recording presetting or program navigation screen, superimposed thereon.

In addition, the tuner 101 receives an EPG, and writes the received EPG to the audio/video storage unit 110. For instance, the tuner 101 writes the EPG to an HD 107a of the audio/video storage unit 110.

<Operation Instruction Device 109>

The operation instruction device 109 receives instructions relating to special playback and the like from the user. The operation instruction device 109 receives a title reservation instruction for determining a television program for which recording is to be preset based on the name of the television program and recording the television program, and receives the name of the television program that is to be recorded according to title presetting.

On receiving a playback instruction for a recorded television program from the user, the operation instruction device 109 receives at least one user identifier identifying the at least one user who is to view the television program to be played. Note that it is assumed that respective identifiers have been assigned to users who use the recording/playback apparatus 100A. When a plurality of users are to view the television program that is to be played, the operation instruction device 109 receives the user identifier of each user who is to view the television program.

On receiving an instruction instructing confirmation playback, the operation instruction device 109 further receives a designation of a folder that is the target of confirmation playback, and receives the at least one user identifier of the at least one user to view the television program.

<Audio/Video Storage Unit 110>

The audio/video storage unit 110 includes an HD 107a, a DVD 107b, a BD 107c, and an SD memory card 108. The HD 107a, the DVD 107b, the BD 107c, and the SD memory card 108 perform reading/writing of television programs. Reading/writing includes processing for writing a television program that is sent from the MPEG encoder via a bus to any of the HD 107a, the DVD 107b, the BD 107c and the SD memory card 108, and processing for reading a television program that is recorded on any of the HD 107a, the DVD 107b, the BD 107c and the SD memory card 108 and sending the read television program to the bus.

Figure 14:
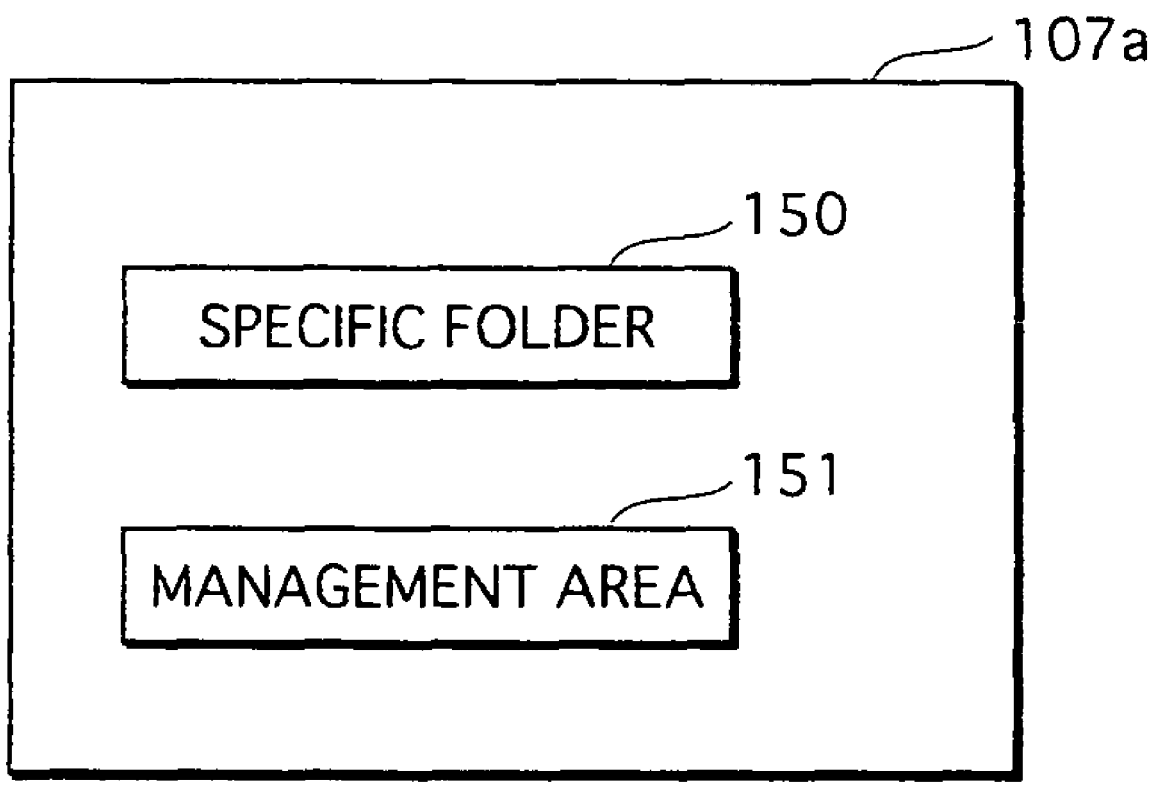
FIG. 14 is a block diagram showing the structure of an HD 107*a*.

The HD 107a of the audio/video storage unit 110 has a specific folder 150 and a management area 151, as shown in FIG. 14.

The specific folder 150 is an area for storing a serial program of which a recording presetting has been made according to a title presetting, and is different for each program name designated by title presetting. Here it is assumed that a title presetting has been made with respect to one serial program (for example, a television program with a title "Drama ABC"), and the recording destination of the serial program is the specific folder 150. A folder name and a program name are associated with the specific folder 150, so that the user is able to identify the recording destination of the serial program of which recording has been preset according to title presetting. As one example, the folder name may be the program name designated according to title presetting. In the present example, the first to fifth episodes of a series program have the name "Drama ABC".

The management area 151 has a program management area for managing recorded television programs, a history management area for managing viewing history of recorded television programs, and an EPG storage area for storing the EPG received by the tuner 101.

The program management area has a program management table T100 as shown in FIG. 15. The program management table T100 is an area for storing at least one set of a program ID, a program name, a recording date-time, a broadcast station number, and a recording time. Note that each set of program ID, a program name, a recording date-time, a broadcast station number, and a recording time is referred to as a piece of recorded program information.

The program ID is an identifier that is assigned at the time of recording, and is for identifying the recorded television program. The program name is the name of the recorded television program. The recording date-time is the date and time at which recording started. The broadcast station number is the number of the channel that broadcast the recorded program. The recording time shows how long recording was performed, and is calculated from the recording start date-time and the recording end date-time designated in the recording presetting. Here, the recording time is expressed in minutes, but may be expressed using any unit of time.

The history management area stores a different history management table for each user identifier. In the present embodiment, the history management area has history management tables T110, T111, T112, and T113 as shown in FIG. 16. The history management tables are identical in structure. The following description uses the history management table T110.

The history management table T110 is composed of a user identifier and history information. This history information is an area for storing at least one program ID of at least one television program viewed by the user corresponding to the user identifier.

Furthermore, the DVD 107b, which is a removable recording medium, is a rewritable DVD such as a DVD-RAM, a DVD-RW or a DVD+RW, or a writable DVD such as a DVD-R or a DVD+R.

<Application Unit 120>

The application unit 120 is a concrete means achieved by cooperation between an application program and the hardware, and, as shown in FIG. 13, includes a recording presetting control unit 112, the dialog segment creation unit 113, a dialog segment storage unit 114, a playback segment selection unit 115, a playback unit 116, a threshold value determination unit 117, a user instruction obtaining unit 118, and a display control unit 119.

<Recording Presetting Control Unit 112>

The recording preset control unit 112 performs control relating to a series of processes for recording presetting.

When recording starts, the recording presetting control unit 112 calculates the program ID and the recording time, and generates a piece of recorded program information using the calculated program ID, the program name, the recording start date-time, the broadcast station number, and the recording time of the recording target. The recording presetting control unit 112 records the generated recording program information in the program management table T100.

When a title preset is made according to the operation instruction device 109, the recording preset control unit 112 obtains the name of the serial program designated in the title preset, from the EPG stored in the EPG storage area, and generates a specific folder with the obtained program name as the folder name.

The recording preset control unit 112 records the television program specified in the title preset under the generated specific folder.

<Dialog Segment Creation Unit 113>

The dialog segment creation unit 113 operates in the same way as the dialog segment unit 13 in the first embodiment to generate a dialog segment list.

The dialog segment creation unit 113 writes the generated dialog segment list and the program ID of the television program that was the target of list generation in association with each other in the dialog segment storage unit 114.

<Dialog Segment Storage Unit 114>

The dialog segment storage unit 114 stores the created dialog segment list.

Note that it is assumed here that the dialog segment storage unit 114 at least stores dialog segment lists with respect to all series programs recorded in the specific folder 150. Specifically, as shown in FIGS. 17 and 18, the dialog segment storage unit 114 at least stores dialog segment tables T121 to T125 for the series programs that are the first to fifth episodes of the program name "Drama ABC".

The dialog segment tables T121 to T125 are identical in structure, and the following describes the dialog segment table T121.

The dialog segment table T121 is composed of an ID storage area 131 that stores the program IDs, and a dialog segment list 132 with the same structure as the dialog segment list 31 shown in the first embodiment.

<Playback Segment Selection Unit 115>

Search playback and overview playback are the same as in the first embodiment, and therefore a description thereof is omitted here.

The following describes selection of playback segments performed for confirmation playback.

The playback segment selection unit 115 has a counter that counts the number of times that the piece of recorded program information has been read.

The playback segment selection unit 115 performs the following operations using the folder designated as the target of confirmation playback (here, the specified folder 150), and the at least one user identifier received from the operation instruction device 109. Note that here it is assumed that the received at least one user identifier is the three user identifiers "1", "2", and "3".

The playback segment selection unit 115 sets the value of the counter to 0.

The playback segment selection unit 115 reads, from the program management table T100, all sets of recorded program information that include a program name that matches the folder name of the designated folder (here, "Drama ABC"), and creates a working table T130 from all the read sets of recorded program information. FIG. 19 shows a working table T130 that is obtained as a result of reading all the sets of recorded program information that includes the program name "Drama ABC". Note that the structure of the working table T130 is identical to the program management table T100, and therefore a description thereof is omitted.

The playback segment selection unit 115 reads the piece of recorded program information having the oldest recording date-time of unread sets of recorded program information from the working table T130, and obtains the program ID included in the read piece of recorded program information.

The playback segment selection unit 115 reads the dialog segment table corresponding to the program ID, and adds 1 to the value of the counter.

The playback segment selection unit 115 calculates "(counter value−1)×recording time", adds the result to each start point and end point in the read dialog segment table, and updates the read dialog segment table.

Using the obtained program ID and at least one history management table corresponding to the received at least one user identifier (here the history management tables T110, T111, and T112), the playback segment selection unit 115 judges whether or not any users exist who have not seen the television program corresponding to the program ID.

When at least one user exists who has not seen the television program corresponding to the program ID is judged to exist, the playback segment selection unit 115 modifies each sound intensity included in the read dialog segment table to be 1.5 times greater, and temporarily stores the modified dialog segment table.

When no users exist who have not seen the television program corresponding to the program ID, the playback segment selection unit 115 temporarily stores the dialog segment table without modifying the sound intensity.

The playback segment selection unit 115 judges whether any unread sets of recorded program information exist, and when such information is judged to exist, reads the piece of recorded program information having the oldest recording date-time of the at least one unread piece of recorded program information, and repeats the described processing. As a result of this processing, the sets of recorded program information are obtained in order from the first episode of the series program that was preset recorded in title presetting, and by calculating "(counter value−1)×recording time" and adding the result to each start point and end point in the read segment table, an overall recording time starting from the first episode is calculated.

When no unread sets of recorded program information are judged to exist, in other words when all sets of recorded program information recorded in the working table T130 have been read, the playback segment selection unit 115 generates a working dialog segment list T135 shown in FIG. 20 using all the dialog segment lists included in all the temporarily stored dialog segment tables.

The structure of the working dialog segment list T135 is the same as the dialog segment list 31, and therefore a description thereof is omitted. Note that each start point and endpoint of dialog segments of a television program of the program ID "P2" is obtained by adding the recording time of the television program of the program ID "P1". The start points and end points in program IDs "P3", "P4", "P5", and "P6" are also obtained by adding the recording time from the first episode. The sound intensity in each dialog segment of the television program that has the program ID "p3" is 1.5 times the intensity of the sound intensity recorded in the dialog segment table T123. This is because, of the user identifiers "1", "2", and "3" the user corresponding to the user identifier "2" has not seen the television program having the program ID "p3", in other words, the third episode of the "Drama series ABC".

Figure 21:
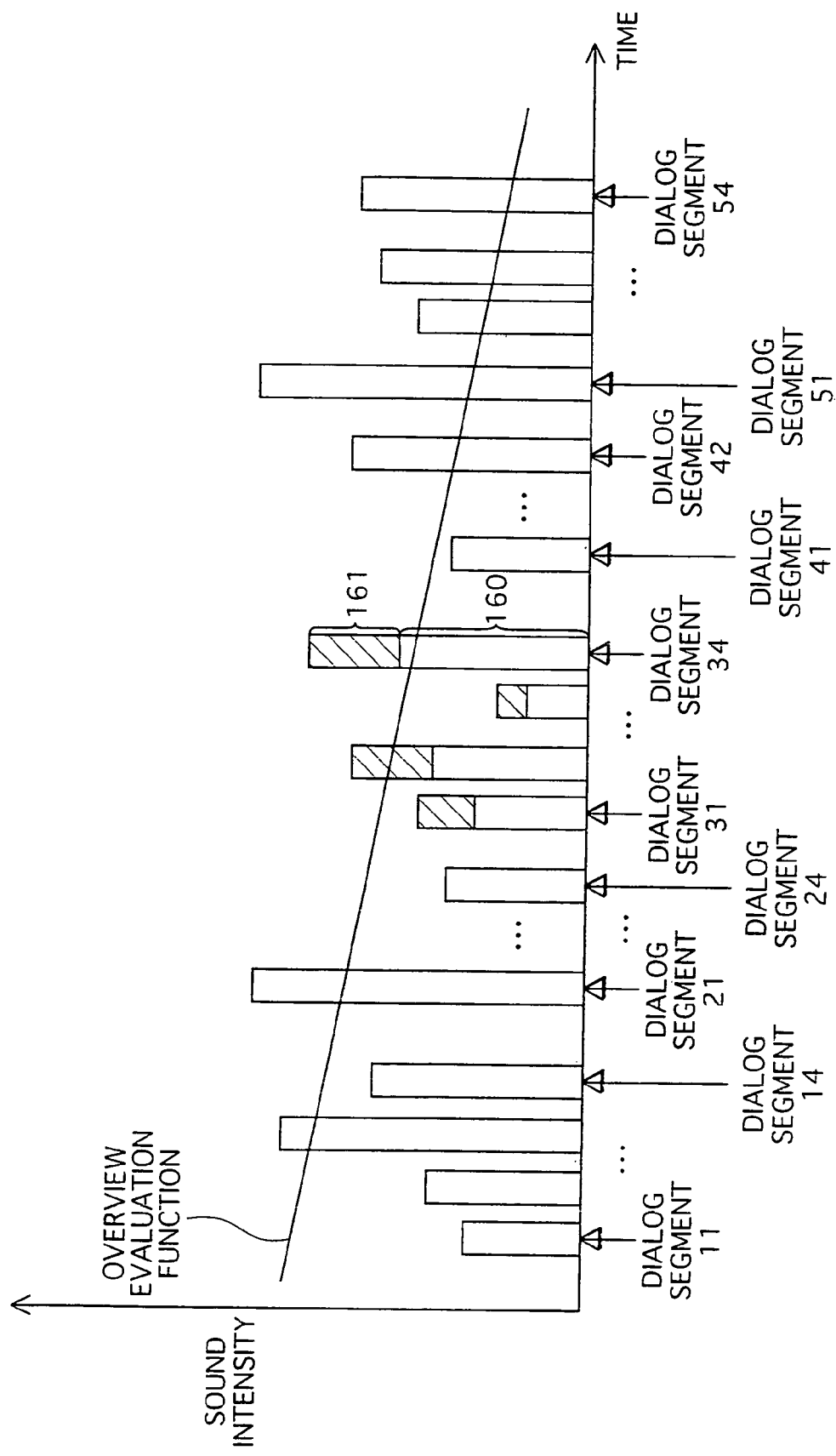
FIG. 21 shows an example of playback segment selection.

Using the generated working dialog segment list T135 and the overview evaluation function, the playback segment selection unit 115 selects dialog segments to be played in special playback. FIG. 21 shows an example of selection of playback segments. Here, the shaded part of the bars of dialog segments 31 to 34 show that the intensity has been increased by 1.5. For instance, an unshaded part 160 of the bar of the dialog segment 34 shows the sound intensity as shown in the dialog segment table T123, and a shaded part 161 is the region of increased intensity due to increasing the intensity shown by the unshaded part 160 by 1.5.

The playback segment selection unit 115 obtains dialog segments that exceed the threshold values shown by the overview evaluation function, and judges whether or not the total time thereof is within the predetermined time.

When the total time is judged to be within the predetermined time, the playback segment selection unit 115 determines the obtained dialog segments to be playback segments.

When the total time is judged to not be within the predetermined time, the playback segment selection unit 115 moves the function in parallel such that the threshold values increase, once more obtains the dialog segments that exceed the threshold values shown by the overview evaluation function, and repeats the above operations.

According to the described operations, the playback segment selection unit 115 is able to perform special playback with emphasis on a recently broadcast television program. Furthermore, according to confirmation playback, the playback segment selection unit 115 is able to perform special playback with emphasis on a television program that at least one user who is to view has missed.

<Playback Unit 116>

The playback unit 116 plays audio and video that corresponds to the dialog segments (in other words, playback segments) selected by the playback segment selection unit 115.

On receiving a playback instruction for a recorded television program and at least one user identifier from the operation instruction device 109, the playback unit 116 reads, from the program management table T100, the program ID that corresponds to the television program of which playback has been instructed, reads the at least one history management table corresponding to the received at least one user identifier, and updates the read at least one history management table by registering the read program ID in at least one the history management table. On receiving a playback instruction for a recorded television program and at least one user identifier, the playback unit 116 plays the audio and video of the television program of which playback has been instructed.

<Threshold Value Determination Unit 117>

The threshold value determination unit 117 is the same as the threshold value determination unit 17, and therefore a description thereof is omitted.

<User Instruction Obtaining Unit 118>

The user instruction obtaining unit 118 is the same as the user instruction obtaining unit 18, and therefore a description thereof is omitted.

<Display Control Unit 119>

The display control unit 119 is the same as the display control unit 19, and therefore a description thereof is omitted.

<Processing by the Dialog Segment Creation Unit 113>

Operations in processing by the dialog segment creation unit 113 are the same as operations in processing by the dialog segment creation unit 13 shown in FIG. 11, and therefore a description thereof is omitted.

<Processing by the Playback Segment Selection Unit 115>

The following describes operations for selection of playback segments performed when performing confirmation playback. The description focuses on aspects that differ to the flowchart shown in FIG. 12.

Figure 22:
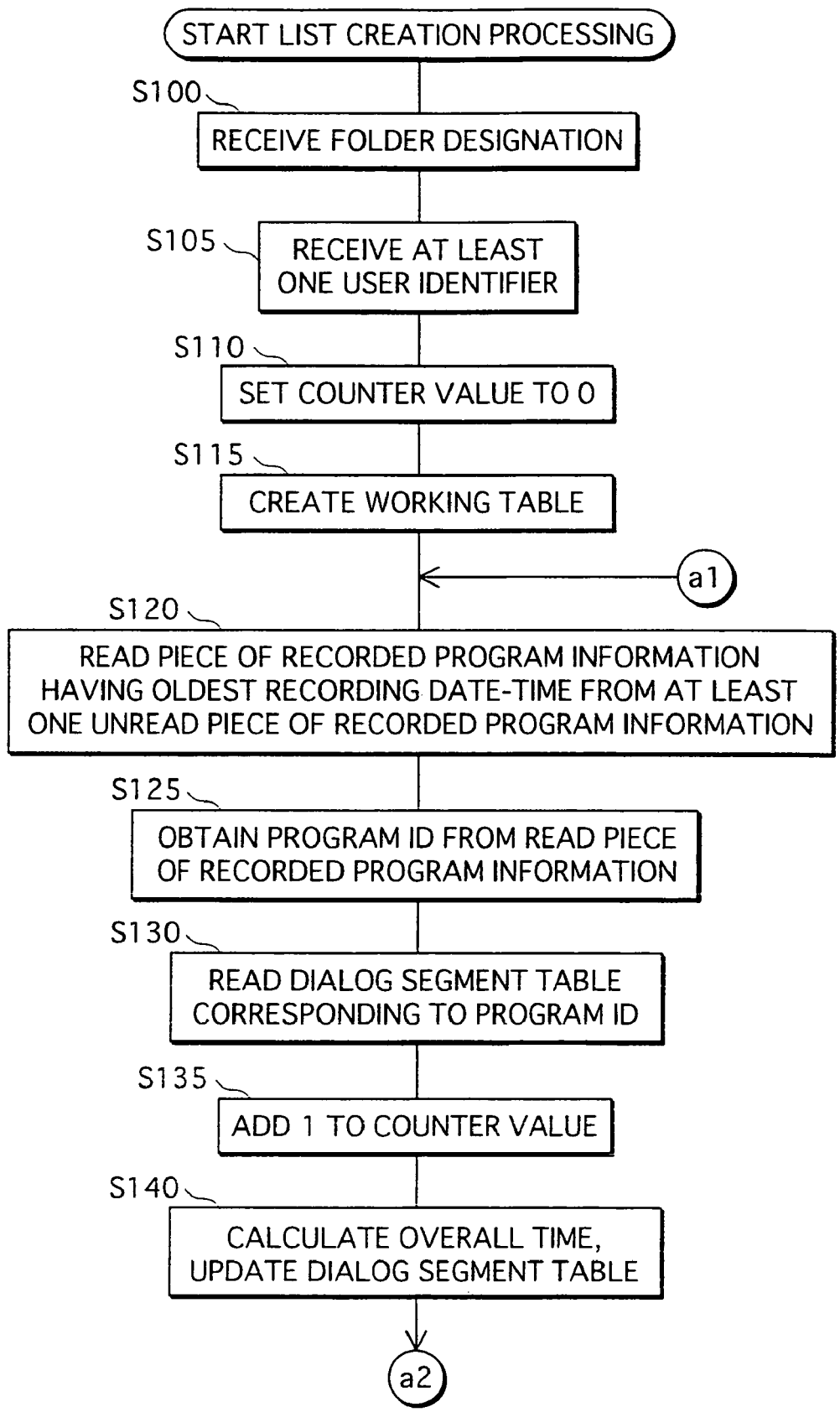
FIG. 22 is a flowchart showing operations of list generation processing performed in a playback segment selection unit 115, and is continued in FIG. 23.
Figure 23:
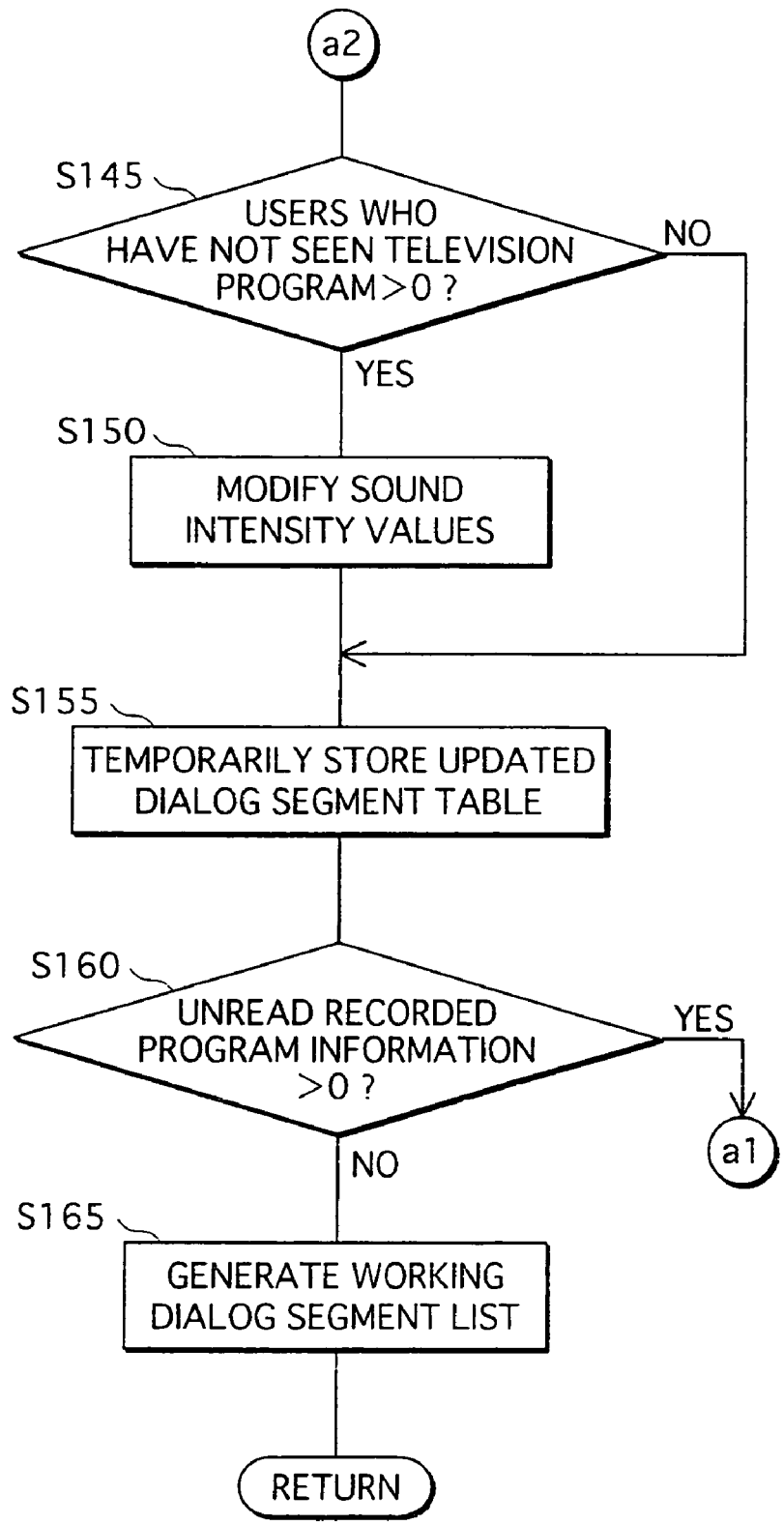
FIG. 23 is a flowchart showing operations of list generation processing performed in the playback segment selection unit 115, and is a continuation of FIG. 22.

Before performing step S21 in FIG. 12, the playback segment selection unit 115 executes the list generation processing shown in FIG. 22 and FIG. 23, and after executing the list generation processing, performs step S21 onwards.

The playback segment selection unit 115 receives a designation of a folder that is the target of confirmation playback (step S100), and receives at least one user identifier from the operation instruction device 109 (step S105).

The playback segment selection unit 115 sets the value of the counter to 0 (step S110), reads all sets of recorded program information that include a program name that matches the folder name of the designated folder (for example, "Drama ABC"), from the program management table T100, and creates a working table composed of all of the read sets of recorded program information (step S115).

The playback segment selection unit 115 reads, from the working table, the piece of recorded program information having the oldest recording date-time from among the at least one unread piece of recorded program information (step S120), and obtains the program ID included in the read piece of recorded program information (step S125).

The playback segment selection unit 115 reads the dialog segment table that corresponds to the program ID (step S130), and adds 1 to the value of the counter (step S135).

The playback segment selection unit 115 calculates "(counter value−1)×recording time", adds the result to each start point and end point in the read dialog segment table, and updates the read dialog segment table (step S140).

Using the obtained program ID and the at least one history management table corresponding to the received at least one user identifier, the playback segment selection unit 115 judges whether or not any users exist who have not seen the television program corresponding to the program ID (step S145).

When at least one user exists who has not seen the television program corresponding to the program ID is judged to exist ("YES" at step S145), the playback segment selection unit 115 updates the sound intensities included in the read dialog segment table to be 1.5 times greater (step S150), and temporarily stores the updated dialog segment table (step S155).

When it is judged that no users exist who have not seen the television program corresponding to the program ID ("NO" at step S145), the playback segment selection unit 115 temporarily stores the dialog segment table without updating the sound intensity (step S155).

The playback segment selection unit 115 judges whether or not any unread sets of recorded program information exist (step S160), and when such information is judged to exist ("YES" at step S160), returns to step S120.

When it is judged that no unread sets of recorded program information exist, in other words when all sets of recorded program information recorded in the working table T130 have been read ("NO" at step S160), the playback segment selection unit 115 generates a working dialog segment list using all the dialog segment lists included in the temporarily stored dialog segment table (step S165).

Note that at step S23 onwards shown in FIG. 12, the playback segment selection unit 115 performs playback segment selection using the threshold value function (here, the overview evaluation function) obtained at step S22 and the working dialog segment list generated at step S165. Furthermore, by reassigning dialog segment 11 through to dialog segment 54 in the dialog segment list T135 in order as dialog segment 1 through to dialog segment 20, dialog segments can be specified using the variable "i".

<Conclusion>

According to the described modification example, when a serial program such as a drama is viewed, at least one television program that has already been broadcast (for example the first to fifth episodes of the television program) can be viewed according to special playback. This enables the user to check the contents of the first to fifth episodes in a short amount of time as a review before viewing the sixth episode of the serial program.

Other Modification Examples

The recording/playback apparatus 100A of the present invention as been described based on, but is not limited to, a modification of the first embodiment. Cases such as the following are included in the present invention.

(1) Although the overview evaluation function was described as being used as the threshold value function for selecting playback segments, the search evaluation function may be used.

(2) Although the playback segment selection unit 115 was described as modifying the sound intensity values to be 1.5 greater when a user exits who has not viewed a particular television program, the numeric value by which the sound intensity is increased may be any value greater than 1. Alternatively, a predetermined value may be added to the sound intensity values.

(3) When a user exits who has not viewed a particular television program, the playback segment selection unit 115 modifies the sound intensity values. However, it is not necessary for the sound intensity values to be modified.

(4) Although a plurality of dialog segment lists are merged when selecting playback segments, the dialog segment lists are not limited to being merged. The playback segments may be selected using the overview evaluation function with respect to each dialog segment list.

At this time, a same overview evaluation function may be used for each dialog segment list, or a different overview evaluation function may be used for each dialog segment list.

(5) The serial programs are not limited to being a television program broadcast at the same time each week.

The serial programs may be a television program broadcast every day or every week at the same time. Furthermore, the serial programs may be a television program broadcast at the same time on one or more predetermined days in a week, such as from Monday through to Friday.

3. Second Embodiment

The following describes a second embodiment of the present invention with examples shown in the drawings.

Note that in the present embodiment playback rules are described in terms of its separate components: playback rule determination tables, playback rule information, and playback segment management information.

3.1 Overview

Figure 24:
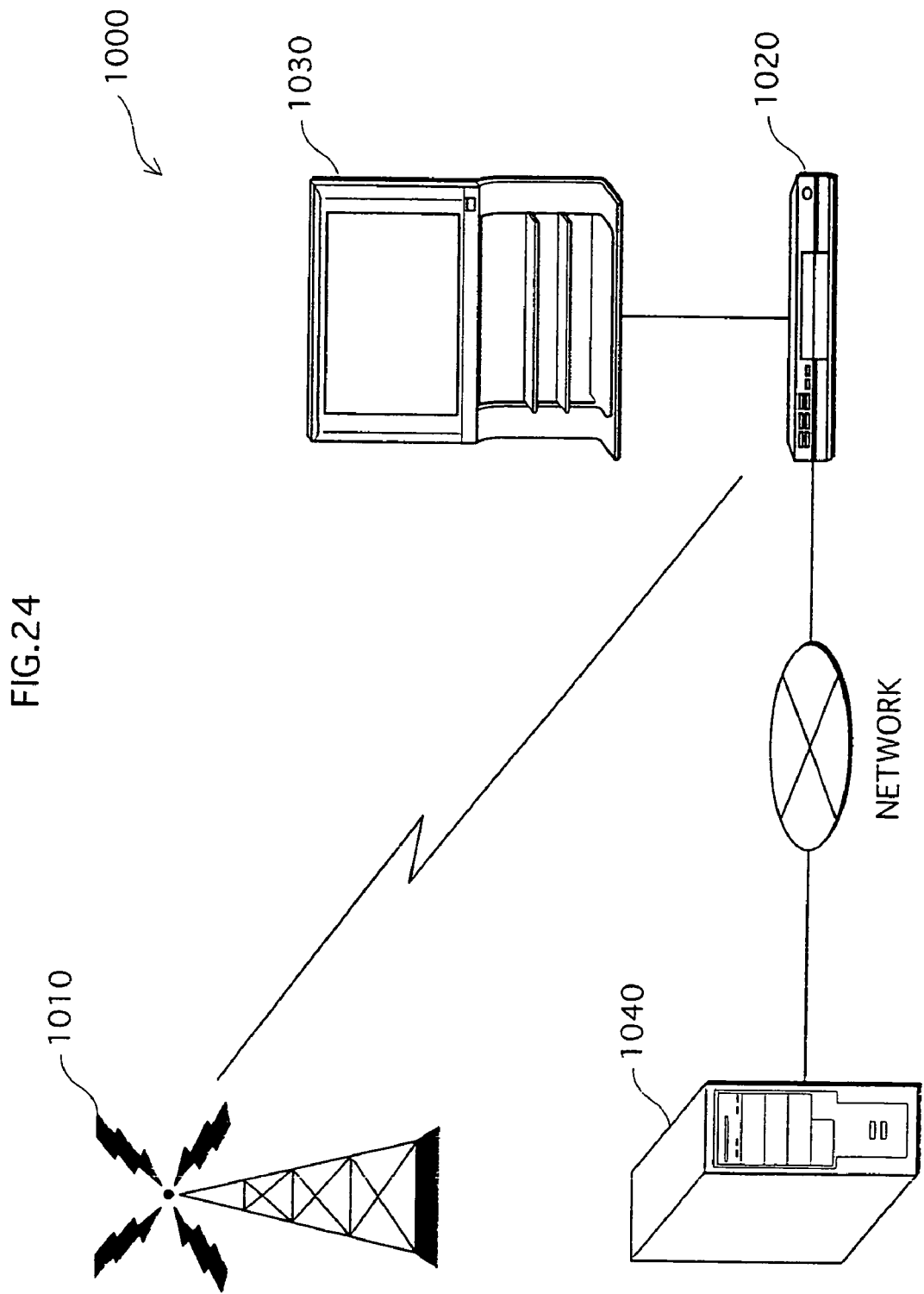
FIG. 24 shows the schematic structure of a video recording/playback system 1000.

FIG. 24 shows the conceptual structure of a video recording/playback system 1000 that is an embodiment of the present invention.

A broadcast station 1010 transmits terrestrial digital broadcast waves.

A video playback apparatus 1020 is, specifically, a terrestrial digital broadcast receiver or the like that has a large-capacity recording medium such as a hard disk. The video playback apparatus 1020 receives terrestrial digital broadcast waves, and performs recording to the recording medium and output of video content, which is the result of decoding, to a display apparatus 1030.

The display apparatus 1030 is a television receiver, a display, or the like that displays video output by the video playback apparatus 1020.

Furthermore, in special playback of video content, the video playback apparatus 1020 obtains, from a server apparatus 1040 via a network, information and the like relating to a television program broadcast by the broadcast station 1010. Using the information, the video playback apparatus 1020 plays the content, which has been recorded to the recording medium, such that the user can effectively grasp what the content is about.

Note that special playback in the present embodiment is search playback. This is also referred to as digest playback.

3.2 Structure (1) Video playback apparatus 1020

Figure 25:
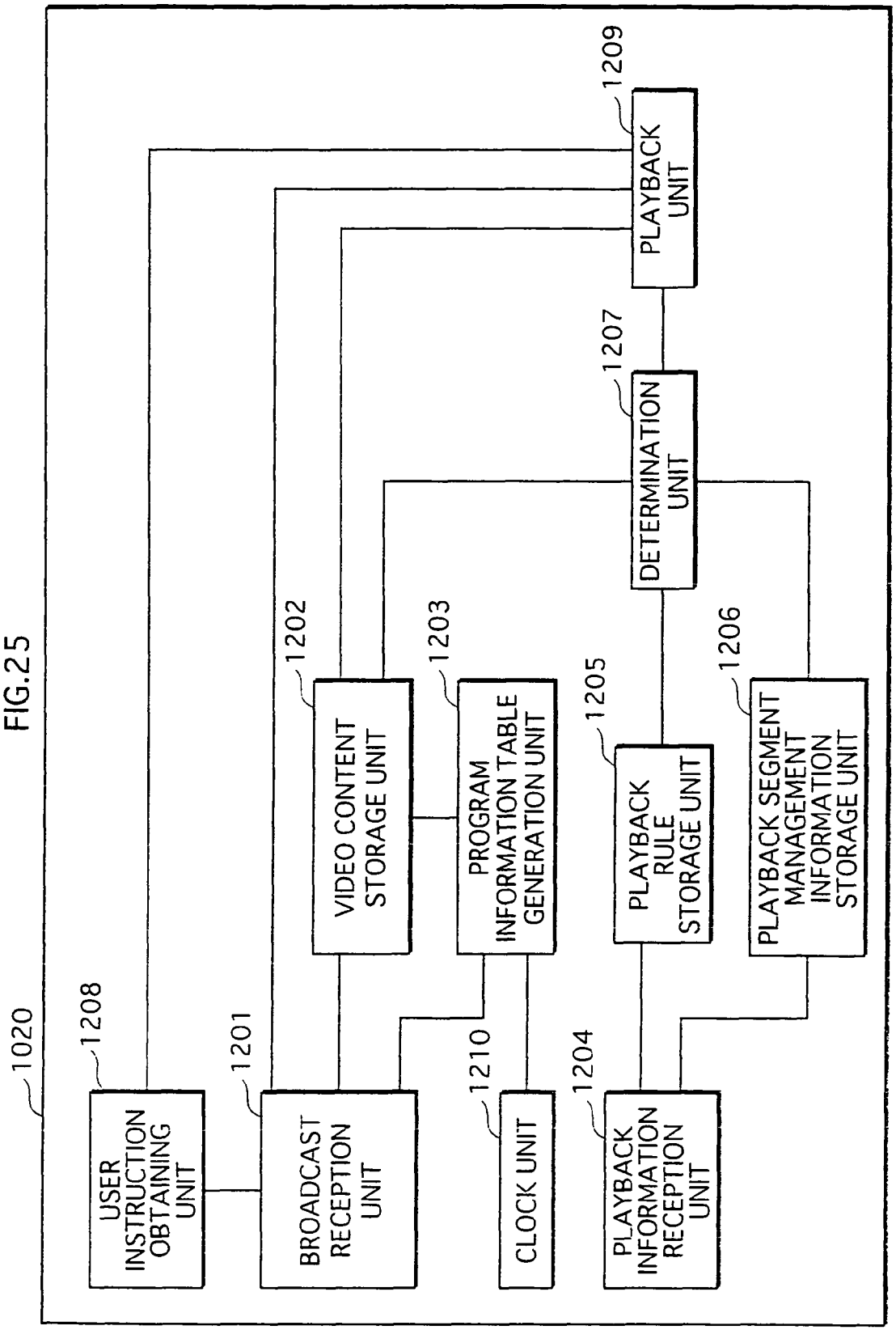
FIG. 25 is a block diagram showing the structure of a video playback apparatus 1020.

The video playback apparatus 1020, as shown in FIG. 25, is composed of a broadcast reception unit 1201, a video content storage unit 1202, a program information table generation unit 1203, a playback information reception unit 1204, a playback rule storage unit 1205, a playback segment management information storage unit 1206, a determination unit 1207, a user instruction obtaining unit 1208, a playback unit 1209, and a clock unit 1210.

The video playback apparatus 1020 is, specifically, a digital broadcast receiver or the like composed of a CPU, a ROM, a RAM, a hard disk, a network interface, a tuner, an error corrector, a transport decoder, a video/audio decoder, and the like. Computer programs are stored in the ROM, and the video playback apparatus 1020 realizes its functions by the CPU operating in accordance with the computer programs.

<Broadcast Reception Unit 1201>

The broadcast reception unit 1201 is composed of a channel selection module, a demodulation module, an error correction module, a descramble module, and a multiplex separation module. The broadcast reception unit 1201 obtains, from the user instruction obtaining unit 1208, a reception instruction relating to a television program that the user wishes to have received, and, in accordance with the reception instruction, the channel selection module selects a desired channel from among input signals input from an antenna (not illustrated). The demodulation module demodulates a signal relating to the selected channel, to generate a digital signal series. The error correction module detects and corrects any signal errors in the digital signal series. The descramble module descrambles the digital signal series. The multiplex separation module separates desired program data from multiplexed program data, and outputs the separated data to the playback unit 1209 and the video content storage unit 1202.

The output desired program data uses a transport stream format.

Furthermore, the broadcast reception unit 1201 extracts a program name, a genre ID, a broadcast station number, and a broadcast start time and broadcast end time corresponding to the program data, from information relating to an EPG such as an EIT (Event Information Table) in the transport stream, and transmits the extracted information to the program information table generation unit 1203.

<Video Content Storage Unit 1202>

When a record instruction for a desired television program has been received from the user instruction obtaining unit 1208, the video content storage unit 1202 stores the transport stream relating to the desired television program that has been output by the broadcast reception unit 1201, and notifies the program information table generation unit 1203 to the effect that it has started storing.

<Program Information Table Generation Unit 1203>

The program information table generation unit 1203 creates recorded program information based on information relating to the program name, genre ID, and the broadcast station number received from the broadcast reception unit 1201, and clock information received from the clock unit 1210. The program information table generation unit 1203 stores the recorded program information table T1000 in the video contents storage unit 1202.

FIG. 26 shows an example of the contents of the recorded program information table T1000.

The recorded program information table T1000 is composed of at least one piece of recorded program information.

The program information table generation unit 1203 assigns the program IDs which are identifiers for uniquely identifying each program.

The program names, genre IDs and broadcast station numbers are obtained by the program information table generation unit 1203 from the broadcast reception unit 1201. The recording date-time is obtained from the clock unit 1210, and shows the date and time at which recording started.

<Playback Information Reception Unit 1204>

The playback information reception unit 1204 obtains a playback rule determination table, a playback rule information table, and playback segment management information from the server apparatus 1040 via the network, outputs the obtained playback rule determination table and playback rule information table to the playback rule storage unit 1205, and outputs the obtained playback segment management information to the playback segment management information storage unit 1206.

Note that the playback rule determination table, the playback rule information table, and the playback segment management information are described in detail later.

<Playback Rule Storage Unit 1205>

The playback rule storage unit 1205 stores the playback rule determination table and the playback rule information table obtained from the playback information reception unit 1204.

FIG. 27 shows an example of the playback rule determination table T1010 stored by the playback rule storage unit 1205.

The playback rule determination table T1010 is composed of at least one set of a genre ID and a rule ID.

The genre ID is an identifier for identifying the genre of the television program, the genres being classified in the same way as in the information relating to the EPG.

The rule ID is an identifier identifying a piece of playback rule information that shows how a television program stored in the video contents storage unit 1202 is to be played.

FIG. 28 shows an example of the playback rule information table T1020 stored in the playback rule storage unit 1205.

The playback rule information table T1020 includes at least one piece of playback rule information, each being composed of a rule ID, an information type, a playback order, and a playback time.

The rule ID is an identifier uniquely identifying the piece of playback rule information, and set to be the same as the rule ID used in the playback rule determination table.

The information type shows the type of the corresponding piece of playback segment management information.

The playback order shows whether the playback segments of the television program are to be played in order of importance or in chronological order.

The playback time shows the total playback time of the television program.

<Playback Segment Management Information Storage Unit 1206>

The playback segment management information storage unit 1206 stores a piece of playback segment management information for each television program stored in the video content storage unit 1202.

FIG. 29 shows an example of pieces of playback segment management information T1030, T1031, T1032, and 1033 that relate to a television program and are stored in the playback segment management information storage unit 1206.

Each piece of playback segment management information T1030, T1031, T1032, and T1033 are identical in structure. The following describes the piece of playback segment management information T1030.

The piece of playback segment management information T1030 is composed of sets of a segment ID, an offset time, a playback time, and an importance value.

The offset time shows an offset from the head of television program data stored in the video contents information unit 1202.

If the offset time is written as 00:10:00, this corresponds to data that should be played ten minutes from the head of the television program data.

The playback time is how long the corresponding segment plays for.

The importance value shows the importance of the segment, the importance of the segment being higher, the higher numeric value is.

The television program relating to the piece of playback segment management information T1030 of FIG. 29 is divided into four segments, with an importance value being set for each segment.

The importance values are set according to any one of a plurality of methods.

In the present embodiment three types of information are used for setting the importance values: viewership information (here, corresponding to the piece of playback segment management information T1032) which is determined based on viewer rating figures, subtitle appearance information (here, corresponding to the piece of playback segment management information T1033) which is determined based on the frequency with which subtitles appear, and user profile information (here, corresponding to the pieces of playback segment management information T1030 and T1031) which is determined based on a user profile.

The method used for determining the importance value is selected according to the information type in the playback rule information table T1020.

When the information type is "viewership information", the importance values are set based on the viewer rating figures for each playback segment of the television program. The higher the viewer rating figure for the segment, the higher the value given to the segment.

The viewer rating figures may be measured by the company that operates the server apparatus 1040, or may be the result of a survey by a third party organization.

When the information type is "subtitle appearance information", the importance values are set such that the more frequently subtitles appear in a segment, the higher the value given to the segment.

Subtitle appearance periods may be measured by the company that operates the server apparatus 1040, or may be provided by the broadcaster of the television program.

When the information type is user profile information, the importance values are set such that the higher the user's preference is for a segment, the higher the value given to the segment.

As one example, the user may notify names of favorite performers to the server apparatus 1040 in advance.

Furthermore, the company that operates the server apparatus 1040 may obtain, in advance, information showing which performers appear when on television programs that are targets of such an investigation.

The importance values are set such that the longer a user's favorite performer appears, the higher the importance value of the playback segment of the television program.

In the present embodiment, for each one television program, the playback segment management information storage unit 1206 stores three types of playback segment management information based respectively on viewer rating figures, frequency of subtitle appearance, and user profile.

However, it is possible to instead obtain and store only the necessary parts of the playback segment management information from the server apparatus 1040.

<Determination Unit 1207>

The determination unit 1207 determines the television program digest playback procedure using the playback rule determination table, the playback rule information table, and a piece of playback segment management information, and notifies the determined procedure to the playback unit 1209.

Determination of the digest playback procedure is described later.

<User Instruction Obtaining Unit 1208>

The user instruction obtaining unit 1208 obtains an instruction made by the user using a remote control (not illustrated), and distributes the remote control instruction to an appropriate transfer destination.

For example, if the remote control instruction is a channel selection instruction, the user instruction obtaining unit 1208 transmits the channel selection instruction to the broadcast reception unit 1201. The broadcast reception unit 1201 receives, decodes, and multiplex separates a television program of a broadcast station instructed separately, outputs the resulting transport stream of the television program, and the playback unit 1209 plays the television program.

If the remote control instruction is an instruction for digest playback, the user instruction obtaining unit 1208 instructs the playback unit 1209 to perform digest playback.

<Playback Unit 1209>

The playback unit 1209 is composed of an MPEG decoder module, an OSD (On Screen Display) module, an image superimposing module, and the like. The playback unit 1209 performs MPEG decoding, using the MPEG decoder module, of a transport stream output by the broadcast reception unit 1201 or recorded in the image content storage unit 1202, to obtain video, audio, data, and the like, and plays the obtained video and audio in accordance with the playback rule determined by the determination unit 1207.

<Clock Unit 1210>

The clock unit 1210 counts time. On receiving a time obtain request, the clock unit 1210 responds by sending time information showing the time at which the time obtain request was received to the request origin.

(2) Server Apparatus 1040

The server apparatus 1040 is, specifically, a digital broadcast receiver or the like composed of a CPU, a ROM, a RAM, a hard disk, a network adapter, and the like. Computer programs are stored in the ROM, and the server apparatus 1040 realizes its functions by the CPU operating in accordance with the computer programs.

The server apparatus 1040 transmits information such as the playback rule determination table, the playback rule information table, and the playback segment management information to the video playback apparatus 1020.

3.3 Operations

Here, it is assumed that the video playback apparatus 1020 performs reception and recording of video content, creation of the recorded program information table, obtaining and updating of the playback rule determination table, the playback rule information table, the playback segment management information and the like before digest playback operations, during a period when the processing load is relatively low, such as during normal viewing operations or during standby.

The following describes operations for video content digest playback.

Figure 30:
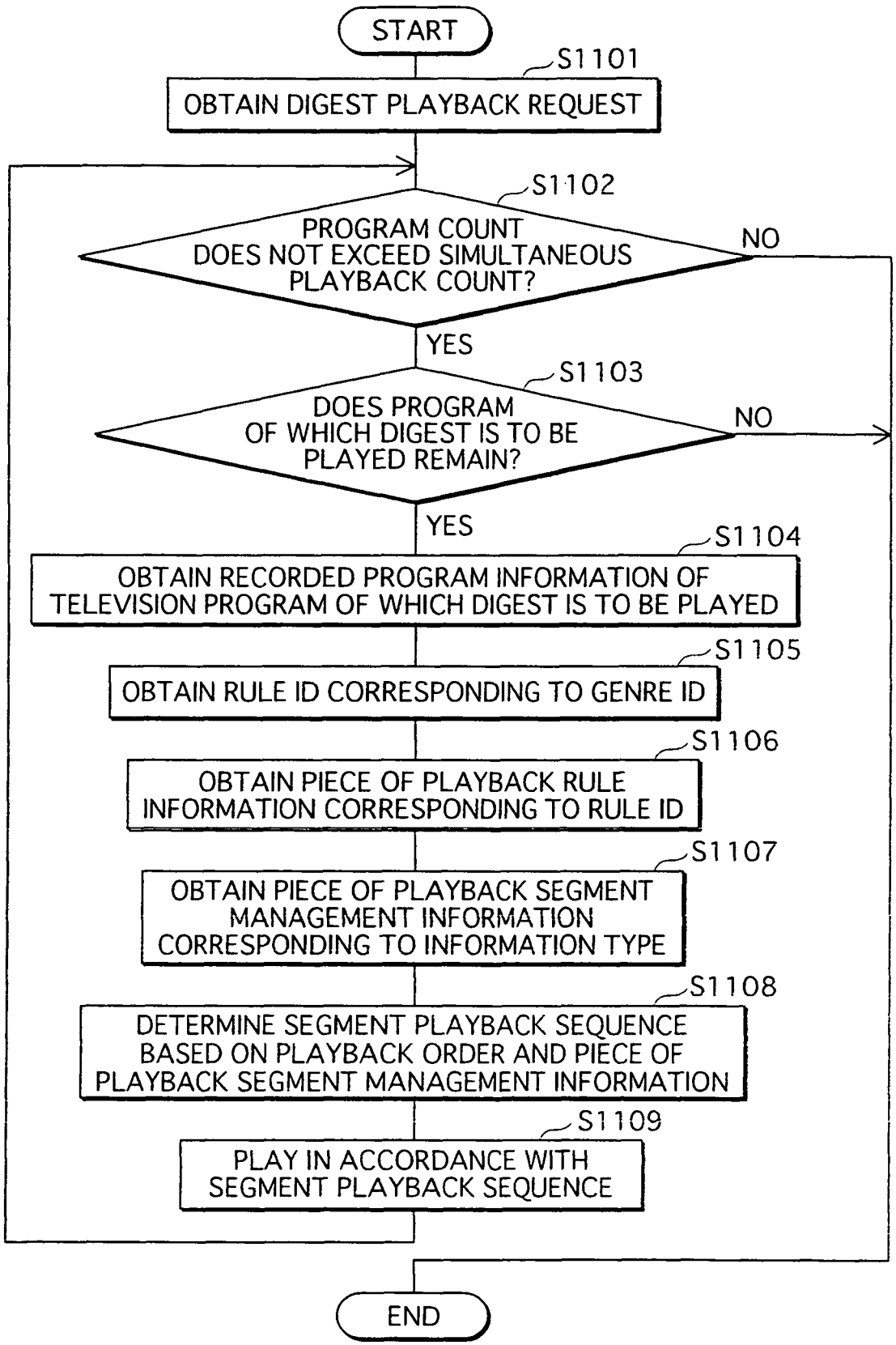
FIG. 30 is a flowchart showing a procedure for determining a playback segment sequence for performing operations for digest playback of video content.

FIG. 30 is a flowchart showing the procedure for determining a segment playback sequence for performing video content digest playback.

First, using the remote control, the user instructs the video playback device 1020 to perform digest playback.

The user instruction obtaining unit 1208 obtains the digest playback instruction given by the remote control (step S1101).

The user instruction obtaining unit 1208 transmits the digest playback instruction to the playback unit 1209, and the playback unit 1209 obtains the digest playback instruction.

The playback unit 1209 gives a segment playback sequence determination instruction to the determination unit 1207.

The determination unit 1207 first checks that television programs for which digest playback has commenced do not exceed a simultaneous playback count (step S1102).

Here, simultaneous playback count denotes how many digest playback videos are displayed simultaneously on the playback screen. In the present embodiment, the value of the simultaneous playback count is set as "6".

When the number of digest playback videos exceeds the simultaneous-playback count ("NO" at step S1102), the processing ends.

When the number of digest playback videos does not exceed the simultaneous playback count ("YES" at step S1102), the determination unit 1207 judges whether the television program of which a digest is to be played remains among the television programs in the recorded program information table (step S1103).

When the television program does not remain ("NO" at step S1103), the processing ends.

When the television program does remain ("YES" at step S1103), the determination unit 1207 reads the piece of recorded program information of the television program from the recorded program information table T1000 (step S1104).

The determination unit 1207 refers to the playback rule determination table T1010, obtains the rule ID corresponding to the genre ID in the read piece of recorded program information (step S1105), and reads the piece of playback rule information corresponding to the rule ID from the playback rule information table T1020 (step S1106).

Furthermore, the determination unit 1207 obtains the piece of playback rule information having the rule ID "001" from the playback rule information table T1020.

The determination unit 1207 obtains the piece of playback segment management information corresponding to the information type in the read piece of playback rule information (step S1107).

Next, the determination unit 1207 determines the segment playback sequence based on the "playback order" in the obtained piece of playback rule information and the obtained piece of playback segment management information (step S1108).

The playback unit 1209 plays the video content in accordance with the segment playback sequence determined by the determination unit 1207 (step S1109).

The operations from step S1104 to step S1109 are described with use of a specific example.

Suppose that the television program that is selected at step S1104 as the television program for which a digest is to be played is the television program that has the latest recording date-time in the recorded program information table T1000 shown in FIG. 26.

The television program has a program ID of a value "6" and a program name "news program 1".

Since the genre ID of "news program 1" is "001 (news)", the determination unit 1207 obtains the value "001" as the rule ID from the playback rule determination table T1010 at step S1105.

Since the value of the rule ID is "001", at step S1106 the determination unit 1207 recognizes from the playback rule information table T1020 that the information type is "user profile information 1", the playback order is "order of importance", and the playback time is "10 minutes".

In the present example, when the information type is "user profile information 1", the corresponding piece of playback segment management information is the piece of playback segment management information T1030 shown in FIG. 29.

Using the piece of playback segment management information T1030 of FIG. 29, the determination unit 1207 determines the segment playback sequence such that the segment having the highest importance value, in other words, the segment having the segment ID with the value "3", is to be played first, and the segments having the segment ID "1", the segment ID "2", and the segment ID "4" are to be played subsequently in the stated order.

When the playback order is "chronological order", the determination unit 1207 determines the segment playback sequence such that the segments are played in order of offset time starting from that having the smallest offset time.

FIG. 31 is a playback sequence list T1040 that shows the final segment playback order. The playback sequence list T1040 is generated by the determination unit 1207 in accordance with the segment playback sequence determined at step S1108.

The playback sequence list T1040 is an area for storing at least one set of a segment ID, an offset time and a playback time.

Here, the playback time T1041 of the playback segment having the segment ID "1" is "00:02:00", not "00:03:00". This shows that the recording of the television program commenced one minute after the commencement of the television program, and compensates for the fact that the first one minute of the television program was not recorded.

Furthermore, since the total playback time is prescribed as 10 minutes according to the playback rule information table T1020, the playback time T1042 of the playback segment having the segment ID "4" is only two minutes.

Figure 32:
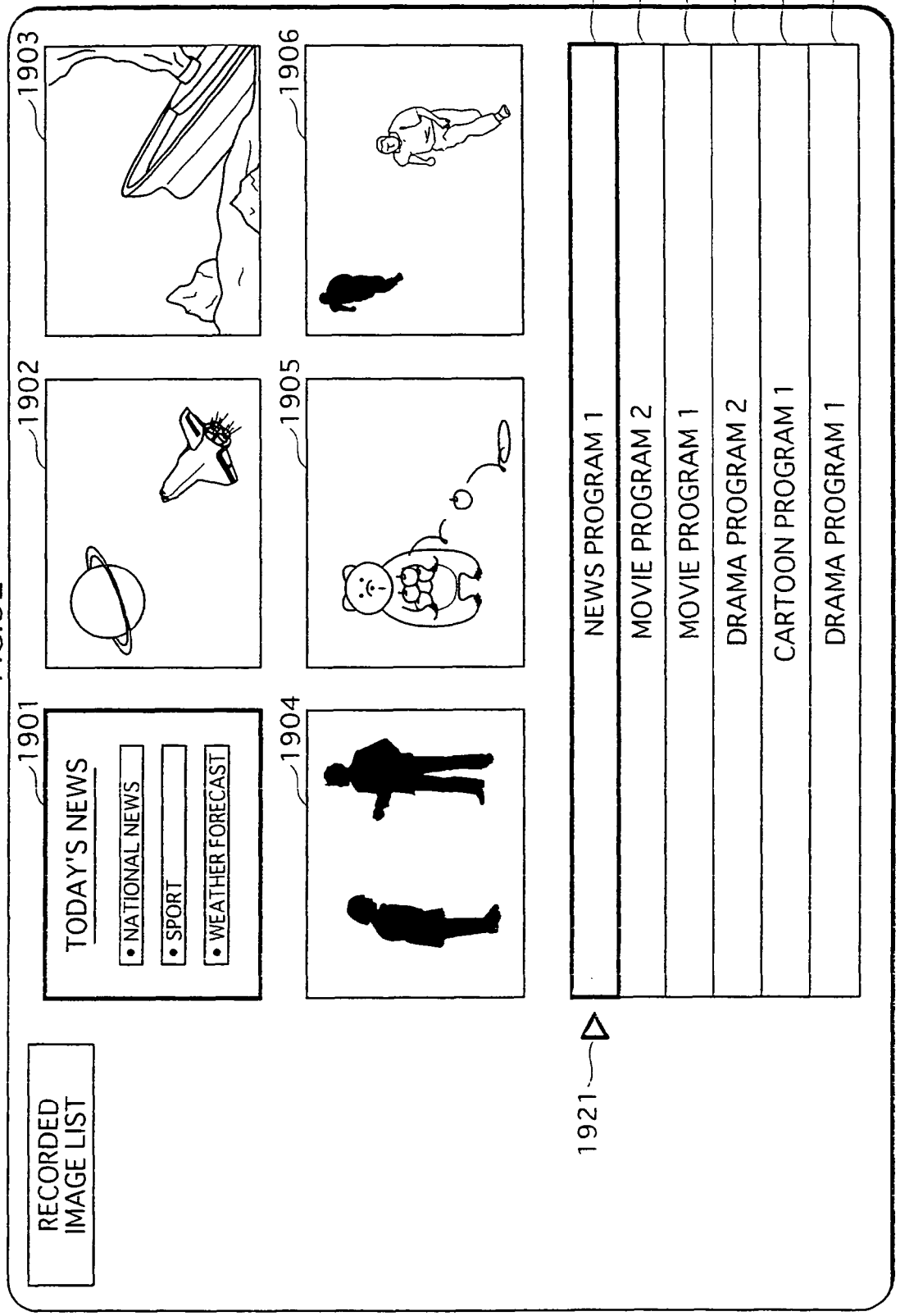
FIG. 32 shows an example of display of a digest playback screen on a display apparatus 1030.

FIG. 32 shows an example of display of a digest playback screen by the display apparatus 1030.

Digest playback video is displayed in each of video display areas 1091 to 1906.

For instance, the aforementioned "news program 1" is displayed in the video display area 1901, a "movie program 2" is displayed in video display area 1902, a "movie program 1" is displayed in video display area 1903, a "drama program 2" is displayed in video display area 1904, a "cartoon program 1" is displayed in video display area 1905, and a "drama program 1" is displayed in video display area 1906.

The lower half of the digest playback screen displays, in description display frames 1911 to 1916, program names of the video content displayed in the video display areas 1901 to 1906.

Figure 33:
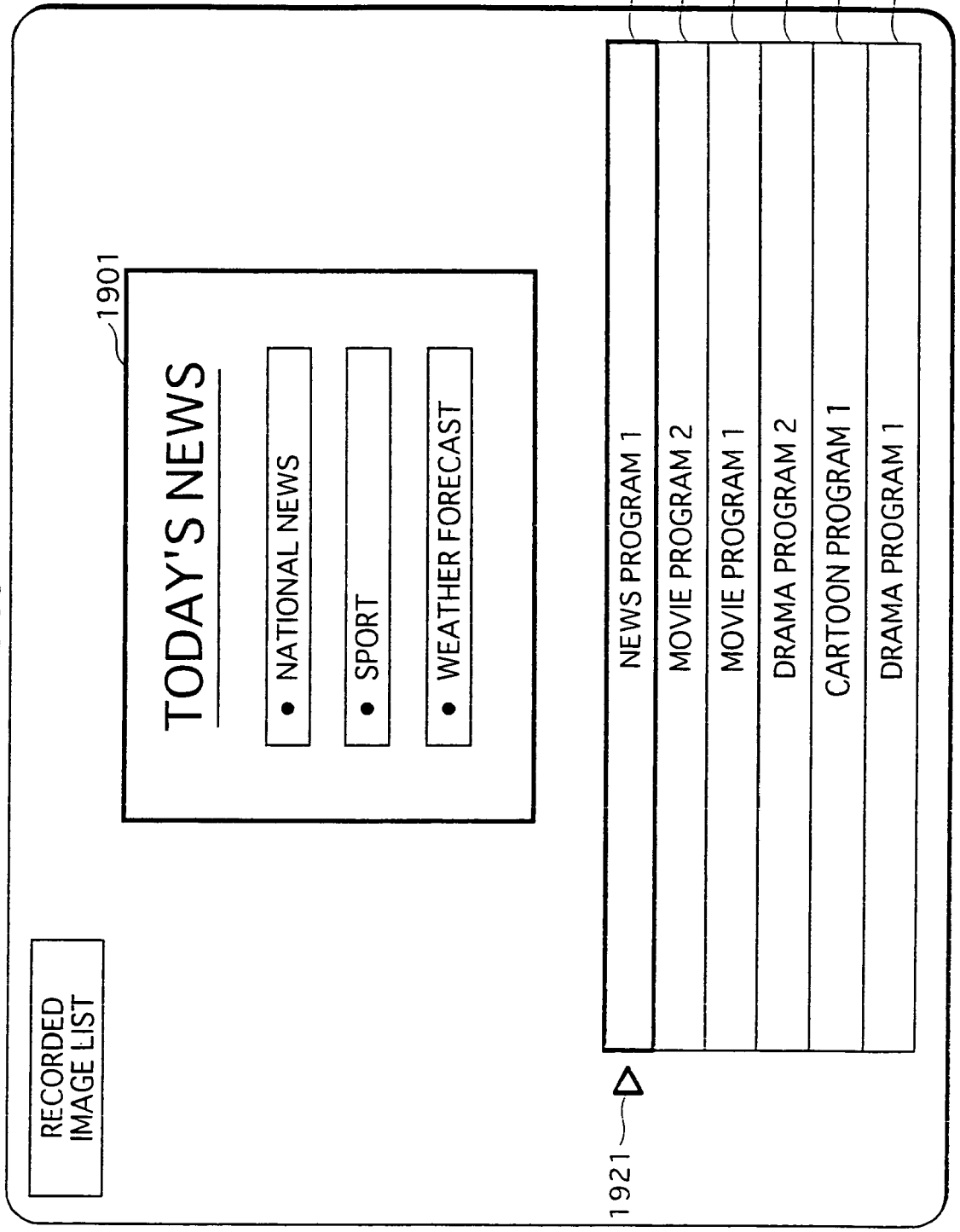
FIG. 33 shows an example of a digest playback screen for displaying one display video on the display apparatus 1030.

FIG. 33 is an example of display of one display video in the digest playback screen.

The user is able to select one of the description display frames 1911 to 1916 by moving the selection mark 1921 up and down with the remote control. An digest playback image is displayed in the video display area corresponding to the selected description display frame.

3.4 Modifications

The present invention has been described based on, but is not limited to, the second embodiment. Various changes may be made within a scope that does not depart from the gist of the present invention, and cases such as the following are included in the present invention.

(1) The playback information reception unit 1204 is not limited to obtaining the playback rule determination table, the playback rule information table, and the playback segment management information from the server apparatus 1040 via the network. The playback information reception unit 1204 may obtain these tables and information from a recording medium such as a CD or a DVD. Alternatively, part or all of the playback rule determination table, the playback rule information table, and the playback segment management information may be stored in advance in the playback rule storage unit and the playback segment management information storage unit.

(2) The server apparatus 1040 may commence transmitting the playback rule determination table, the playback rule information table, and the playback segment management information via the network to the video playback apparatus 1020 with arbitrary timing, or after receiving a transmission request from the video playback apparatus 1020.

(3) Although the playback information reception unit 1204 is described as obtaining the playback rule determination table, the playback rule information table, and the playback segment management information via the network from the server apparatus 1040, the playback segment management information may instead by generated by the video playback apparatus 1020.

For instance, in a case in which information relating to importance value is generated in the video playback apparatus 1020, the video playback apparatus 1020 makes a database by accumulating information about the user's favored performers, genres, and the like, obtained from operation history of playback operations, recording presetting operations and the like made by the user. The video playback apparatus 1020 uses this database to determine the importance value of each playback segment of video data.

The video playback apparatus 1020 performs performer verification with respect to the moving picture data that is the target of digest playback, to obtain information about which playback segments a specific performer appears in, and performs processing to increase the importance value of playback segments in which the user's favored performer appears.

(4) In the present embodiment, the playback segment management information storage unit 1206 stores, in advance, three types of playback segment management information for each television program: one based on viewership, one based on the frequency of appearance of subtitles, and one based on user profile. However, it is possible for the playback segment management information storage unit 1206 to select and store only the necessary playback segment management information.

If three pieces of playback segment management information are stored for each television program, any changes in the information type corresponding to the television can be dealt with quickly. On the other hand, if only the piece of playback segment management information indicated by the information type is stored for the television program, the memory capacity required to store the information can be reduced.

(5) Although one piece of playback segment management information corresponding to one information type is used with respect to one television program in the present embodi ment, a plurality of sets of playback segment management information may be used.

In such a case, the importance value in each of the plurality of playback segment management tables may be, for example, simply compared and added to calculate an overall importance value. Alternatively, importance values may be calculated with the numerical data of playback segment management table or tables weighted so as to reflect their importance according to genre.

(6) Although the segment playback sequence is determined based on the playback segment management information in accordance with a condition of either order of importance or chronological order, the condition is not limited to being order of importance or chronological order.

For example, the condition may be one of playing playback segments whose importance value in the target piece of playback segment management information has at least a predetermined value.

Figure 34:
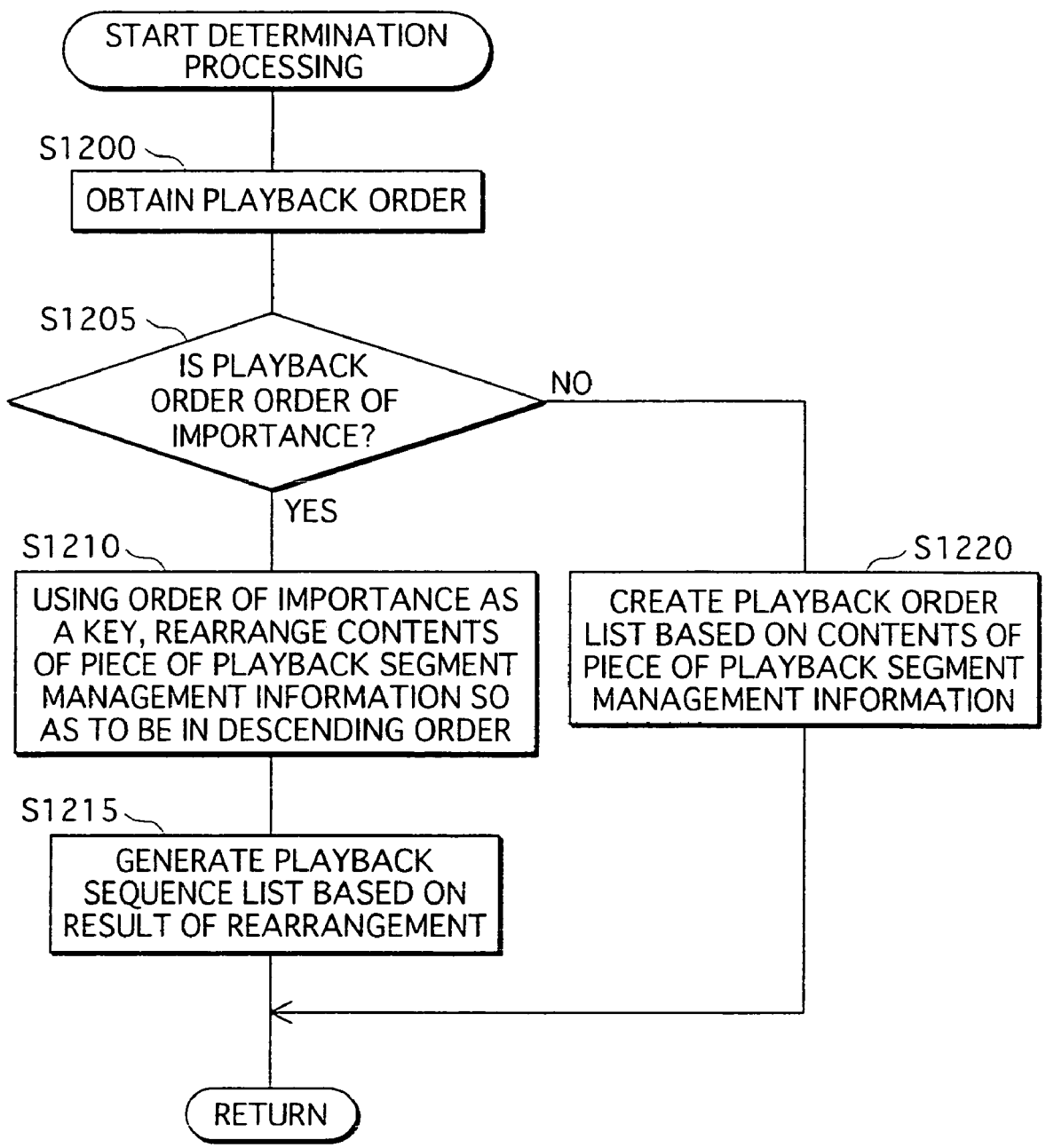
FIG. 34 is a flowchart showing operations of determination processing performed by a determination unit 1207.

(7) The following describes the method for determining the segment playback sequence in step S1108 of FIG. 30 with use of the flowchart in FIG. 34.

Here, the operations of step S1108 are described in detail as determination processing.

The determination unit 1207 obtains the playback order included in the playback rule information obtained at step S1106 in FIG. 30 (step S1200).

The determination unit 1207 judges whether or not the obtained playback order is order of importance (step S1205).

When the playback order is judged to be the order of importance ("YES" at step S1205"), the determination unit 1207 rearranges the contents of the piece of playback segment management information obtained at step S1107 in FIG. 30, so as to be in descending order of order of importance (step S1210). The determination unit 1207 generates a playback sequence list based on the result of the rearrangement (step S1215).

When the playback order is judged to not be the order of importance ("NO" at step S1205), the determination unit 1207 generates a playback sequence list based on contents of the piece of playback segment management information obtained at step S1107 of FIG. 30 (step S1220).

(8) The segments corresponding to the segment IDs may be the sections in the television program, for example.

Furthermore, the segments are not limited to being sections in the television programs. The segments may be a collection of the television program cut at predetermined time intervals (for example 20 minutes). For example, a recorded program that has a recording time of sixty minutes will be formed from three segments when cut at twenty minute intervals.

3.5 Conclusion

In recent years development of home-use recorder devices that store video data and the like in a large-capacity storage apparatus such as an HDD (Hard Disk Drive) has been vigorous, and performance of such devices has improved remarkably. In particular, the storage capacity of storage apparatuses has increased sharply.

As the number and amount of video data that can be stored increases as a result of increasing storage capacity, it becomes more difficult for the user to easily grasp the contents of the video data stored in the storage apparatus.

Digest playback is one known technique for efficiently grasping contents of the video data stored in the storage apparatus. When playing a digest, a conventional apparatus obtains frames from the video data, and creates special playback information containing video location information that shows the location of each obtained frame in the original video data and display time information that shows the display time of each frame.

For example, in accelerated playback for confirming the contents at high speed, in order to ensure that the changes in the display screen are as constant as possible, display time may be determined in advance such that parts with much movement are displayed for a relatively long time and part with little movement are displayed for a relatively short time. This enables relatively long video to be seen in a relatively short time, and, consequently, the contents of the video data can be grasped in a short time.

However, there are cases in which, when a conventional apparatus performs digest playback, playback of the scenes that directly express contents of the video content are omitted or reduced, and the contents of the television program cannot be sufficiently grasped. The scenes that directly express contents of the video content differ depending on the genre to which the television program belongs, such as news, drama, or music. For example, in the case of a news program, the scenes that directly express contents of the video content are the head parts of the segments such as economics, politics, weather information, and sport, where captions that express the contents of the segment are displayed. Furthermore, in the case of a drama program or a music program, the scenes that directly express contents of the video content may be scenes where a predetermined performer who the user is especially interested in viewing appears.

When performing digest playback of a television program recorded in a storage apparatus using the video playback apparatus 1020 of the present invention, the contents of the video data can be grasped efficiently since the scenes that are played are those that directly express the contents of the video content.

4. Second Embodiment Modification Example

The following describes a modification example of the second embodiment together with examples shown in the drawings.

In the second embodiment, an explanation was given of a case in which only one user profile is used with respect to digest playback. In the present modification example, a description is given of digest playback using a plurality of user profiles. The description focuses on aspects that differ from the second embodiment.

4.1 Video Playback Apparatus 2020

Figure 35:
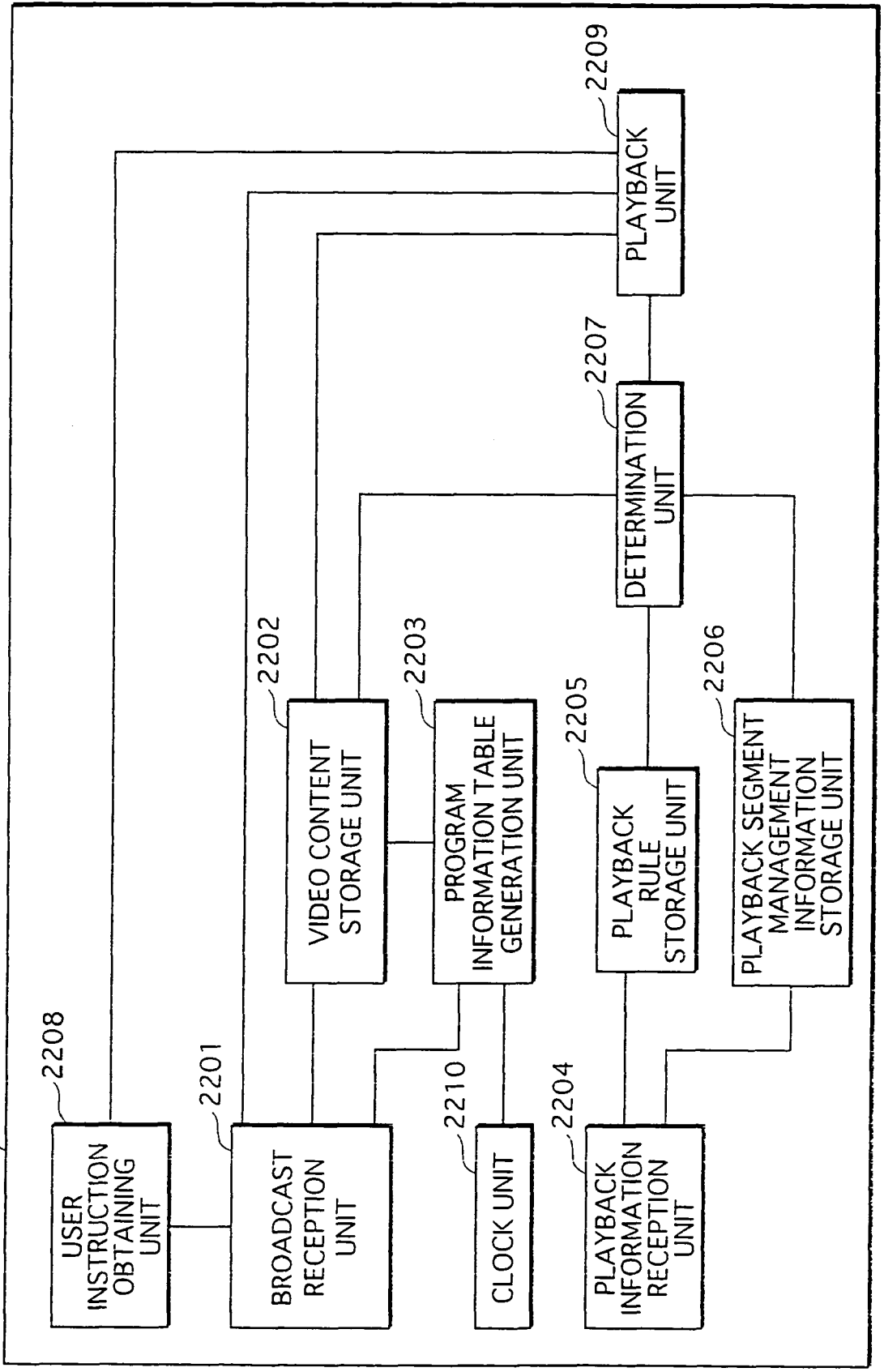
FIG. 35 is a block diagram showing the structure of a video playback apparatus 2020.

The video playback apparatus 2020, as shown in FIG. 35, is composed of a broadcast reception unit 2201, a video content storage unit 2202, a program information table generation unit 2203, a playback information reception unit 2204, a playback rule storage unit 2205, a playback segment management information storage unit 2206, a determination unit 2207, a user instruction obtaining unit 2208, a playback unit 2209, and a clock unit 2210.

The video playback apparatus 2020 is, specifically, a digital broadcast receiver or the like composed of a CPU, a ROM, a RAM, a hard disk, a network interface, a tuner, an error corrector, a transport decoder, a video/audio decoder, and the like. Computer programs are stored in the ROM, and the video playback apparatus 2020 realizes its functions by the CPU operating in accordance with the computer programs.

<Broadcast Reception Unit 2201>

The broadcast reception unit 2201 operates in the same way as the broadcast reception unit 1201 shown in the second embodiment, and therefore a description thereof is omitted here.

<Video Content Storage Unit 2202>

The video content storage unit 2202 operates in the same way as the video content storage unit 1202 shown in the second embodiment, and therefore a description thereof is omitted here.

<Program Information Table Generation Unit 2203>

The program information table generation unit 2203 operates in the same way as the program information table generation unit 1203 shown in the second embodiment, and therefore a description thereof is omitted here.

Note that the recorded program information table T1000 is used when necessary in the following description.

<Playback Information Reception Unit 2204>

The playback information reception unit 2204 operates in the same way as the playback information reception unit 1204 shown in the second embodiment, and therefore a description thereof is omitted here.

<Playback Rule Storage Unit 2205>

The playback rule storage unit 2205 stores the playback rule determination table and the playback rule information table obtained from the playback information reception unit 2204.

The playback rule determination table stored by the playback rule storage unit 2205 is the same as the playback rule determination table T1010 shown in the second embodiment, and therefore a description thereof is omitted here. Note that the playback determination table T1010 is used when necessary in the following description.

FIG. 36 shows an example of the playback rule information table T2020 stored in the playback rule storage unit 2205.

The playback rule information table T2020 is composed of at least one piece of playback rule information, each piece of playback rule information being composed of a rule ID, an information type, a playback order, and a playback time.

The rule ID, the playback order, and the playback time are the same as in the playback rule information table T1020 in the second embodiment, and therefore a description thereof is omitted here.

The type information shows the type of the corresponding piece of playback segment management information. In digest playback, the contents of the information type are the same as in the second embodiment when using playback segment management information of viewership information or when using the playback segment management information of subtitle appearance information. In the case of using user profile, instead of listing a specific user profile, the information type is listed in a manner that shows that user profiles are to be used in digest playback (here listed simply as "user profile").

<Playback Segment Management Information Storage Unit 2206>

The playback segment management information storage unit 2206 stores a piece of playback segment management information for each television program stored in the video content storage unit 2202.

As in the second embodiment, the playback segment management information storage unit 2206 stores three types of playback segment management information for each television program: a piece of playback segment management information relating to user profile information, a piece of playback segment management information relating to viewership information, and a piece of playback segment management information relating to subtitle appearance information.

The playback segment management information relating to viewership information and playback segment management information relating to subtitle appearance information have the same structure as in the second embodiment and therefore a description thereof is omitted here.

The following describes playback segment management information of the user profile information. Note that here the playback segment management information storage unit 2206 stores, with respect to each one television program, a piece of playback segment management information relating to viewership information, a piece of playback segment management information relating to subtitle appearance information, and pieces of playback segment management information relating to three sets of user profile information (in other words, respective user profile information of three users). FIG. 37 shows pieces of playback segment management information T2030, T2031, and T2032 of three sets of user profile information. Each of the pieces of playback segment management information T2030, T2031, and T2032 is identical in structure. The following describes the piece of playback segment management information T2030.

The piece of playback segment management information T2030 is the same as the piece of playback segment management information T1030 shown in the second embodiment, but has the addition of a user ID. The user ID is an identifier that identifies a user of the video playback apparatus 2020. In the present example each user has been allocated a user ID in advance.

The segment IDs, the offset times, the playback times, and the importance values are the same as described in the second embodiment, and therefore a description thereof is omitted here.

<Determination Unit 2207>

The determination unit 2207 determines the television program digest playback procedure using the playback rule determination table, the playback rule information table, and the playback segment management information, and notifies the determined procedure to the playback unit 2209.

The determination unit 2207 stores in advance an importance value evaluation function that calculates, based on input of at least one importance value, a new importance value such that the importance value of a common preference of the users is increased. As one example, the importance value evaluation function is a function for calculating a sum of the at least one input importance values. Note that the importance value evaluation function may use another calculation method to determine the new importance value.

The determination unit 2207 receives a segment playback sequence determination instruction from the playback unit 2209.

The determination unit 2207 receives at least one user ID from the playback unit 2209.

The determination unit 2207 confirms that the number of television programs for which digest playback has commenced does not exceed the simultaneous playback count. Note that the value of the simultaneous playback count is set as "6" as in the second embodiment.

The determination unit 2207 ends the processing if the simultaneous playback count is exceeded.

When the simultaneous playback count is not exceeded, the determination unit 2207 judges whether or not the television program for which a digest is to be played remains in the recording program information table T1000.

The determination unit 2207 ends the processing if the television program for which a digest is to be played does not remain.

When the television program for which a digest is to be played remains, the determination unit 2207 reads the piece of recorded program information relating to the television program for which a digest is to be played from the recorded program information table T1000.

The determination unit 2207 refers to the playback rule determination table T1010, obtains the rule ID corresponding to the genre ID in the read piece of recorded program information, and reads the piece of playback rule information corresponding to the rule ID from the playback rule information table T2020.

The determination unit 2207 judges whether or not the type information included in the read piece of playback rule information is user profile.

When the type information is judged to be user profile, the determination unit 2207 obtains the playback segment management information of the at least one user profile of each of the at least one received user IDs. For example, when the user IDs "1" and "2" are received, the determination unit 2207 obtains the pieces of playback segment management information T2030 and T2031.

Using each obtained piece of playback segment management information and the importance value evaluation function, the determination unit 2207 calculates the importance value for each segment ID based on the at least one user profile. For example, when the pieces of playback segment management information T2030 and T2031 have been obtained, the determination unit 2207 first uses the importance values "30" and "15", which are shown in the pieces of playback segment management information T2030 and T2031 respectively as corresponding to the segment ID "1", and the importance value evaluation function, to find the sum of "35" and "15", thereby calculating a new importance value "45". The determination unit 2207 sets this calculated importance value "45" as the importance value corresponding to the segment ID "1". Using the same method, the determination unit 2207 subsequently calculates an importance value "80" corresponding to the segment ID "2", an importance value "60" corresponding to a segment ID "3", and an importance value "30" corresponding to a segment ID "4".

The determination unit 2207 uses one of the obtained pieces of playback segment management information, and each calculated importance value, to create a piece of playback segment management information corresponding to at least one user. For example, in the case of receiving user IDs "1" and "2", the determination unit 2207 creates the piece of playback segment management information T2033 shown in FIG. 38.

The determination unit 2207 determines the segment playback sequence from the "playback order" in the read piece of playback rule information and the created piece of playback segment management information, and creates a playback sequence list.

When the information type is judged to not be user profile, the determination unit 2207, in the same way as in the second embodiment, obtains the piece of playback segment management information corresponding to the information type in the read piece of playback rule information, and determines the segment playback sequence from the "playback order" in the obtained piece of playback rule information and the obtained piece of playback segment management information.

<User Instruction Obtaining Unit 2208>

The user instruction obtaining unit 2208 obtains an instruction made by the user using a remote control (not illustrated), and distributes the remote control instruction to an appropriate transfer destination.

If the remote control instruction is an instruction for digest playback, the user instruction obtaining unit 2208 instructs the playback unit 2209 to perform digest playback. The user instruction obtaining unit 2208 also receives, from the remote control, at least one ID of users who are to view the audio and video of digest playback, and outputs the received at least one user ID to the playback unit 2209.

<Playback Unit 2209>

The playback unit 2209 plays video and audio in the same way as the playback unit 1209 shown in the second embodiment.

On receiving a digest playback instruction from the user instruction obtaining unit 2208, the playback unit 2209 outputs a determination instruction to the determination unit 2207, and on receiving at least one user ID from the user instruction obtaining unit 2208, the playback unit 2209 outputs the received at least one user ID to the determination unit 2207.

<Clock Unit 2210>

The clock unit 2210 operates in the same way as the clock unit 1210 shown in the second embodiment, and therefore a description thereof is omitted here.

4.2 Operations

<Digest Playback Operations>

The following describes the procedure for digest playback of video content.

Figure 39:
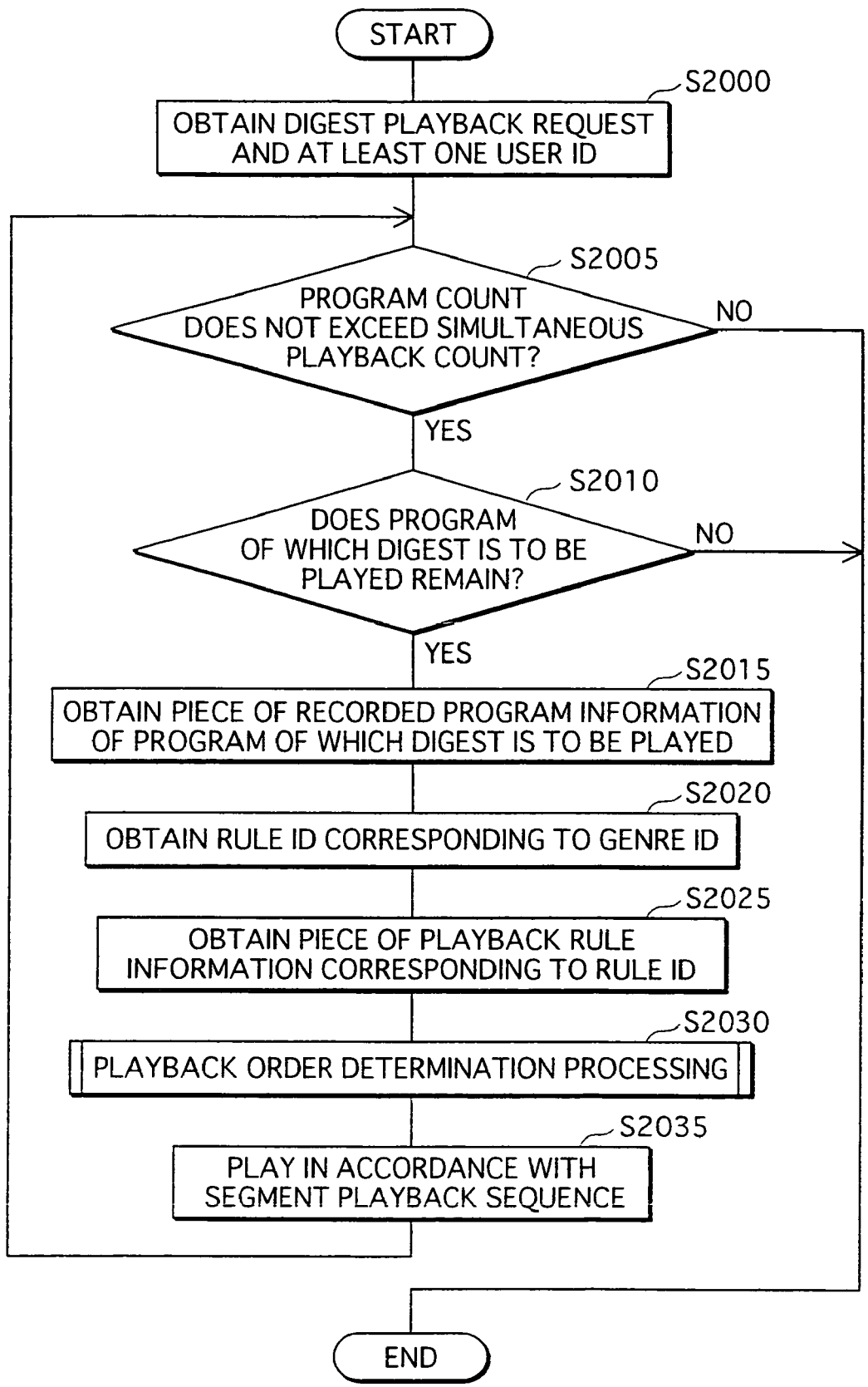
FIG. 39 is a flowchart showing a procedure performed by a video playback apparatus 2020 for determining a playback segment sequence for performing operations for digest playback of video content.

FIG. 39 is a flowchart showing operations for determining the playback segment sequence for performing video content digest playback operations.

First, the user gives a digest playback instruction with respect to the video playback apparatus 2020 using the remote control, and, in addition, transmits at least one user ID.

The user instruction obtaining unit 2208 obtains the digest playback instruction made by the remote control, and obtains the at least one user ID (step S2000).

The user instruction obtaining unit 2208 outputs the digest playback instruction and the at least one user ID to the playback unit 1209, and the playback unit 1209 obtains the digest playback instruction and the at least one user ID.

The playback unit 1209 outputs a segment playback sequence determination instruction and the at least one user ID to the determination unit 1207, and the determination unit 2207 obtains the determination instruction and the at least one user ID.

The determination unit 2207 first checks that the number of television programs of which digest playback has already started does not exceed the simultaneous playback count (step S2005).

When the simultaneous playback count is judged to be exceeded ("NO" at step S2005), the determination unit 2207 ends the processing.

When the simultaneous playback count is judged not to be exceeded ("YES" at step S2005), the determination unit 2207 judges whether the television program for which digest playback is to be performed remains in the recorded program information table (step S2010).

When the television program for which digest playback is to be performed is judged not to remain ("NO" at step S2010"), the determination unit 2207 ends the processing.

When the television program for which digest playback is to be performed is judged to remain ("YES" at step S2010), the determination unit 2207 reads the piece of recorded program information relating to the television program for which digest playback is to be performed from the recorded program information table T1000 (step S2015).

The determination unit 2207 refers to the playback rule determination table T1010, obtains the rule ID corresponding to the genre ID in the read piece of recorded program information (step S2020), and reads the piece of playback rule information corresponding to the rule ID from the playback rule information table T1010 (step S2025).

The determination unit 2207 performs playback order determination processing and determines the segment playback sequence (step S2030).

The playback unit 1209 plays the video content following the playback segment sequence determined by the determination unit 1207 (step S2035).

<Playback Order Determination Processing>

Figure 40:
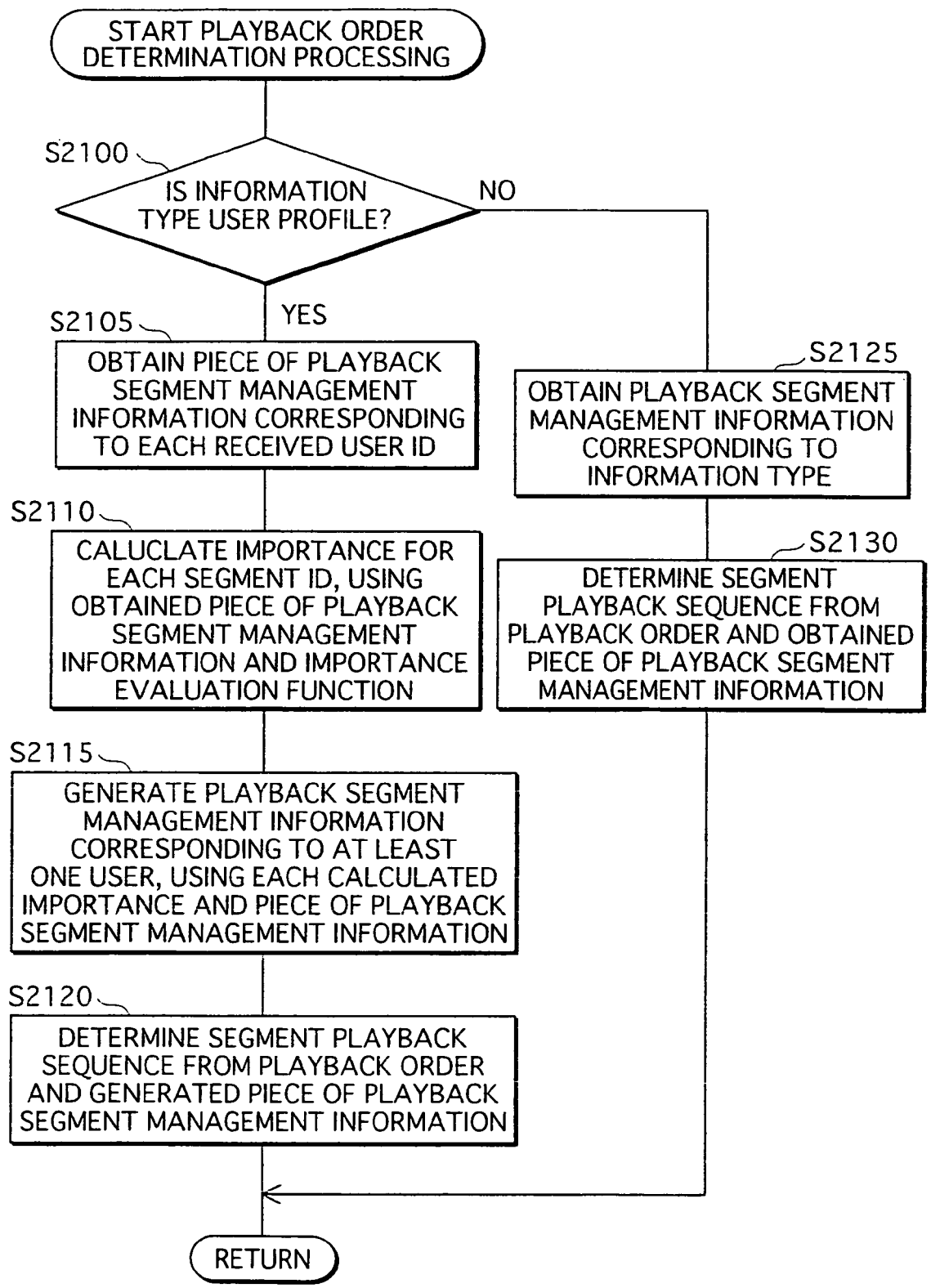
FIG. 40 is a flowchart showing operations for playback order determination processing performed by a determination unit 2207.

The following describes the operations of playback order determination processing performed at step S2030 in FIG. 39, with use of the flowchart in FIG. 40.

The determination unit 2207 judges whether or not the information type in the piece of playback rule information read at step S2025 in FIG. 39 is user profile (step S2100).

When the information type is judged to be user profile ("YES" at step S2000), the determination unit 2207 obtains the at least one piece of playback segment management information of the at least one user profile corresponding to the received at least one user ID (step S2105).

Using each obtained piece of playback segment management information and the importance value evaluation function, the determination unit 2207 calculates the importance value for each segment ID based on the at least one user profile (step S2110).

The determination unit 2207 uses one of the obtained pieces of playback segment management information, and each calculated importance value, to create a piece of playback segment management information corresponding to the at least one user (step S2115).

The determination unit 2207 determines the segment playback sequence from the "playback order" in the read piece of playback rule information and the created piece of playback segment management information, and creates a playbacks sequence list (step S2120).

When the information type is judged to not be user profile ("NO" at step S2000), the determination unit 2207 obtains the piece of playback segment management information corresponding to the information type in the read piece of playback rule information (step S2125), and determines the segment playback sequence from the "playback order" in the obtained piece of playback rule information and the obtained piece of playback segment management information (step S2130).

4.3 Other Modification Examples

According to the described modification example, when audio and video of digest playback is to be viewed by a plurality of users, the importance value of items that the users have a common preference for can be increased.

Note that various changes may be made within a scope that does not depart from the gist of the present invention, and cases such as the following are included in the present invention.

(1) The playback time allocated for each segment ID is not limited to being fixed. The playback time for each segment ID may be allocated according to the importance value.

For example, the playback time of each segment ID may be calculated using a ratio of the importance value of the segment ID with respect to the sum of the importance values of the playback segment management information, and the playback times included in the playback rule information.

The following describes a calculation example using the importance values shown in FIG. 38. Note that the playback time in the playback rule information is set at 10 minutes.

The video playback apparatus calculates the sum of the importance values. Here, this total is "215". The video playback apparatus calculates the importance value ratio of the segment ID "1" using the sum "215" and the importance value "45" of the segment ID "1". Here, the importance value ratio is "0.2". Note that the importance value ratio is rounded off at the second decimal place. Similarly, the video playback apparatus calculates an importance value ratio "0.4" for the segment ID "2" and an importance value ratio "0.3" for the segment ID "3". The importance value ratio for the last segment ID "4" is assigned a number "0.1" which is the remainder after subtracting the importance value ratios calculated so far, from the number "1".

Next, the video playback apparatus calculates the playback time for each segment ID using the calculated ratios and the playback time "10 minutes". As a result, the playback time for the segment ID "1" is 2 minutes, the playback time for the segment ID "2" is 4 minutes, the playback time for the segment ID "3" is 3 minutes, and the playback time for the segment ID "4" is 1 minute.

Accordingly, when a plurality of users view audio and video according to digest playback, the content can be viewed with emphasis placed on segments corresponding to segment IDs that have high importance value with respect to a common preference of the users.

Note that the playback order here may ordinarily be chronological order.

(2) The order for playing a digest of a television program may be as follows.

The video playback apparatus has a viewing history for each user, and when performing digest playback, uses the viewing histories to determine whether there is a television program among the plurality of recorded programs that any of the at least one user who is to view the digest has not yet viewed. When there is such a television program, the video playback apparatus selects that television program and gives priority to playback of the digest of that program.

(3) Although no restrictions were described as being placed on digest playback, restrictions such as the following may be made.

A parental lock may be applied when there is a recorded television program in the video contents storage unit that a user does not wish to have viewed by another user under a certain age. For instance, in the case of a program that the user does not wish another user of the age of 15 or under to view, a number "15" may be assigned to the recorded program information as parental lock information.

The age of each user is registered in their user profile information.

Using the age in each user profile and the parental lock information in the recorded program information, the video playback apparatus judges whether or not a user exists whose age is equal to or less than the value shown in the parental lock information. When such a user is judged to exist, the video playback apparatus sets the parental lock to be on, and excludes any recorded television program that has a parental lock from being a target of digest playback. The video playback apparatus obtains the remaining at least one recorded television program and performs digest playback of the obtained at least one recorded television program.

(4) Although an example is given of the importance value evaluation function being a sum of each importance value, the importance value evaluation function is not limited to being so.

The importance value evaluation function may be any function the gives greater weighting to common preferences of users.

5. Modification Examples

The present invention has been described based on, but is not limited to, the first and second embodiments and the modification examples of the embodiments. Cases such as the following are included in the present invention.

(1) The described first embodiment and second embodiment may be combined.

For example, the first embodiment may be applied to the segments corresponding to the segment IDs shown in the second embodiment. In other words, a dialog segment may be created for each segment corresponding to each segment ID, and the dialog segments for special playback may be selected using the created at least one dialog segment and the threshold value function.

As an alternative application, the characteristic amounts to which the threshold value function is applied in the first embodiment may be used as the importance value corresponding to the segment IDs in the second embodiment. This enables only segments that have an importance value that exceeds the threshold value shown in the threshold value function to be played in special playback.

(2) Audio and video played according to special playback in the playback apparatus 100 shown in the first embodiment may be displayed using a device connected according to a home network. Here, a home network denotes a network formed inside one home.

An example is one in which the recording/playback apparatus 100 is a server apparatus in the home network, and the recording/playback apparatus 100 and a client apparatus are connected over the home network. Furthermore, the client apparatus is connected to a monitor, and the monitor displays audio and video output from the client apparatus. Here, the client apparatus is, for example, a different recording/playback apparatus to the recording/playback apparatus 100.

At this time, the client apparatus receives a predetermined reference time and a special playback type from a remote control according to a user operation. The client apparatus outputs the received reference time and special playback type to the recording/playback apparatus 100 via the home network.

On receiving the reference time and special playback type, the recording/playback apparatus 100 determines the threshold value function using the received reference time and special playback type, and determines the playback segments to be played in special playback, based on the determined threshold value function and the reference time.

The recording/playback apparatus 100 outputs the audio and video that is to be played in special playback via the home network to the client apparatus, and, on receiving the audio and video output by the recording/playback apparatus 100, the client apparatus plays the received audio and video by outputting the audio and video via the monitor.

For instance, in a case where the recording/playback apparatus 100 is on the ground floor of the home and the client apparatus is upstairs, this structure enables the user to view audio and video of special playback performed in the recording/playback apparatus 100 located on the ground floor, using the client apparatus located upstairs.

Furthermore, when audio and video of special playback is to be viewed by a plurality of users, at least one of the users can view using the recording/playback apparatus 100 while the remaining at least one of the users can view using the client apparatus.

Note that the client apparatus is described as being a recording/playback apparatus as one example, but may be an apparatus that performs playback only.

Furthermore, in the above example, the client apparatus connected to the home network and the monitor are described as being separate apparatuses, but these are not limited to being so. The device connected to the home network may be a device having both the functions of the described client apparatus and the functions of the monitor, examples of which being a television, a personal computer, a PDA, or a mobile telephone that is connectable to the home network.

Furthermore, the audio and video played in special playback by the video playback apparatus 1020 in the second embodiment may be displayed using a device connected to a home network.

(3) The audio and video played according to special playback in the recording/playback apparatus 100 in the first embodiment may be displayed using a device connected outside the home according to a network such as the Internet.

For instance, the recording/playback apparatus 100 may be a server apparatus, and the recording/playback apparatus 100 and a client apparatus may be connected to the network by the Internet. Furthermore, the client apparatus is connected to a monitor, and the monitor displays the audio and video output by the client apparatus. Here, the client apparatus is, for example, a different recording/playback apparatus to the recording/playback apparatus 100.

At this time, the client apparatus receives a predetermined reference time and a special playback type from remote control according to a user operation. The client apparatus outputs the received reference time and special playback type to the recording/playback apparatus 100 via the Internet.

On receiving the reference time and special playback type, the recording/playback apparatus 100 determines the threshold value function using the received reference time and special playback type, and determines the playback segments to be played in special playback, based on the determined threshold value function and the reference time.

The recording/playback apparatus 100 outputs the audio and video that is to be played in special playback via the Internet to the client apparatus, and, on receiving the audio and video output by the recording/playback apparatus 100, the client apparatus plays the received audio and video by outputting the audio and video via the monitor.

As one example, this structure enables a user to view audio and video of special playback performed in the recording/playback apparatus 100 from outside of the home using the client apparatus connected to the recording/playback apparatus 100 over the network.

Furthermore, when audio and video of special playback is to be viewed by a plurality of users, at least one of the users can view using the recording/playback apparatus 100 while the remaining at least one of the users can view using the client apparatus that is connected to the recording/playback apparatus over the network.

Note that the client apparatus is described as being a recording/playback apparatus as one example; but may be an apparatus that performs playback only.

Furthermore, in the above example, the client apparatus connected to a network such as the Internet and the monitor are described as being separate apparatuses, but these are not limited to being so. The device connected to the network may be a device having both the functions of the described client apparatus and the functions of the monitor, examples of which being a television, a personal computer, a PDA, or a mobile telephone that is connectable to the network.

Furthermore, the audio and video played in special playback by the video playback apparatus 1020 in the second embodiment may be displayed using a device connected to a network such as the Internet.

(4) In the first and second embodiments, special playback is described as, but not limited to, being performed with respect to content composed of sound and moving images.

Special playback may be performed with respect to content composed of sound only or with respect to content composed of moving images only.

(5) The present invention may be methods shown by the above. Furthermore, the methods may be a computer program realized by a computer, and may be a digital signal of the computer program.

Furthermore, the present invention may be a computer-readable recording medium such as a flexible disk; a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(6) The present invention may be any combination of the above-described embodiments and modifications.

6. CONCLUSION

The described playback apparatus that performs special playback has an internal structure described in the above embodiments, and can be mass produced based on this internal structure, and therefore can be used industrially.

The present invention can be used in video data recording/playback for efficiently grasping the contents of large amounts of recorded video data and extracting and playing desired video data. In particular, the present invention is appropriate for HDD recorders, DVD recorders, PDAS, mobile telephones and the like that have a large-capacity storage apparatus, a memory card, or the like.

The present invention is a recording/playback apparatus that creates digest video of moving picture content, the recording/playback apparatus including: a comparison unit operable to compare a characteristic amount of each of a plurality of segments included in moving picture content, with a threshold value assigned to each segment on a playback time axis of the moving picture content; and a creation unit operable to create the digest video using video of the moving picture content in at least one segment whose characteristic amount exceeds the threshold value, wherein each threshold value is obtained by substituting, in a predetermined function, coordinates of the segment on the playback axis as input values, the function having a property of monotonic increase and/or monotonic decrease.

Accordingly, the threshold values are assigned according to a function that has a property of monotonic increase and/or monotonic decrease. Therefore, the threshold values can be varied as time lapses, and a particular range on the playback time axis can be selected as a range to be emphasized in digest playback. For example, in the case of a function that monotonically decreases toward the end of a television program, the climax scene can be included with emphasis in the summary playback. In the case of a function that monotonically increases from the former half of a television program through to the latter half, the former half can be included with emphasis in the summary playback. This avoids viewing of digest video that goes against the user's wishes, such a user whose is looking forward to the climax point of a serial drama having their pleasure spoiled by being shown the climax point, and enables digest video that reflects the user's wishes to be created.

Here, when at least two segments exist whose characteristic amount exceeds the threshold value and a total time of the at least two segments is less than a predetermined reference time, the creation of the digest video by the creation unit may be performed by connecting video of the at least two segments.

Here, the function may be expressed by a mathematical expression, and the recording/playback apparatus may further include: an increasing unit operable to, when the total time of the at least two segments whose characteristic amount exceeds the threshold value exceeds the predetermined reference time, increase a constant in the mathematical expression so as to reduce the total time of segments whose characteristic amount exceeds the threshold value.

Accordingly, the digest video can be created so as to fit into the predetermined reference time.

Here, the function may be expressed by a mathematical expression, the digest video may be any one type of a plurality of types of digest video, and the recording/playback apparatus may further include: a receiving unit operable to receive a designation, from a user, of a desired type of digest video; and a changing unit operable to change a coefficient and/or constant in the mathematical expression in accordance with the designation of the digest video type from the user.

Accordingly, the function can be changed afterwards.

Here, the recording/playback apparatus may further include: a display unit operable to display a graph of the function, using a coordinate series where playback time of the moving picture content is an x axis and output value of the function is a y axis, wherein the receiving unit further receives an operation from the user to change the graph displayed by the display unit, and the changing of the coefficient and/or the constant by the changing unit is performed in coordination with the change operation from the user.

Accordingly, the function for finding the threshold values can be confirmed visually, and the desired digest video can be created. For instance, if the user wishes to check only an outline of moving picture content, the function can be adjusted such that the threshold values are relatively low in the former half of the moving picture content, thereby having that section only included in the summary video. Conversely, if the user wishes to view only the climax of the moving picture content, the function can be adjusted such that the threshold values are relatively low in the latter half of the moving picture content, thereby creating digest video that includes only the climax scenes.

Here, the recording/playback apparatus may further include: a playback unit operable to display a thumbnail of the moving picture content together with another thumbnail, and when the thumbnail of the moving picture content is put in a focused state, play the digest video created by the creation unit.

Accordingly, an arbitrary thumbnail can be selected from a displayed list of thumbnails, and the digest video played.

Here, the recording/playback apparatus may further include: an extraction unit operable to extract, from the moving picture content, a segment having an audio level that is of at least a prescribed level and a time length that is at least a first time and no more than a second time, the segment being selected as a dialog segment, wherein a target of the comparison by the comparison unit is the dialog segment extracted by the extraction unit.

Accordingly, dialog segments can be extracted from the moving picture content. With a conventional technique, since threshold values are assigned with respect to sound intensity at the start and end of a part of the moving picture content, a segment where the sound intensity falls below the threshold value even part way through a conversation does not fall within the scope of the digest. Therefore, there is a possibility of the conversation cutting out partway though or another conversation of a subsequent scene starting part way through. However, with the present structure, since the dialog segments are extracted in advance and the characteristic amount and the threshold value in that segment are compared, when the characteristic amount of a particular dialog exceeds the threshold value, all of that dialog segment is included in the digest video. Accordingly, by varying the threshold value, the conventional problem of conversation cutting out part way through can be avoided, and the contents of the digest video are easily comprehensible.

Here, the recording/playback apparatus may further display the type of the digest video being played.

Accordingly, the user is able to know the type of the digest video being played.

Furthermore, the present invention is a video playback apparatus, including: a content storage unit operable to store video content and attribute information showing an attribute of the video content; a playback rule storage unit operable to store at least one playback rule that designates at least one part that is a playback target relating to the video content; a deciding unit operable to decide on one of the playback rules based on the attribute information; and a playback unit operable to play the video content based on the decided playback rule.

According to the stated structure, the video playback apparatus omits playback of the parts of the video content that are not a target of playback, and plays the playback target parts only based on a playback rule. Therefore, the contents of the video content can be grasp efficiently.

Here, in the playback apparatus, the attribute information may show a genre to which the video content belongs, and the deciding unit may select a playback rule corresponding to the genre.

Accordingly, the video content is played based on a playback rule that is appropriate for the genre, and therefore the contents of the video content can be grasped efficiently.

Here, in the video playback apparatus, the video content may be composed of at least one segment, the playback rule storage unit may store, as the playback rule, for each segment, information showing a playback target part of a whole playback time of each segment, information showing an importance value of the playback target part and information showing that a playback order is descending order of importance value.

According to the stated structure, playback of parts of the video content that are not a target of playback is omitted, and the playback target parts only are played in descending order of importance value. Therefore, the contents of the video content can be grasped efficiently.

Here, in the video playback apparatus, viewership of each segment may have been measured, and each importance value may be preset such that the higher the viewership were for the corresponding playback target part when broadcast, the higher the importance value.

According to the stated structure, playback of parts of the video content that are not a target of playback is omitted, and the playback target parts only are played in descending order of viewership. Therefore, the contents of the video content can be grasped efficiently.

Here, in the video playback apparatus, each importance value may be preset such that the longer a predetermined performer appears in the corresponding playback target part, the higher the importance value.

According to the stated structure, playback of parts of the video content that are not a target of playback is omitted, and the playback target parts only are played successively from the part in which a predetermined performer appears the longest. Therefore, the contents of the video content can be grasped efficiently.

Here, in the video playback apparatus, each importance value may be preset such that the longer the appearance of subtitles in the corresponding playback target part, the higher the importance value.

According to the stated structure, playback of parts of the video content that are not a target of playback is omitted, and the playback target parts only are played successively from the part in which subtitles appear the longest. Therefore, the contents of the video content can be grasped efficiently.

Here, the video playback apparatus may further included a rule generation unit operable to generate the playback rule.

According to the stated structure, a playback rule can be generated, and therefore the playback rule can be utilized dynamically and flexibly, and the video content can be played efficiently based on the generated playback rule.

Here, in the video playback apparatus, the playback rule generation unit may store performer information showing a predetermined performer, play the stored video content in advance, and set the importance value relating to the playback target part higher, the longer the time for which the performed appears in the playback target part.

According to the stated structure, the importance value is determined based on the appearance time of a particular performer in the video content. In addition, playback of parts of the video content that are not targets of playback is omitted, and the playback target parts only are played successively from the part in which a predetermined performer appears the longest. Therefore, the contents of the video content can be grasped efficiently.

Here, in the video playback apparatus, the playback rule generation unit may play the stored video content in advance, and set the importance value relating to the playback target part higher, the longer subtitles appear in the playback target part.

According to the stated structure, the importance value is determined based on the appearance time of subtitles in the video content. In addition, playback of parts of the video content that are not targets of playback is omitted, and the playback target parts only are played successively from the part in which subtitles appear the longest. Therefore, the contents of the video content can be grasped efficiently.

The video playback apparatus of the present invention may be implemented in a single semiconductor apparatus.

According to the stated structure, playback of parts of the video content that are not targets of playback is omitted, and the playback target parts only are played successively in the order determined by the determination unit. Therefore, it can be efficiently grasped what the content is about.

Furthermore, the present invention is a video playback method performed by a video playback apparatus that includes a content storage unit, a playback rule storage unit, a deciding unit, and a playback unit, the video playback method including the steps of: a content storage step of the content storage unit storing video content and attribute information showing an attribute of the video content; a playback rule storage step of the playback rule storage unit storing at least one playback rule that designates at least one part that is a playback target relating to the video content; a deciding step of the deciding unit deciding on one of the playback rules based on the attribute information; and a playback step of the playback unit playing the video content based on the decided playback rule.

According to the stated structure, playback of the parts of the video content that are not a target of playback is omitted, and the playback target parts only are played based on a playback rule. Therefore, the contents of the video content can be grasped efficiently.

Furthermore, the present invention is a program that is used in a video playback apparatus that includes a content storage unit, a playback rule storage unit, a deciding unit, and a playback unit, the program including the steps of: a content storage step of the content storage unit storing video content and attribute information showing an attribute of the video content; a playback rule storage step of the playback rule storage unit storing at least one playback rule that designates at least one part that is a playback target relating to the video content; a deciding step of the deciding unit deciding on one of the playback rules based on the attribute information; and a playback step of the playback unit playing the video content based on the decided playback rule.

According to the stated structure, playback of the parts of the video content that are not a target of playback is omitted, and the playback target parts only are played based on a playback rule. Therefore, the contents of the video content can be grasped efficiently.

INDUSTRIAL APPLICABILITY

The described playback apparatus that performs special playback can be used for managerially, in other words, repeatedly and continuously, in an industry in which the playback apparatus is manufactured and sold.

The invention claimed is:

1. A content playback apparatus that obtains a content section from content, and plays the obtained content section, the content playback apparatus comprising:
a reference generation unit operable to generate a judgment reference that varies dynamically over a playback time axis of the content; and
a content section obtaining unit operable to obtain the content section by comparing the content with the judgment reference,
the content has a characteristic value that changes dynamically over the playback time axis,
the judgment reference is a threshold value group, and
the content section obtaining unit obtains a different piece of characteristic content from the content each time the characteristic value exceeds a threshold value in the threshold value group, and generates the content section from the at least one obtained piece of characteristic content,
the content is divided into a plurality of segments,
each segment is in correspondence with a different one of the threshold values in the threshold value group, and
the content section obtaining unit compares the characteristic value with the threshold value corresponding to the segment having the characteristic value, and when the characteristic value exceeds the compared threshold value, obtains, as a piece of characteristic content, a piece of content that composes the segment corresponding to the compared threshold value, and after performing the comparison and obtaining operations with respect to each of the segments, generates the content section from the at least one obtained piece of content,
the reference generation unit generates the threshold value group using a threshold value generation function for determining the threshold value with respect to each segment, and
the content section obtaining unit, with respect to each segment, compares the characteristic value with the threshold value determined with respect to the segment using the threshold value generation function,
the threshold value generation function has a property of monotonic increase and/or monotonic decrease on part of a domain with respect to the playback time axis,
the reference generation unit calculates the threshold values in the threshold value group by, with respect to each segment, substituting, as an input value, a playback time of the segment on the playback time axis into the threshold value generation function, and, after performing the calculation operation with respect to each segment, generates the threshold value group from the calculated threshold values, and
the content section obtaining unit compares, with respect to each segment, the characteristic value with the threshold value calculated with respect to the segment using the threshold value generation function.

2. The content playback apparatus of claim 1, wherein
the content section obtaining unit stores a predetermined reference time as a playback time of the content section, judges whether or not a total playback time of the at least one obtained piece of characteristic content is below the reference time, and when the total playback time is judged to be below the reference time, arranges the at least one obtained piece of characteristic content in an order in which the at least one obtained piece of characteristic content was obtained, thereby generating the content section.

3. The content playback apparatus of claim 2, wherein
the reference generation unit holds the threshold value generation function expressed as a polynomial function of degree 1, and
the content playback apparatus further comprises:
a control unit operable to, when the total playback time is judged by the content section obtaining unit to exceed the reference time, control so as to
cause the reference generation unit to increase a value of a constant of proportion and/or intercept in the polynomial function of degree 1, thereby modifying the threshold value generation function,
cause the content section obtaining unit to perform an operation for obtaining at least one piece of content using the modified threshold generation function, and
cause the reference generation unit to perform an operation for increasing the constant and the content section obtaining unit to perform an operation for obtaining at least one piece of content, until the total playback time of the obtained at least one piece of content is below the reference time.

4. The content playback apparatus of claim 1, wherein
the characteristic value is an importance value that shows viewing worth of the corresponding segment,
each threshold value shows a lower limit for allowing viewing of the corresponding segment, and
the content segment obtaining unit compares, for each segment, the importance value corresponding to the segment with the threshold value.

5. The content playback apparatus of claim 4, wherein
viewership has been measured for each segment in the content, and
each importance value is set in advance based on results of measured viewership for the corresponding segment, such that the higher the viewership is, the higher the importance value is, and
the content section obtaining unit compares, for each segment, the importance value that is based on the viewership with the threshold value.

6. The content playback apparatus of claim 4, wherein
the content includes at least moving images,
each importance value is set in advance based on duration of appearance of subtitles in the corresponding segment, such that the longer a time for which subtitles appear, the higher the importance value is, and
the content section obtaining unit compares the importance value that is based on the subtitle appearance time with the corresponding threshold value.

7. The content playback apparatus of claim 4, wherein
each importance value is set in advance in accordance with a preference of a user who is to view the content, such that the higher the preference of the user, the higher the importance value is, and
the content section obtaining unit compares the importance value that is based on the preference of the user with the corresponding threshold value.

8. The content playback apparatus of claim 7, wherein
the content includes at least moving images,
each importance value is set in advance based on a length of time of appearance of a predetermined performer in the corresponding segment, such that the longer the time for which the performer appears, the higher the importance value is, and
the content section obtaining unit compares the importance value that is based on the length of time for which the performer appears with the corresponding threshold value.

9. The content playback apparatus of claim 1, wherein
the content includes at least audio,
the characteristic value is an audio level of the corresponding segment,
the segment is a dialog segment that has an audio level of at least a prescribed value, and is of a predetermined length of time, and
the content section obtaining unit compares the audio level of the dialog segment with the threshold value.

10. The content playback apparatus of claim 1, wherein
the content is composed of content of a plurality of television programs that are related to each other as components of one series, and that have been broadcast up to a present time,
each television program content is divided into a plurality of segments,
the threshold generation function has a property of monotonic decrease that changes such that the threshold values decrease in accordance with an order in which the plurality of television programs were broadcast, and
the content section obtaining unit compares, with respect to each segment, the characteristic value in the segment included in the program content with the threshold value calculated using the threshold value generation function.

11. The content playback apparatus of claim 10, wherein
the content section obtaining unit (a) stores, in advance, a viewing history that shows which of the plurality of television program contents the user has viewed, (b) judges, based on the viewing history, whether an unviewed television program content that the user has not yet viewed exists among the plurality of television program contents, and (c) when an unviewed television program content is judged to exist, increases the characteristic values corresponding to the plurality of segments in the unviewed television program content, and compares the increased characteristic values with the corresponding threshold values.

12. The content playback apparatus of claim 1, wherein
the content section is obtainable by any of a plurality of types of methods,
the content playback apparatus further comprises:
a receiving unit operable to receive, from a user, a designation of one of the types of methods;
a function storage unit operable to pre-store a plurality of threshold value functions that correspond respectively to the plurality of types of methods; and
a function selection unit operable to select, based on the received type of method, a threshold generation function for generating the threshold values, and
the reference generation unit generates the threshold value group with use of the threshold value generation function selected by the function selection unit.

13. The content playback apparatus of claim 12, wherein
each segment has a plurality of characteristic values that each reflect a different one of preferences, each preference being of a different one of a plurality of users,
the receiving unit further receives at least some user IDs from among a plurality of user IDs that have been assigned respectively to the plurality of users, the received user IDs being those assigned to users who, among the plurality of users, wish to view the content section, and
the content section obtaining unit (a) pre-stores a plurality of user profiles in correspondence with the content, each user profile corresponding to a different one of the plurality of users and including, for each segment, a characteristic value that corresponds to the user, (b) obtains, for each received user ID, the corresponding user profile, (c) generates, based on the obtained user profiles, a common profile that includes a common characteristic value for each segment, each common characteristic value corresponding to a common preference of the users, and (d) using the common characteristic values in the generated common profile as the respective characteristic values for the segments, compares, with respect to each segment, the characteristic value in the segment with the threshold value corresponding to the characteristic value.

14. The content playback apparatus of claim 13, wherein
the characteristic value is an importance value that shows a viewing worth of the corresponding segment,
each common characteristic value is a common importance value that shows a viewing worth of the corresponding segment and that reflects the common preference of the users, and
the content section obtaining unit calculates each common characteristic value with use of an importance value calculation function, the importance value calculation function using the importance values that correspond to the segments respectively as input values.

15. The content playback apparatus of claim 14, wherein
the importance value calculation function calculates a total of input importance values.

16. The content playback apparatus of claim 14, wherein
the content section obtaining unit generates the content section by connecting pieces of content in descending order of common importance values corresponding to the segments in which the pieces of content exist.

17. The content playback apparatus of claim 14, wherein
the content playback apparatus is connected to another content playback apparatus over a network, and further comprises:
a transmission unit operable to transmit the content section to the other content playback apparatus over the network.

18. The content playback apparatus of claim 17, wherein the network is a home network.

19. The content playback apparatus of claim 13, further comprising:
a content storage unit operable to store, in advance, one or more recorded contents that are candidates for being the content; and
a content selection unit operable to select one recorded content from among the one or more candidate recorded contents, and set the selected recorded content as the content.

20. The content playback apparatus of claim 19, wherein
the content storage unit stores a plurality of recorded content,
the content playback apparatus further comprises:
a viewer history storage unit operable to store in advance, respectively for each user, a viewing history showing at least one viewed television program content, and
the content selection unit selects, in accordance with the viewing histories, one recorded content that at least one user has not viewed, from among the plurality of recorded contents stored in the content storage unit.

21. The content playback apparatus of claim 19, wherein
each user profile further includes an age of the corresponding user,
the content storage unit stores a plurality of recorded content,
at least one of the plurality of recorded contents has been assigned a parental lock for prohibiting viewing by a user who is below predetermined age,
the content playback apparatus further comprises:
a judgment unit operable to judge, based on the ages of the users in the user profiles, whether or not the at least one recorded content to which the parental lock is assigned is permitted to be viewed, and
the content selection unit, when the at least one recorded content to which the parental lock is assigned is judged to not be permitted to be viewed, removes the at least one recorded content to which the parental lock is assigned from being a candidate for the content and selects one recorded content from remaining recorded contents, and when the at least one recorded content to which the parental lock is assigned is judged to be permitted to be viewed, selects the one recorded content from among a plurality of recorded contents that includes the at least one recorded content to which the parental lock is assigned.

22. A content section obtaining method for use by a content playback apparatus that obtains a content section from content, and plays the obtained content section, the content section obtaining method comprising the steps of:
generating a judgment reference that varies dynamically over a playback time axis of the content using a reference generation unit; and
obtaining the content section by comparing the content with the judgment reference using a content section obtaining unit;
the content has a characteristic value that changes dynamically over the playback time axis,
the judgment reference is a threshold value group,
obtaining a different piece of characteristic content from the content each time the characteristic value exceeds a threshold value in the threshold value group using the content section obtaining unit, and generating the content section from the at least one obtained piece of characteristic content using the content section obtaining unit;
the content is divided into a plurality of segments,
each segment is in correspondence with a different one of the threshold values in the threshold value group, and
comparing the characteristic value with the threshold value corresponding to the segment having the characteristic value using the content section obtaining unit, and when the characteristic value exceeds the compared threshold value, obtaining as a piece of characteristic content, a piece of content that composes the segment corresponding to the compared threshold value, and after performing the comparison and obtaining operations with respect to each of the segments, generating the content section from the at least one obtained piece of content;
generating the threshold value group using a threshold value generation function for determining the threshold value with respect to each segment using the reference generation unit, and
with respect to each segment, comparing the characteristic value with the threshold value determined with respect to the segment using the threshold value generation function using the content section obtaining unit;
the threshold value generation function has a property of monotonic increase and/or monotonic decrease on part of a domain with respect to the playback time axis,
calculating the threshold values in the threshold value group by, with respect to each segment, substituting, as an input value, a playback time of the segment on the playback time axis into the threshold value generation function using the reference generation unit, and, after performing the calculation operation with respect to each segment, generating the threshold value group from the calculated threshold values using the reference generation unit; and
comparing, with respect to each segment, the characteristic value with the threshold value calculated with respect to the segment using the threshold value generation function using the content section obtaining unit.

23. A non-transitory computer-readable recording medium storing a content section obtaining-use computer program for use by a content playback apparatus that obtains a content section from content, and plays the obtained content section, the computer program comprising the steps of:
generating a judgment reference that varies dynamically over a playback time axis of the content using a reference generation unit; and
obtaining the content section by comparing the content with the judgment reference using a content section obtaining unit;
the content has a characteristic value that changes dynamically over the playback time axis,
the judgment reference is a threshold value group,
obtaining a different piece of characteristic content from the content each time the characteristic value exceeds a threshold value in the threshold value group using the content section obtaining unit, and generating the content section from the at least one obtained piece of characteristic content using the content section obtaining unit:

the content is divided into a plurality of segments, each segment is in correspondence with a different one of the threshold values in the threshold value group, and comparing the characteristic value with the threshold value corresponding to the segment having the characteristic value using the content section obtaining unit, and when the characteristic value exceeds the compared threshold value, obtaining as a piece of characteristic content, a piece of content that composes the segment corresponding to the compared threshold value, and after performing the comparison and obtaining operations with respect to each of the segments, generating the content section from the at least one obtained piece of content;

generating the threshold value group using a threshold value generation function for determining the threshold value with respect to each segment using the reference generation unit, and with respect to each segment, comparing the characteristic value with the threshold value determined with respect to the segment using the threshold value generation function using the content section obtaining unit;

the threshold value generation function has a property of monotonic increase and/or monotonic decrease on part of a domain with respect to the playback time axis, calculating the threshold values in the threshold value group by, with respect to each segment, substituting, as an input value, a playback time of the segment on the playback time axis into the threshold value generation function using the reference generation unit, and, after performing the calculation operation with respect to each segment, generating the threshold value group from the calculated threshold values using the reference generation unit, and;

comparing, with respect to each segment, the characteristic value with the threshold value calculated with respect to the segment using the threshold value generation function using the content section obtaining unit.

* * * * *